US012195640B2

United States Patent
Lin et al.

(10) Patent No.: US 12,195,640 B2
(45) Date of Patent: Jan. 14, 2025

(54) CURABLE COATING COMPOSITIONS COMPRISING NANOPARTICLE-POLYMER COMPOSITIONS AND SUPERAMPHIPHOBIC NANOPARTICLES HAVING ANTI-CORROSION AND SUPERAMPHIPHOBICITY PROPERTIES

(71) Applicant: NDSU RESEARCH FOUNDATION, Fargo, ND (US)

(72) Inventors: Zhibin Lin, Fargo, ND (US); Xingyu Wang, Fargo, ND (US)

(73) Assignee: NDSU RESEARCH FOUNDATION, Fargo, ND (US)

( * ) Notice: Subject to any disclaimer, the term of this patent is extended or adjusted under 35 U.S.C. 154(b) by 351 days.

(21) Appl. No.: 17/361,886

(22) Filed: Jun. 29, 2021

(65) Prior Publication Data
US 2021/0403755 A1    Dec. 30, 2021

Related U.S. Application Data

(60) Provisional application No. 63/045,426, filed on Jun. 29, 2020.

(51) Int. Cl.
  *C09D 5/08*     (2006.01)
  *B82Y 30/00*    (2011.01)
  (Continued)

(52) U.S. Cl.
  CPC ............... *C09D 5/084* (2013.01); *C09D 7/62* (2018.01); *C09D 7/63* (2018.01); *C09D 7/65* (2018.01);
  (Continued)

(58) Field of Classification Search
  CPC .......... C09D 5/08; C09D 5/082; C09D 5/084; C08K 3/042; C08K 3/36; C08K 9/06;
  (Continued)

(56) References Cited

FOREIGN PATENT DOCUMENTS

| CN | 107216768 B | * | 5/2019 | ............... B05D 1/18 |
| CN | 111187587 A | * | 5/2020 | ......... C08G 59/1477 |

(Continued)

OTHER PUBLICATIONS

Machine translation of CN112063263A (published Dec. 2020), Powered by EPO and Google. (Year: 2020).*

(Continued)

*Primary Examiner* — Monique R Jackson
(74) *Attorney, Agent, or Firm* — RAPHAEL BELLUM PLLC

(57) ABSTRACT

The invention relates to a curable coating composition comprising a nanoparticle-polymer composition and, optionally, superamphiphobic nanoparticles. The nanoparticle-polymer composition comprises the reaction product of an epoxy resin, a hydroxy-terminated poly(dimethylsiloxane), and a silane coupling agent, and a hybrid nanofiller. The superamphiphobic nanoparticles comprises the reaction product of silicon dioxide nanoparticles and 1H,1H,2H,2H-perfluorodecyltrichlorosilane and/or 1H,1H,2H,2H-perfluorododecyltrichlorosilane (FDDTS). The invention further relates to a cured coating composition of the invention, objects coated with the curable coating composition of the invention, methods for making the curable coating composition of the invention, and the use of the curable coating composition of the invention to coat substrates.

21 Claims, 46 Drawing Sheets

(51) Int. Cl.
- C08K 3/04 (2006.01)
- C08K 3/36 (2006.01)
- C09D 7/62 (2018.01)
- C09D 7/63 (2018.01)
- C09D 7/65 (2018.01)
- C09D 163/00 (2006.01)

(52) U.S. Cl.
CPC ............ *C09D 163/00* (2013.01); *B82Y 30/00* (2013.01); *C08K 3/042* (2017.05); *C08K 3/36* (2013.01)

(58) Field of Classification Search
CPC ........ C08J 7/042; C08J 7/0423; C08J 7/0427; C08J 7/043; C08L 83/04
See application file for complete search history.

(56) References Cited

FOREIGN PATENT DOCUMENTS

| | | | |
|---|---|---|---|
| CN | 112063263 A | * 12/2020 | ......... G08G 73/0266 |
| KR | 101222502 B1 | * 1/2013 | |
| WO | WO-2019197818 A1 | * 10/2019 | ............... C08K 3/01 |

OTHER PUBLICATIONS

Machine translation of CN111187587A (published May 2020), Powered by EPO and Google. (Year: 2020).*
Machine translation of KR101222502B1 (published Jan. 2013) Powered by EPO and Google. (Year: 2013).*
Ammar, Studies on SiO2-hybrid polymeric nanocomposite coatings with superior corrosion protection and hydrophobicity, 2017, Surface & Coatings Technology, vol. 324, pp. 536-545. (Year: 2017).*
Machine translation of CN107216768B (published May 2019), Powered by EPO and Google. (Year: 2019).*
Pourhashem et al., "Investigating the effect of SiO2-graphene oxide hybrid as inorganic nanofiller on corrosion protection properties of epoxy coatings," Surf. Coat. Technol., 2017, 311, 282-294.
Di et al., "Graphene oxide decorated with Fe3O4 nanoparticles with advanced anticorrosive properties of epoxy coatings," J. Taiwan Inst. Chem. Eng., 0216, 64, 244-251.
Liu et al., "Corrosion resistance of graphene-reinforced waterborne epoxy coatings," J. Mater. Sci. Technol., 2016, 32, 5, 425-431.
Wan et al., "Improved dispersion and interface in the grapheneepoxy composites via a facile surfactant-assisted process," Compos. Sci. Technol., 2013, 82, 60-68.
Kang et al., "Friction and wear behavior of nanosilica-filled epoxy resin composite coatings," Appl. Surf. Sci., 2012, 258, 17, 6384-6390.
Conradi et al., "Mechanical and anticorrosion properties of nanosilica-filled epoxy-resin composite coatings," Appl. Surf. Sci., 2014, 292, 432-437.
Ramezanzadeh et al., "Polyaniline-cerium oxide (PAni-CeO2) coated graphene oxide for enhancement of epoxy coating corrosion protection performance on mild steel," Corros. Sci., 2018, 137, 111-126.
Ramezanzadeh et al., "A facile route of making silica nanoparticles-covered graphene oxide nanohybrids (SiO2-GO); fabrication of SiO2-GO/epoxy composite coating with superior barrier and corrosion protection performance," Chem. Eng. J., 2016, 303, 511-528.
Yu et al., "The synergy effect of Graphene SiO2 hybrid materials on reinforcing and toughening epoxy resin," Fibers Polym., 2016, 17, 3, 453-459.
Abdollahi et al., "Anticorrosive coatings prepared using epoxy-silica hybrid nanocomposite materials," Ind. Eng. Chem. Res., 2014, 53, 27, 10858-10869.
Ramezanzadeh et al., "Enhancement of barrier and corrosion protection performance of an epoxy coating through wet transfer of amino functionalized grapheneoxide," Corros. Sci., 2016, 103, 283-304.
Nine et al., "Robust superhydrophobic graphene-based composite coatings with self-cleaning and corrosion barrier properties," ACS Appl. Mater. Interfaces, 2015, 7, 51, 28482-28493.
Wang et al., "Graphene reinforced composites as protective coatings for oil and gas pipelines," Nanomaterials, 2018, 8, 12, 1005.
Dittanet et al., "Thermo-mechanical behaviors and moisture absorption of silica nanoparticle reinforcement in epoxy resins," Int. J. Adhes. Adhes., 2017, 78, 74-82.
Wang et al., "Enhanced protective coatings based on nanoparticle fullerene C60 for oil & gas pipeline corrosion mitigation," Nanomaterials, 2019, 9, 10, 1476.
Pourhashem et al., "Excellent corrosion protection performance of epoxy composite coatings filled with amino-silane functionalized graphene oxide," Surface & Coatings Technology, 2017, 317, 1-9.
Wang et al., "Mechanical, electrochemical, and durability behavior of graphene nano-platelet loaded epoxy-resin composite coatings," Compos. Part B Eng., 2019, 173, 107103.
Kou et al., "Enhanced mechanical and dielectric properties of an epoxy resin modified with hydroxyl-terminated polybutadiene," Composites Part A, 2018, 114, 97-106.
Ammar et al., "Amelioration of anticorrosion and hydrophobic properties of epoxy/PDMS composite coatings containing nano ZnO particles," Prog. Org. Coat., 2016, 92, 54-65.
Porwal et al., "Tribological properties of silica-graphene nano-platelet composites," Ceram. Int., 2014, 40, 12067-12074.
Li et al., "Facile fabrication of translucent superamphiphobic coating on paper to prevent liquid pollution," Chem. Eng. J., 2014, 246, 238-243.
Zhou et al., "Robust, self-healing superamphiphobic fabrics prepared by two-step coating of fluoro-containing polymer, fluoroalkyl silane, and modified silica nanoparticles," Adv. Funct. Mater., 2013, 23, 1664-1670.
He et al., "Fabrication of a transparent superamphiphobic coating with improved stability," Soft Matter, 2011, 7, 6435.
Zhang et al., "A superhydrophobic EP/PDMS nanocomposite coating with high gamma radiation stability," Appl. Surf. Sci., 2018, 436, 405-410.
Xue et al., "Preparation of superhydrophobic surfaces on cotton textiles," Sci. Technol. Adv. Mater., 2008, 9, 035008.
Mochalin et al., "Nanodiamond-polymer composites," Diam. Relat. Mater., 2015, 58, 161-171.
Xie et al., "Dispersion and alignment of carbon nanotubes in polymer matrix: A review," Mater. Sci. Eng. R, 2005, 49, 89-112.
Shadlou et al., "Fracture behavior of epoxy nanocomposites reinforced with different carbon nano-reinforcements," Compos. Struct., 2013, 95, 577-581.
Coleman et al., "Reinforcement of polymers with carbon nanotubes. The role of an ordered polymer interfacial region. Experiment and modeling," Polymer, 2006, 47, 8556-8561.
Coleman et al., "Small but strong: A review of the mechanical properties of carbon nanotube-polymer composites,", Carbon, 2016, 44(9), 1624-1652.
Kuilla et al., "Recent advances in graphene based polymer composites," Prog. Polym. Sci., 2010, 35(11), 1350-1375.
Roy et al., "Detonation Nanodiamonds and Carbon Nanotubes as Reinforcements in Epoxy Composites—A Comparative Study," J. Nanotechnol. Eng. Med., 2013, 4(1), 011008.
Yue et al., "Epoxy composites with carbon nanotubes and graphene nanoplatelets—Dispersion and synergy effects," Carbon, 2014, 78, 268-278.
Nuruddin et al., "Cellulose Nanofibers-Graphene Nanoplatelets Hybrids Nanofillers as High-Performance Multifunctional Reinforcements in Epoxy Composites," Polym. Polym. Compos., 2017, 25(4), 273-284.
Xiang et al., "Processing-property relationships of biaxially stretched binary carbon nanofiller reinforced high density polyethylene nanocomposites," Mater. Lett., 2017, 209, 551-554.
Kumar et al., "MWCNT/TiO2 hybrid nano filler toward high-performance epoxy composite," Ultrason. Sonochem., 2018, 41, 37-46.

(56) References Cited

OTHER PUBLICATIONS

Hosur et al., "Mechanical and viscoelastic properties of epoxy nanocomposites reinforced with carbon nanotubes, nanoclay, and binary nanoparticles," J. Reinf. Plast. Compos., 2017, 36(9), 667-684.
Tsai et al., "Investigating the load transfer efficiency in carbon nanotubes reinforced nanocomposites," Compos. Struct., 2009, 90(2), 172-179.
Zhang et al., "Synergetic effect of carbon nanofibers and short carbon fibers on the mechanical and fracture properties of epoxy resin," Carbon, 2010, 48(15), 4289-4300.
Wernik et al., "On the mechanical characterization of carbon nanotube reinforced epoxy adhesives," Mater. Des., 2014, 59, 19-32.
Shen et al., "Multiwall carbon nanotubes-reinforced epoxy hybrid coatings with high electrical conductivity and corrosion resistance prepared via electrostatic spraying," Prog. Org. Coat., 2016, 90, 139-146.
Jeon et al., "Corrosion protection by epoxy coating containing multi-walled carbon nanotubes," J. Ind. Eng. Chem., 2013, 19(3), 849-853.
Cui et al., "Effect of functionalization of multi-walled carbon nanotube on the curing behavior and mechanical property of multi-walled carbon nanotube/epoxy composites," Mater. Des., 2013, 49, 279-284.
Potts et al., "Graphene-based polymer nanocomposites," Polymer, 2011, 52(1), 5-25.
Liu et al., "On fracture toughness of nano-particle modified epoxy," Compos. Part B Eng., 2011, 42(8), 2170-2175.
Sari et al., "Influence of nanoclay particles modification by polyester-amide hyperbranched polymer on the corrosion protective performance of the epoxy nanocomposite," Corros. Sci., 2015, 92, 162-172.
Lee et al., "A facile method for preparing CNT-grafted carbon fibers and improved tensile strength of their composites," Compos. Part Appl. Sci. Manuf., 2015, 69, 132-138.
Liu et al., "Comparison of different surface treatments of carbon fibers used as reinforcements in epoxy composites: Interfacial strength measurements by in-situ scanning electron microscope tensile tests," Compos. Sci. Technol., 2018, 167, 331-338.
Wang et al., "Carboxyl-terminated butadiene-acrylonitrile-toughened epoxy/carboxyl-modified carbon nanotube nanocomposites: Thermal and mechanical properties," Express Polym. Lett., 2012, 6, 719-728.
Yang et al., "Cure Behavior and Thermal Stability Analysis of Multiwalled Carbon Nanotube/Epoxy Resin Nanocomposites," J. Appl. Polym. Sci., 2008, 110(5), 2980-2988.
Gonzalez et al., "Applications of FTIR on epoxy resins-identification, monitoring the curing process, phase separation and water uptake," Infrared Spectroscopy-Materials Science, Engineering and Technology, Published Apr. 25, 2012, InTech.
Qiu et al., "Synergistic Effect of Polypyrrole-Intercalated Graphene for Enhanced Corrosion Protection of Aqueous Coating in 3.5% NaCl Solution," ACS Appl. Mater. Interfaces, 2017, 9, 34294-34304.
De Leon et al., "Superhydrophobic Colloidally Textured Polythiophene Film as Superior Anticorrosion Coating," ACS Appl. Mater. Interfaces, 2012, 4, 3169-3176.
Ramezanzadeh et al., "A study on the anticorrosion performance of the epoxy-polyamide nanocomposites containing ZnO nanoparticles," Prog. Org. Coat., 2011, 72, 410-422.
Li et al., "Self-aligned graphene as anticorrosive barrier in waterborne polyurethane composite coatings," J. Mater. Chem. A, 2014, 2, 14139-14145.
Philippe et al., "Investigating Localized Degradation of Organic Coatings : Comparison of Electrochemical Impedance Spectroscopy with Local Electrochemical Impedance Spectroscopy," J. Electrochem. Soc., 2003, 150(4), B111-B119.
Lacombre et al., "Water uptake in free films and coatings using the Brasher and Kingsbury equation: a possible explanation of the different values obtained by electrochemical Impedance spectroscopy and gravimetry," Electrochimica Acta, 2017, 231, 162-170.
Khun et al., "Effects of carbon nanotube content on adhesion strength and wear and corrosion resistance of epoxy composite coatings on AA2024-T3," Prog. Org. Coat., 2014, 77, 72-80.
Fan et al., "Abrasion resistance of waterborne polyurethane films incorporated with PU/silica hybrids," Prog. Org. Coat., 2015, 86, 125-133.
Daniels et al., "Silane Adsorption Behavior, Microstructure, and Properties of Glycidoxypropyltrimethoxysilane-Modified Colloidal Silica Coatings," J. Colloid Interface Sci., 1998, 205, 191-200.
Khatoon et al., "Vanadium Pentoxide-Enwrapped Polydiphenylamine/Polyurethane Nanocomposite: High-Performance Anticorrosive Coating," ACS Appl. Mater. Interfaces, 2019, 11, 2, 2374-2385.
Rider et al., "Hierarchical composites with high-volume fractions of carbon nanotubes: Influence of plasma surface treatment and thermoplastic nanophase-modified epoxy," Carbon, 2015, 94, 971-981.
Cha et al., "Improvement of modulus, strength and fracture toughness of CNT/Epoxy nanocomposites through the functionalization of carbon nanotubes," Compos. Part B Eng., 2017, 129, 169-179.
Kim et al., "Effect of surface treatment of graphene nanoplatelets for improvement of thermal and electrical properties of epoxy composites," Carbon Letters, 2015, 16(1), 34-40.
Mansour et al., "Investigation of the dynamic mechanical properties of epoxy resins modified with elastomers," Compos. Part B Eng., 2016, 94, 152-159.
Chen et al., "Preparation and characterization of surface-modified ammonium polyphosphate and its effect on the flame retardancy of rigid polyurethane foam," J. Appl. Polym. Sci., 2017, 134, 45369.
Liu et al., "Preparation and characterization of a polydimethylsiloxane-modified, epoxy-resin-based polyol dispersion and its crosslinked films," J. Appl. Polym. Sci., 2017, 134, 44342.
Zhou et al., "The preparation and properties study of polydimethylsiloxane-based coatings modified by epoxy resin," J. Polym. Res., 2016, 23, 14.
Chen et al., "Fabrication of All-Water-Based Self-Repairing Superhydrophobic Coatings Based on UV-Responsive Microcapsules," Adv. Funct. Mater., 2015, 25, 1035-1041.
Zhang et al., "Excellent corrosion protection performance of epoxy composite coatings filled with silane functionalized silicon nitride," J. Polym. Res., 2018, 25, 130.
Zhou et al., "A Waterborne Coating System for Preparing Robust, Self-healing, Superamphiphobic Surfaces," Adv. Funct. Mater., 2017, 27, 1604261.
Yang et al., "Superhydrophobic epoxy coating modified by fluorographene used for anti-corrosion and self-cleaning," Appl. Surf. Sci., 2017, 401, 146-155.
Strobel et al., "An Essay on Contact Angle Measurements," Plasma Process. Polym., 2011, 8, 8-13.
Yin et al., "Water condensation on superhydrophobic aluminum surfaces with different low-surface-energy coatings," Appl. Surf. Sci., 2012, 258, 4063-4068.
Das et al., "Designing Ultra-Low Hydrate Adhesion Surfaces by Interfacial Spreading of Water-Immiscible Barrier Films," ACS Appl. Mater. Interfaces, 2017, 9, 21496-21502.
Dong et al., "Colorful Superamphiphobic Coatings with Low Sliding Angles and High Durability Based on Natural Nanorods," ACS Appl. Mater. Interfaces, 2017, 9, 1941-1952.
Wang et al., "Wear-Resistant and Antismudge Superoleophobic Coating on Polyethylene Terephthalate Substrate Using SiO2 Nanoparticles," ACS Appl. Mater. Interfaces, 2015, 7, 743-755.
Ji et al., "Composite coating with synergistic effect of biomimetic epoxy thermoset morphology and incorporated superhydrophobic silica for corrosion protection," Express Polym. Lett., 2016, 10(11), 950-963.
Ma et al., "Anticorrosion Properties of Epoxy/Nanocellulose Nanocomposite Coating," BioResources, 2017, 12(2), 2912-2929.

\* cited by examiner

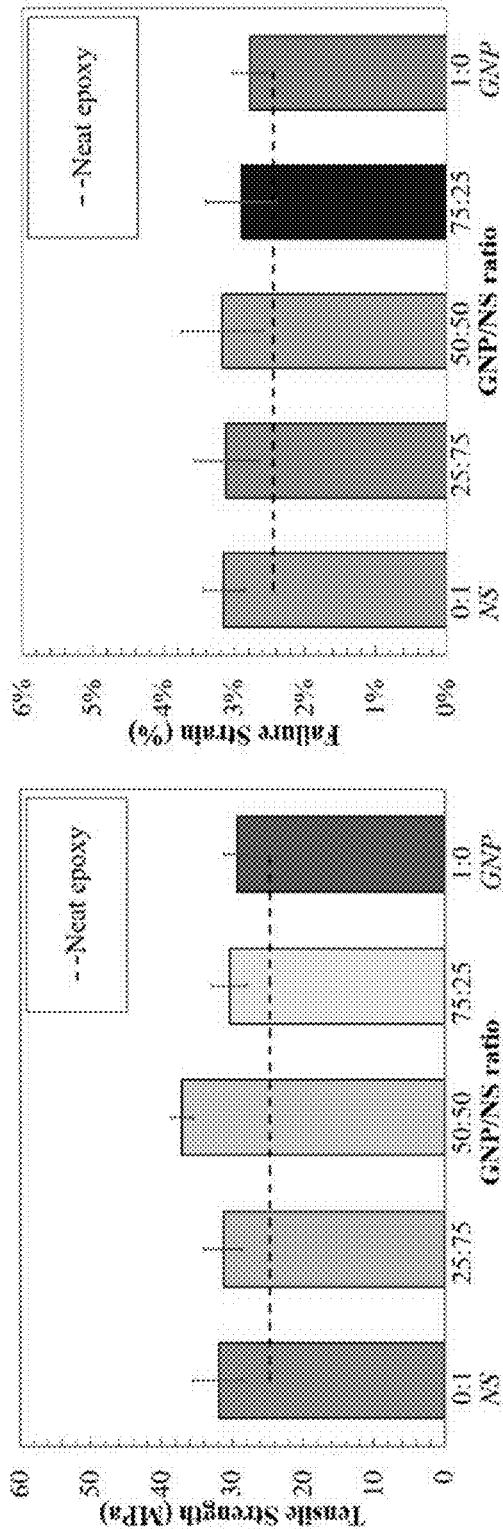
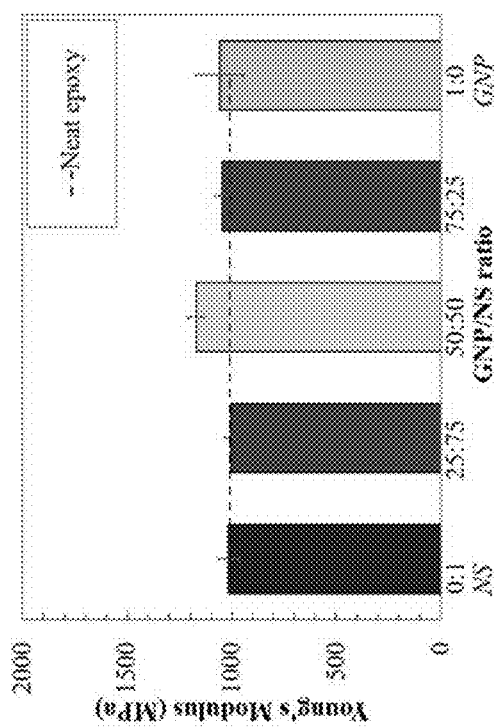
FIG. 14(a)
FIG. 14(b)
FIG. 14(c)

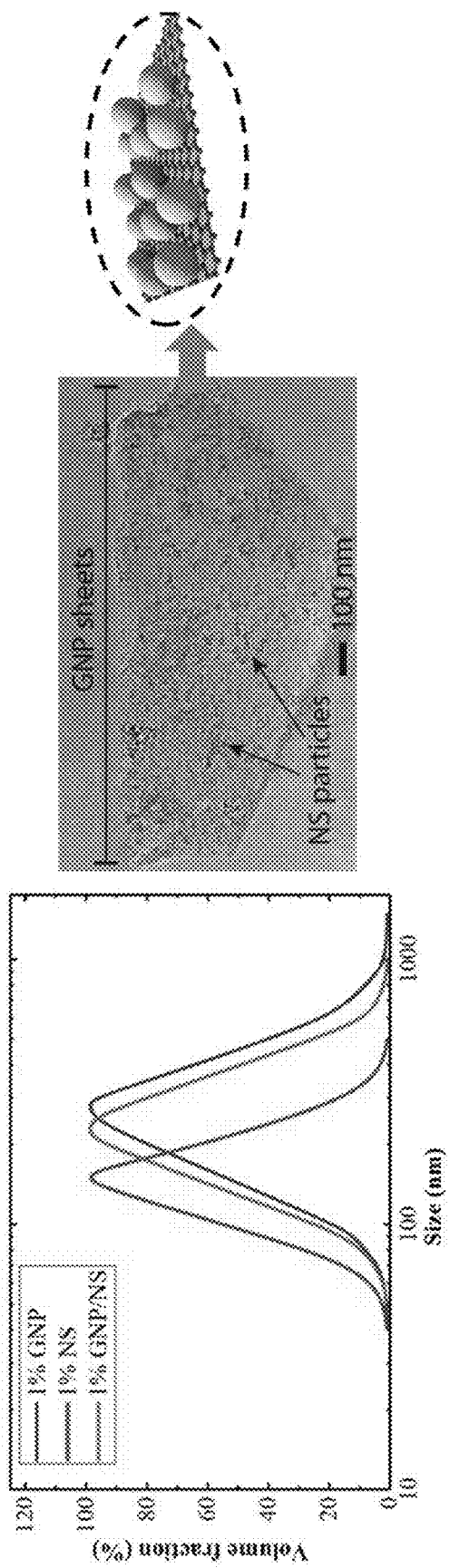
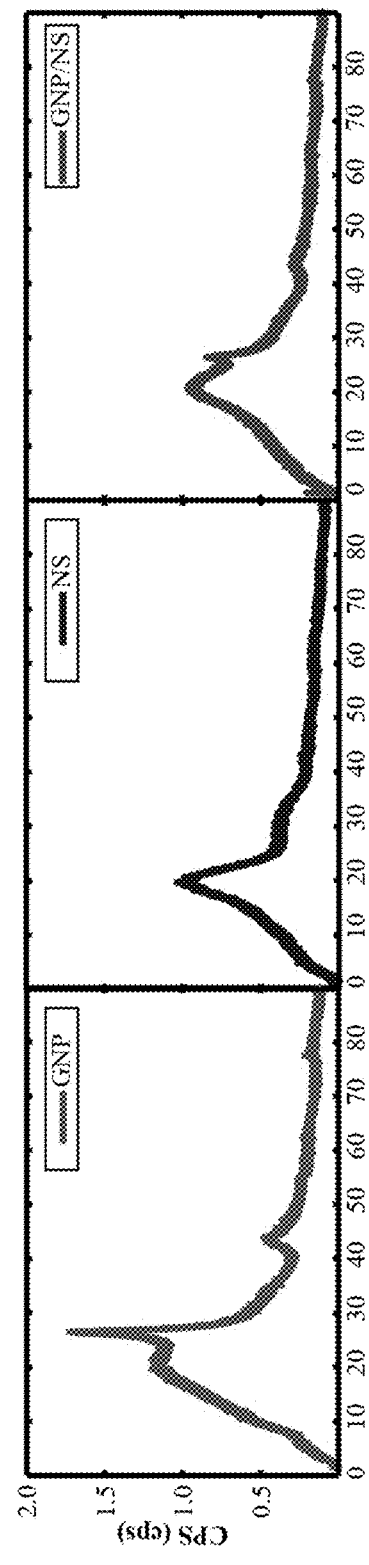
FIG. 32(a)
FIG. 32(b)
FIG. 32(c)

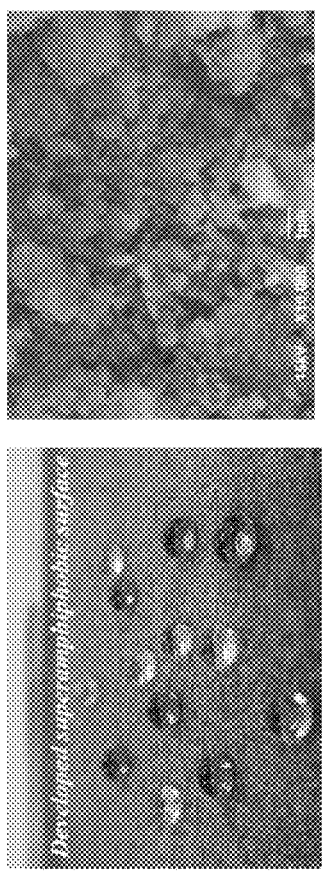
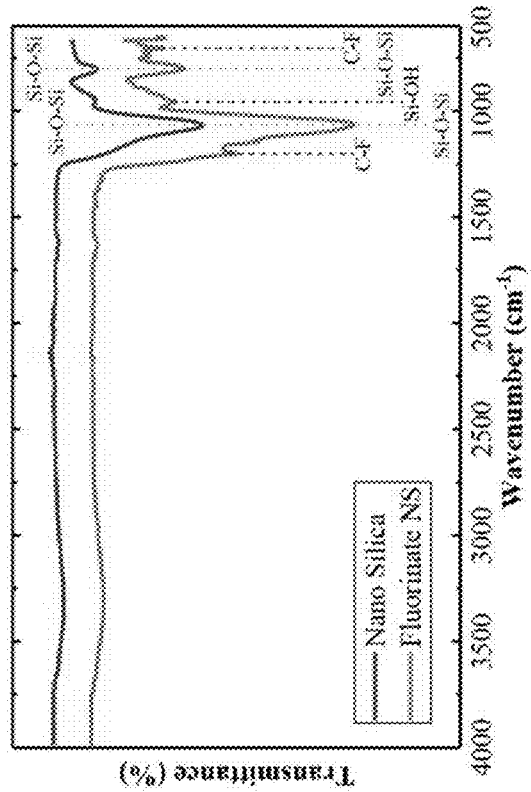
FIG. 33(a)
FIG. 33(b)
FIG. 33(c)
| Group | Contact Angle (°) | |
|---|---|---|
| Neat epoxy | Water | 51 |
| | Hexadecane | 13 |
| 1%GS-PEDP (10:90) | Water | 106 |
| | Hexadecane | 15 |
| 1%GS-PEDP (10:90) MS | Water | 168 |
| | Hexadecane | 150 |
FIG. 33(d)

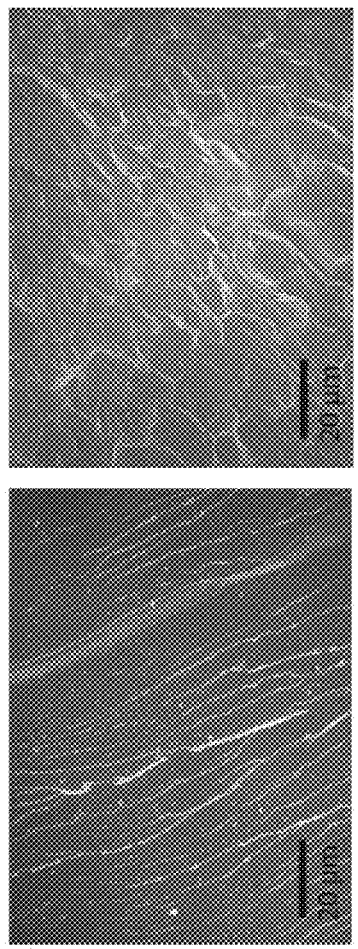
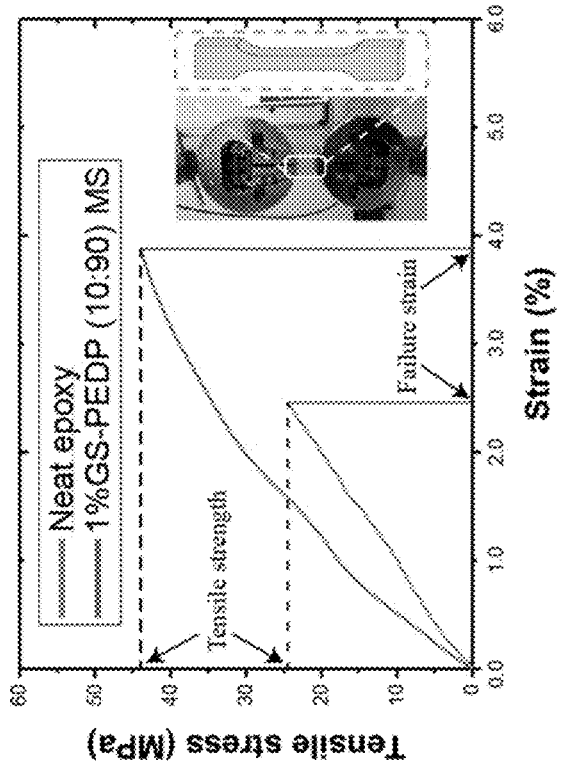
| Group | Neat epoxy | 1%GS-PDEP (10:90) MS |
|---|---|---|
| Tensile strength (Mpa) | 24.74 | 43.9 |
| Ultimate strain (%) | 2.4% | 3.9% |
| Young's modulus (Mpa) | 1010.37 | 1126.4 |
FIG. 37(a)
FIG. 37(b)
FIG. 37(c)
FIG. 37(d)

CURABLE COATING COMPOSITIONS COMPRISING NANOPARTICLE-POLYMER COMPOSITIONS AND SUPERAMPHIPHOBIC NANOPARTICLES HAVING ANTI-CORROSION AND SUPERAMPHIPHOBICITY PROPERTIES

CROSS-REFERENCE TO RELATED APPLICATIONS

This application claims priority to U.S. Provisional Application No. 63/045,426, filed Jun. 29, 2020, which is incorporated herein by reference.

STATEMENT OF U.S. GOVERNMENT SUPPORT

This invention was made with government support under grant DTPH56-16-H-CAAP03 awarded by the U.S. Department of Transportation, Pipeline and Hazardous Materials Safety Administration (USDOT PHMSA). The U.S. government has certain rights in the invention.

BACKGROUND OF THE INVENTION

Corrosion is a major cause of failures to the metallic structures, such as bridges, railways, pipelines, and others; the failures of these infrastructures can cause catastrophic accidents that result in huge loss of economy and threatening lives of people. Khatoon et al., *ACS Appl. Mater. Interfaces*, 11(2):2374-2385, 2018. To address this issue, polymer-based coatings are the most widely used protective films for corrosion control and mitigation of the metallic substrate in civil, mechanical, and aerospace engineering. Wang et al., *Compos. Part B Eng.*, 176(1):107103, 2019.

Among these coatings, epoxy resins are the most widely used protective films as they have good barrier performance, mechanical properties, and low cost. Dittanet et al., *Int. J. Adhes. Adhes.*, 78:74-82, 2017; Ma et al., *Bioresources*, 12(2):2912-2929, 2017. However, despite many efforts devoted to improving the performance of epoxy-based composites, high-performance multifunctional coatings still face considerable challenges. For example, the hydrophilic surface of the epoxy attracts and absorbs water and other liquids, which reduces the barrier property against corrosive elements. In addition, the performance of the epoxy coatings is significantly degraded due to micropores and cracks generated by shrinkage during the curing process. Wang et al., *Nanomaterials*, 9(10):1476, 2019. The existing micropores/cracks lead to a reduced barrier property, which reduces the diffusion pathway and allows corrosive media to penetrate the coating film to initiate corrosion damages. Zhang et al., *J. Polym. Res.*, 25(5):130, 2018. Moreover, the microcracks weaken the mechanical properties of the coatings, and they can easily become large defects during the service life of the coating, which dramatically compromises the damage tolerance and long-term performance of the coating. Wang et al., *Compos. Part B Eng.*, p. 107103, 2019.

Inclusion of nanoparticles as nanofillers is one of the most promising approaches that enables synthesizing high-performance nanocomposite coatings with excellent corrosion resistance and mechanical strength. Nanofillers, such as carbon nanotubes (CNT), graphene nanoplatelet (GNP), or nanosilica (NS), have led to dramatic improvements of coating performance in terms of their tribological, mechanical, and electrochemical properties. Shen et al., *Prog. Org. Coat.*, 90:139-146, 2016; Jeon et al., *J. Ind. Eng. Chem.*, 19(3):849-853, 2013; Cui et al., *Mater. Des.*, 49:279-284, 2013; Xie et al., *Mater. Sci. Eng. R Rep.*, 49(4):89-112, 2005; Potts et al., *Polymer*, 52(1):5-25, 2011; Liu et al., *J. Mater. Sci. Technol.*, 32(5):425-431, 2016; Wan et al., *Compos. Sci. Technol.*, 82:60-68, 2013; Liu et al., *Compos. Part B Eng.*, 42(8):2170-2175, 2011; Kang et al., *Appl. Surf. Sci.*, 258(17):6384-6390, 2012; Conradi et al., *Appl. Surf. Sci.*, 292:432-437, 2014; Yue et al., *Carbon*, 78:268-278, 2014; Nuruddin et al., *Polym. Polym. Compos.*, 25(4):273, 2017; Xiang et al., *Mater. Lett.*, 209:551-554, 2017; Porwal et al., *Ceram. Int.*, 40:12067-12074, 2014; Pourhashem et al., *Surf. Coat. Technol.*, 311:282-294, 2017.

However, there are some limitations in utilizing single nanofiller composites as high-performance materials. Yue et al., *Carbon*, 78:268-278, 2014; Nuruddin et al., *Polym. Polym. Compos.*, 25(4):273, 2017; Xiang et al., *Mater. Lett.*, 209:551-554, 2017; Kumar et al., *Ultrason. Sonochem.*, 41:37-46, 2018; Hosur et al., *J. Reinf. Plast. Compos.*, 36(9):667-684, 2017.

First, a single filler system can enhance some properties of a composite but may also have a negative impact on other performance aspects. Second, due to the strong van der Walls forces between the particles, severe agglomeration was often observed in nanocomposites having a low content of nanofillers. Therefore, the dispersion level of the particles plays a vital role in the performance of the nanofiller reinforced composite. Pourhashem et al., *Surf. Coat. Technol.*, 311:282-294, 201; Di et al., *J. Taiwan Inst. Chem. Eng.*, 64:244-251, 2016. For example, the addition of carbon nanotubes (CNT) increases the mechanical strength, such as abrasion and tensile strength, of composites but has a negative effect on corrosion barrier performance. Cui et al., *Mater. Des.*, 49:279-284, 2013; Shen et al., *Prog. Org. Coat.*, 90:139-146, 2016; Jeon et al., *J. Ind. Eng. Chem.*, 19(3); 849-853, 2013. With well-dispersed graphene (GNP) nanoplatelets, improved corrosion resistance can be observed in the nanocomposites. However, the mechanical properties, such as wear resistance, and tensile strength, can barely be improved or even reduced by the presence of GNP particles. Potts et al., *Polymer*, 52(1):5-25, 2011; Liu et al., *J. Mater. Sci. Technol.*, 32(5):425-431, 201; Wan et al., *Compos. Sci. Technol.*, 82:60-68, 2013. The incorporation of nano-silica (NS) particles can slightly enhance both the corrosion resistance and elasticity, but decrease the mechanical strength and Young's modulus of the polymer. Kang et al., *Appl. Surf. Sci.*, 258(17):6384-6390, 2012; Conradi et al., *Appl. Surf. Sci.*, 292:432-437, 2014; Liu, et al., *Compos. Part B Eng.*, 42(8):2170-2175, 2011. Clearly, single nanofiller provided significant improvements in coating properties in certain areas, but may not cover multiple functionalities, as expected for metallic structures, that may suffer from high wear loss and/or fouling, as well as high corrosion.

To address the limitations of single filler reinforced composite, surface treatments and/or hybrid nanofiller systems were introduced by researchers, as these approaches can effectively solve the drawbacks of the single fillers. Pourhashem et al., *Surf. Coat. Technol.*, 311:282-294, 2017; Hosur et al., *J. Reinf. Plast. Compos.*, 36(9):667-684, 2017; Xiang et al., *Mater. Lett.*, 209:551-554, 2017. For example, a commonly used approach to overcome the drawbacks of a single filler system is surface treatment of nanofillers. Ramezanzadeh et al. developed polyaniline-cerium oxide coated graphene oxide (GO) nanofillers to enhance the corrosion protection of an epoxy resin. Ramezanzadeh et al., *Corros. Sci.*, 137:111-126, 2018. The modified graphene oxide nanosheets had better dispersion and stronger barrier performance enhancement, compared with raw GO particles.

Sari et al. successfully used polyester-amide hyperbranched polymer (HBP) to modify nanoclay particles, and the modified particles had improved dispersion in an epoxy resin, resulting in improved corrosion resistance compared with unmodified nanoclay. Sari et al., *Corros. Sci.*, 92:162-172, 2015. However, these techniques are generally either time-consuming or require an extensive amount of chemicals or energy. Rider et al., *Carbon*, 94:971-981, 2015; Cha et al., *Compos. Part B Eng.*, 129:169-179, 2017; Kim et al., *Carbon Lett. Carbon Lett*, 16(1):34-40, 2015.

Indeed, surface treatments generally only increase the level of reinforcement in a single filler system, without providing additional positive enhancements into the coating. For example, the addition of CNT provided improved tensile properties, but, due to the severe agglomeration, material degradation was observed once the content of CNT reached a critical value. With the surface treatment, the tensile strength was further increased by the modified CNT. Cui et al., *Mater. Des.*, 49:279-284, 2013; Lee et al., *Compos. Part Appl. Sci. Manuf.*, 69:132-138, 2015; Liu et al., *Compos. Sci. Technol.*, 167:331-338, 2018. However, no other enhanced properties were reported in these studies, such as corrosion resistance, water-repellency, properties which are also critical for a protective coating. The above observations revealed the limitation of using a surface-treated single filler system to fabricate multifunctional high-performance coatings.

Besides surface treatment, hybrid nanofiller materials have been used to explore the synergistic effect of the nanofillers, thus, developing multifunctional coatings based on hybrid nanofiller composites. Yue et al., *Carbon*, 78:268-278, 2014; Nuruddin et al., *Polym. Polym. Compos.*, 25(4):273, 2017; Xiang et al., *Mater. Lett.*, 209:551-554, 2017. The strategy of using a hybrid filler system, in which nanofillers with different geometric shapes are integrated, has been proven to be an effective method to fabricate nanocomposites that overcome the limitations of the single filler system. Nuruddin et al., *Polym. Polym. Compos.*, 25(4):273, 2017. The presence of another nanofiller has led to a better dispersion level of the nanoparticles. Yue et al., *Carbon*, 78:268-278, 2014; Nuruddin et al., *Polym. Polym. Compos.*, 25(4):273, 2017; Kumar et al., *Ultrason. Sonochem.*, 41:37-46, 2018. The hybrid filler system could form a more robust nanoparticle network with better dispersion and superior improvements compared with a polymer containing a single filler; in addition, with suitable mixture design, the reinforcements of each single filler can be integrated in the hybrid nanofiller system. To conclude, better mechanical, electrical, and barrier properties of composites were observed in these nanocomposites due to the superior dispersion of the nanoparticles. Yue et al., *Carbon*, 78:268-278, 2014; Nuruddin et al., *Polym. Polym. Compos.*, 25(4):273, 2017.

Recently, many successful studies demonstrated the advantages of utilizing hybrid nanofillers in nanocomposite coatings. For instance, Yue et al. successfully utilized a CNT/GNP hybrid system into the epoxy matrix, and both the mechanical and electrical behaviors were enhanced in the developed nanocomposites. Yue et al., *Carbon*, 78:268-278, 2014. Nuruddin et al. investigated the effect of graphene nanoplatelets and cellulose nanofibers on the mechanical properties of epoxy polymer composites. Nuruddin et al., *Polym. Polym. Compos.*, 25(4):273, 2017. The hybrid filler system exhibited improved mechanical and thermo-mechanical properties. *The combination of* 0.1 wt. % GNP and 0.5 wt. % cellulose nanofibers provided the best performance; however, degradation was observed when the filler content exceeded the value above. Xiang et al. studied the tensile, electrical, and barrier properties of three types of binary nanofillers systems, with combinations of CNT, GNP, and carbon black (CB). Xiang et al., *Mater. Lett.*, 209:551-554, 2017. Excellent tensile and barrier property performance were obtained using combinations of CNT/GNP and GNP/CB, respectively. Hosur et al. pointed out that, compared with the single filler reinforced epoxy, the storage modulus and flexural modulus improved using the hybrid nanofillers that contained carbon nanotube and nanoclay. Hosur et al., *J. Reinf. Plast. Compos.*, 36(9):667-684, 2017. Kumar et al. examined the performance of epoxy with CNT/$TiO_2$ nanofiller. Kumar et al., *Ultrason. Sonochem.*, 41:37-46, 2018. Superior improvements in tensile and anti-corrosion properties were obtained with the addition of the hybrid nanofiller, and the presence of $TiO_2$ prevented the re-agglomeration of CNT. Among these hybrid filler systems, the combination of graphene/silica was more desirable as both mechanical and corrosion protection properties were improved by the synergistic effect of hybrid nanofillers. Porwal et al., *Ceram. Int.*, 40:12067-12074, 2014; Pourhashem et al., *Surf. Coat. Technol.*, 311:282-294, 2017.

While a few investigations studied the combination of graphene oxide/$SiO_2$ (Ramezanzadeh et al., *Chem. Eng. J.*, 303:511-528, 2016; Wang et al., *Express Polym. Lett.*, 6(4):299-307, 2012), there is still a lack of research studies on graphene nanoplatelets/$SiO_2$ hybrid filler systems. Yu et al. prepared a hybrid filler system with $SiO_2$ particles on the surface of graphene nanoplatelets. Yu et al., *Fibers Polym.*, 17(3):453-459, 2016. However, due to the different focus of the study, the research was particularly concerned with the tensile properties of the composites. And Pourhashem et al. studied the influence of incorporating $SiO_2$ nanoparticles into graphene oxide (GO) nanosheets to reinforce epoxy resin. Pourhashem et al., *Surf Coat. Technol.*, 311:282-294, 2017. The nanocomposite with $SiO_2$/GO hybrid nanofillers have greater corrosion resistance compared with the one with GO, and improved mechanical properties were also observed. Hybrid filler nanocomposites must still be evaluated for their electrochemical, mechanical, and tribological properties, which are critical in real-world applications, especially anti-corrosion coatings.

As mentioned, the hydrophilic surface of epoxy coatings is a major challenge while protecting the substrate against water and other liquids. Despite the advantages of nanofiller reinforcement, the incorporation of nanofillers can barely improve the hydrophobicity of the coating as the major content of the nanocomposite coating is epoxy, especially when the added nanofillers are hydrophilic, such as nanoclay and cellulose nanofiber. On the other hand, even with nanofillers with a hydrophobic surface, like carbon nanotube and fullerene, the enhancement of water repellency is limited by the low concentration of the nanofiller in the composite (<3 wt. %); and increasing the content of the nanofiller results in material degradation due to severe agglomeration.

Therefore, besides nanofiller reinforcement, high-performance coatings could be further reinforced through surface modification by incorporation of the concept of super-amiphiphobicity, as it is capable of self-cleaning or anti-fouling. Chen et al., *Adv. Funct. Mater.*, 25:1035-1041, 2015. Some recent efforts were taken using surface-treated particles to develop the superamphiphobic surface. Li et al., *Chem. Eng. J.*, 246:238-243, 2014; Zhou et al., *Adv. Funct. Mater.*, 23:1664-1670, 2013; He et al., *Soft Matter*, 7:6435, 2011; Zhou et al., *Adv. Funct. Mater.*, 27:1604261, 2017. Li reported single-step approach to fabricate superamphiphobic $SiO_2$ nanoparticles by imparting perfluorodecyltrichloro group from perfluorodecyltrichlorosilane (FDTS). Li et al., *Chem. Eng. J.*, 246:238-243, 2014. Then the functionalized SiO$_2$ nanoparticle solution was sprayed on a paper surface. Zhou prepared a superamphiphobic surface on a fabric surface by a two-step wet-chemistry method. Zhou et al., *Adv. Funct. Mater.*, 23:1664-1670, 2013. The fabric was applied with a silica sol with tetraethylorthosilicate (TEOS) and FAS in ethanol first, then dipped coating to a PVDF-HFP/dimethylformamide solution. The coated fabric showed a contact angle of 172° and 160° to water and hexadecane, correspondingly. However, these strategies were still unable to ensure durable, reliable treatments in long run. As a result, contact angle of the treated surface could be quickly dropped, if the functionalized particles on the surface were grinded out by mechanical stresses or were exposed to the moist environment to certain periods. Parallel to the treated particles, modification of the epoxy resins is another promising approach to increase the hydrophobicity. Research studies demonstrated the intercalation of polydimethylsiloxane (PDMS) with epoxy and resulted a significant increase in hydrophobicity of the epoxy coating. The PDMS-epoxy coating system has high water contact angle due to the low surface energy that PDMS introduced, with a simple modification process. Ammar et al., *Surf. Coat. Technol.*, 324:536-545, 2017; Zhang et al., *Appl. Surf. Sci.*, 436:405-410, 2018; Yang et al., *Appl. Surf Sci.*, 401:146-155, 2017. The application of using these two approaches to prepare a superamphiphobic coating for metallic substrate is unknown.

The invention is directed to a nanofiller-reinforced PDMS/epoxy coating system with excellent hydrophobicity, anti-corrosion property, mechanical strength, and damage tolerance. The prepared coatings were suitable for varied application methods, including drawdown, air-spray, brush, and dip coating techniques. The invention is also The invention also relates to a robust self-cleaning nanoparticle-polymer coating, which may be used, for example, in oil/gas pipeline applications, with specific functionality of: 1) high superamphiphobic surface, 2) modified resin, and 3) hybrid nanofiller reinforcement. The hybrid nanofiller reinforcement provides significantly improved mechanical and corrosion protection properties, while the superamphiphobic surface and modified resin provides superior water and oil repellency. The new high-performance coating has a significant advantage over existing coatings since it can be tailored to provide multifunctional protection for extended long-term civil infrastructure performance against corrosion and fouling issues.

SUMMARY OF THE INVENTION

The invention relates to a curable coating composition comprising, consisting essentially of, consisting of:
a) a nanoparticle-polymer composition, comprising, consisting essentially of, consisting of:
  a1) the reaction product of:
    a1.1) at least one epoxy resin;
    a1.2) at least one hydroxy-terminated poly(dimethylsiloxane) (PDMS); and
    a1.3) at least one silane coupling agent; and
  a2) at least one hybrid nanofiller, comprising, consisting essentially of, or consisting of graphene nanoplatelets (GNP) and nano-silica (NS); and
b) optionally, superamphiphobic nanoparticles, comprising, consisting essentially of, or consisting of the reaction product of:
  b1) silicon dioxide nanoparticles; and
  b2) 1H,1H,2H,2H-perfluorodecyltrichlorosilane (FDTS), 1H,1H,2H,2H-perfluorododecyltrichlorosilane (FDDTS), or mixtures thereof.

The invention also relates to a cured coating composition comprising, consisting essentially of, or consisting of the curable coating composition of the invention.

The invention further relates to a substrate or an object coated with the curable coating composition of the invention.

The invention also relates to a method for making the curable coating composition of the invention.

The invention further relates to a method for coating the surface of a metal or non-metal substrate comprising, consisting essentially of, or consisting of the steps of:
  applying the nanoparticle-polymer composition of the curable coating composition of the invention to at least a part of the surface of the substrate to form a first coated surface, and
  curing the first coated surface to form a cured first coated surface,
  optionally, applying the superamphiphobic nanoparticles of the curable coating composition of the invention to the cured first coated surface to form a second coated surface, and
  curing the second coated surface.

BRIEF DESCRIPTION OF THE FIGURES

FIGS. 14(a)-14(c) show the tensile properties of hybrid nanofiller composites, FIG. 14(a) max tensile strength, FIG. 14(b) strain at the failure, and FIG. 14(c) Young's modulus.

FIG. 26(b) mass loss; and FIG. 26(c) wear index over different abrasion cycles.

FIGS. 32(a)-32(c) show FIG. 32(a) the particle size distribution of GNP/NS hybrid filler, FIG. 32(b) the transmission electron microscopy (TEM) photograph of GNP/NS hybrid filler, and FIG. 32(c) the structure of the hybrid nanofiller by X-ray powder diffraction (XRD).

FIGS. 33(a)-33(d) show the FIG. 33(a) FTIR spectra of fluorinated NS particles, FIG. 33(b) superamphiphobic surface with water and oil droplet, FIG. 33(c) SEM image on superamphiphobic layer with fluorinated particles, and FIG. 33(d) contact angle of the coating with and without modification.

FIGS. 37(a)-37(d) show the FIG. 37(a) tensile stress-strain curve, fracture surface of coating FIG. 37(b) without and FIG. 37(c) with nanofillers, and FIG. 37(d) tensile properties of 1% GS-PDEP coating.

FIG. 42(a)-FIG. 42(c).

DESCRIPTION OF THE INVENTION

Figure 1B:
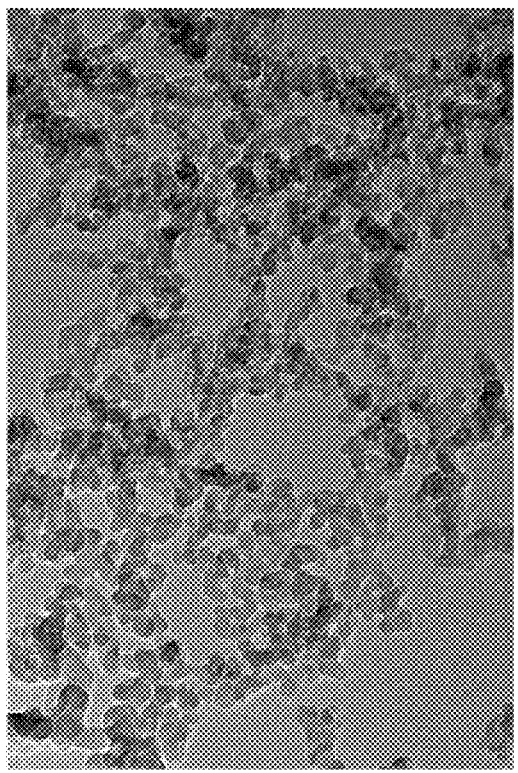
FIGS. 1(a)-1(d) show the transmission electron microscopy (TEM) photograph of FIG. 1(a) GNP, of FIG. 1(b) NS, of FIG. 1(c) GNP/NS hybrid filler, and of FIG. 1(d) schematic diagram of GNP/NS hybrid filler.

The invention relates to a curable coating composition comprising, consisting essentially of, consisting of:
a) a nanoparticle-polymer composition, comprising, consisting essentially of, consisting of:
  a1) the reaction product of:
    a1.1) at least one epoxy resin;
    a1.2) at least one hydroxy-terminated poly(dimethylsiloxane) (PDMS); and
    a1.3) at least one silane coupling agent; and
  a2) at least one hybrid nanofiller, comprising, consisting essentially of, or consisting of graphene nanoplatelets (GNP) and nano-silica (NS); and
b) optionally, superamphiphobic nanoparticles, comprising, consisting essentially of, or consisting of the reaction product of:
  b1) silicon dioxide nanoparticles; and
  b2) 1H,1H,2H,2H-perfluorodecyltrichlorosilane (FDTS), 1H,1H,2H,2H-perfluorododecyltrichlorosilane (FDDTS), or mixtures thereof.

Nanoparticle-Polymer Composition

The epoxy resin may be selected from the group consisting of bisphenol-based resin, novolac resin, aliphatic resin, halogenated resin, diluent resin, glycidol amine resin, and mixtures thereof. Preferably, the epoxy resin is bisphenol A/epichlorohydrin epoxy resin (e.g., EPON™ 828, available from Hexion, Inc.). The epoxy resin may be present in the nanoparticle-polymer composition in an amount ranging from about 35-65 wt. %, more preferably about 42-59 wt. %, most preferably about 46-54 wt. %, based on the total solid content of the nanoparticle-polymer composition.

The GNP may have an average specific surface area of about 15-750 $m^2/g$ (e.g., 100-700 $m^2/g$, 200-600 $m^2/g$, 300-500 $m^2/g$) and an average thickness of about 1-15 nm (e.g., 2-12 nm, 4-10 nm, 6-8 nm). Preferably, the GNP have a specific surface area of about 500-700 $m^2/g$ and an average thickness of about 8-12 nm. Exemplary GNP that may be used are available from Cheap Tubes, Inc. and Sigma-Aldrich (e.g., xGnP M-5 having 5 μm particle size, surface area of 120-150 $m^2/g$; xGnP C-750, having a surface area of 750 $m^2/g$, graphene powder (CAS No. 1034343-98-0)).

The NS may be selected from silicon dioxide nanopowders. The silicon dioxide nanopowders may have a particle size of about 20 nm or less. Preferably, the silicon dioxide nanopowders have a particle size ranging from about 5-20 nm. For example, the silicon dioxide nanopowders may have a particle size ranging from about 10-20 nm. Exemplary NS that may be used are available from Sigma-Aldrich (e.g., CAS No. 7631-86-9).

The ratio of GNP:NS in the hybrid nanofiller may range from 25:75 to 75:25, such as 30:70 to 70:30, 35:65 to 65:35, 40:60 to 60:40, 45:55 to 55:45, 50:50. Preferably, the ratio of GNP:NS is 50:50.

The hybrid nanofiller may be present in the nanoparticle-polymer composition in an amount ranging from about 0.1-10 wt. %, more preferably about 0.5-5 wt. %, most preferably about 1-2.5 wt. %, based on the total solid content of the nanoparticle-polymer composition. For example, the hybrid nanofiller may be present in the nanoparticle-polymer composition in an amount of about 1 wt. %.

The hybrid nanofiller may have a particle size ranging from about 40-600 nm (e.g., 50-500 nm, 60-400 nm, 70-300 nm, 80-200 nm, 90-100 nm), preferably 70-120 nm.

The PDMS may have a molecular weight ranging from about 400 $\overline{M}_n$ to 50,000 $\overline{M}_n$ (e.g., 1,000 $\overline{M}_n$ to 25,000 $\overline{M}_n$, 5,000 $\overline{M}_n$ to 20,000 $\overline{M}_n$, 10,000 $\overline{M}_n$ to 15,000 $\overline{M}_n$). Preferably, the PDMS has a molecular weight ranging from about 5000 $\overline{M}_n$ to 10,000 $\overline{M}_n$. The PDMS may have a viscosity ranging from about 25-1,000 cSt (e.g., 65-750 cSt, 100-500 cSt, 200-400 cSt). Preferably, the PDMS has a viscosity of about 750 cSt.

The PDMS may be, for example, a hydroxy-terminated PDMS or a monocarbinol-terminated PDMS.

The PDMS is present in amount ranging from about 4-18 wt. % (e.g., 5-16 wt. %, 6-14 wt. %, 7-12 wt. %, 8-10 wt. %), based on the total solid content of the nanoparticle-polymer composition. Preferably, the PDMS is present in amount ranging from about 7-13 wt. %, based on the total solid content of the nanoparticle-polymer composition.

The silane coupling agent may be at least one aminosilane, such as 3-aminopropyltriethoxysilane (APTES), (3-aminopropyl)-diethoxy-methylsilane (APDEMS), (3-aminopropyl)-dimethyl-ethoxysilane (APDMES), and (3-aminopropyl)-trimethoxysilane (APTMS). Preferably, the silane coupling agent is APTES.

The silane coupling agent is present in amount ranging from about 1-6 wt. %, more preferably about 2-4 wt. %, based on the total solid content of the nanoparticle-polymer composition.

The nanoparticle-polymer composition may also not contain a solvent.

Superamphiphobic Nanoparticles

The superamphiphobic nanoparticles may comprise, consist essentially of, or consist of the reaction product of the silicon dioxide nanoparticles and the FDTS, FDDTS, or mixtures thereof.

The silicon dioxide nanoparticles may be the same or different as the nano-silica (NS) used in the nanoparticle-polymer composition.

Optional Solvents, Curing Agents, and Catalysts

The nanoparticle-polymer composition and/or the superamphiphobic nanoparticles can be prepared in the presence of at least one optional solvent, at least one curing agent, and/or at least one optional catalyst. The type and amount of solvent, curing agent, and catalyst used to prepare the nanoparticle-polymer composition and the superamphiphobic nanoparticles may be the same or different. The solvent, curing agent, and catalyst may be used during any step of the synthesis of the curable coating compositions of the invention.

The solvent that may be used in the invention includes, but is not limited to, hexane, ethanol, toluene, xylenes, n-butyl acetate (nBA), t-butyl acetate (TBA), acetone, methyl ethyl ketone (MEK), methyl n-amyl ketone (MAK), N-methyl pyrrolidone (NMP), ethyl 3-ethoxyproprionate (EEP), and mixtures thereof. The amount of solvent used may vary. For example, the solvent may be present in an amount of about 30%, preferably about 20%, and more preferably about 15% or less. A mixture of two or more solvents may be used. In the case of the use of a mixture of solvents, the amount of solvents used may be calculated such that the final curable coating composition has a target of about 70%, preferably about 80%, and more preferably about 85%, solid in 50/50 w/w solvent blend of the solvent mixture. One or more solvents may be used to solubilize the curable coating compositions. The curable coating compositions of the invention may also contain no solvent.

The curing agent that may be used in the invention can be, for example, aliphatic amines, cycloaliphatic amines, anhydrides, anhydrides, polyamides, or mixtures thereof. Preferably, the curing agent is a polyamide and/or a polyamine (e.g., EPIKURE™ Curing Agent 3175 and EPIKURE™ Curing Agent 3164 from Hexion, Inc.). The curing agent may be present in an amount ranging from about 19-38 wt. % (e.g., 24-36 wt. %, 26-34 wt. %, 29-32 wt. %), based on the total solid content of the curable coating composition.

The catalyst that may be used in the invention can be organometallic complexes, organic bases, or mixtures thereof. Examples of organometallic compounds include, but are not limited to, dibutyl tin dilaurate, dibutyl tin diacetate, dimethyl-dineodacanoate tin (DMDN-Sn), di-n-butyl bis(2-ethylenehexanoate) (DBBE-Sn), tin (II) oleate, tetrakis(acetoxydibutyl tinoxy)silane (TKAS), bismuth carboxylate, and compounds of zirconium and aluminum, such as, but not limited to, K-Kat® 4205, K-Kat® 5218, and K-Kat® XC-6212. Examples of organic base catalysts includes, but is not limited to, 1,4-diazabicyclo[2.2.2]octane, which is sold under the DABCO® trade name by Air Products. The amount of catalyst used may vary. For example, the catalyst may be present in an amount ranging from about 0.04-0.13 wt. %, preferably about 0.06-0.08 wt. %, and more preferably about 0.07 wt. %, based on the total solid content of the curable coating composition.

Pigments, Additives, Solvents, and Fillers

Pigments and other additives known in the art to control coating rheology and surface properties can also be incorporated in the curable coating composition of the invention. For example, a curable coating composition of the invention may further contain coating additives. Such coating additives include, but are not limited to, one or more leveling, rheology, and flow control agents such as silicones, fluorocarbons, or cellulosics; extenders; reactive coalescing aids such as those described in U.S. Pat. No. 5,349,026, incorporated herein by reference; plasticizers; flatting agents; pigment wetting and dispersing agents and surfactants; ultraviolet (UV) absorbers; UV light stabilizers; tinting pigments; colorants; defoaming and antifoaming agents; anti-settling, anti-sag and bodying agents; anti-skinning agents; anti-flooding and anti-floating agents; biocides, fungicides and mildewcides; corrosion inhibitors; thickening agents; or coalescing agents. Specific examples of such additives can be found in Raw Materials Index, published by the National Paint & Coatings Association, 1500 Rhode Island Avenue, N.W., Washington, D.C. 20005. Further examples of such additives may be found in U.S. Pat. No. 5,371,148, incorporated herein by reference.

Examples of flatting agents that may be used in the coatings of the invention include, but are not limited to, synthetic silica, available from the Davison Chemical Division of W. R. Grace & Company as SYLOID®; polypropylene, available from Hercules Inc., as HERCOFLAT®; synthetic silicate, available from J. M. Huber Corporation, as ZEOLEX®.

Examples of viscosity, suspension, and flow control agents that may be used in the curable coating compositions of the invention include, but are not limited to, polyaminoamide phosphate, high molecular weight carboxylic acid salts of polyamine amides, and alkylene amine salts of an unsaturated fatty acid, all available from BYK Chemie U.S.A. as ANTI TERRA®. Further examples include, but are not limited to, polysiloxane copolymers, polyacrylate solution, cellulose esters, hydroxyethyl cellulose, hydroxypropyl cellulose, polyamide wax, polyolefin wax, hydroxypropyl methyl cellulose, polyethylene oxide, and the like.

Solvents may also be added to the curable coating compositions of the invention to reduce the viscosity, some of which may also be used in the synthesis of the nanoparticle-polymer composition and/or the superamphiphobic nanoparticles, as discussed above. For example, hydrocarbon, ester, ketone, ether, ether-ester, alcohol, or ether-alcohol type solvents may be used individually or in mixtures. Examples of solvents that can be added to the curable coating compositions of the invention include, but are not limited to benzene, toluene, xylene, aromatic 100, aromatic 150, acetone, methylethyl ketone, methyl amyl ketone, butyl acetate, t-butyl acetate, tetrahydrofuran, diethyl ether, ethylethoxy propionate, isopropanol, butanol, butoxyethanol, and so on. Alternatively, the solvent system may include water or be water-based (>50% water in the solvent system).

Fillers may also be added to the curable coating compositions of the invention, including, but not limited to, calcium carbonate such as calcite, dolomite, talc, mica, feldspar, barium sulfate, kaolin, nephelin, silica, perlite, magnesium oxide, and quartz flour, etc. Fillers (and pigments) may also be added in the form of nanotubes or fibers, thus, apart from the before-mentioned examples of fillers, the curable coating composition may also comprise fibers, e.g., those generally and specifically described in WO 00/77102, incorporated herein by reference.

The invention also relates to a method for making the curable coating composition of the invention.

The invention also relates to a cured coating composition comprising, consisting essentially of, or consisting of the curable coating composition of the invention. The curable coating compositions of the invention may be cured at ambient or elevated (e.g., about 80° C.) temperatures.

The invention further relates to a metal or non-metal substrate or an object coated with the curable coating composition of the invention. Preferably, the object is a metal substrate (e.g., a steel oil pipe or a steel gas pipe).

The invention also relates to a method for coating the surface of a substrate (e.g., a steel oil pipe or a steel gas pipe) comprising, consisting essentially of, or consisting of the steps of:

applying the nanoparticle-polymer composition of the curable coating composition of the invention to at least a part of the surface of the substrate to form a first coated surface, curing the first coated surface to form a cured first coated surface, optionally, applying the superamphiphobic nanoparticles of the curable coating composition of the invention to the cured first coated surface to form a second coated surface, and curing the second coated surface.

The curable coating composition of the invention is typically applied to at least a part of the surface of a substrate. The term "applying" is used in its normal meaning within the paint industry. Thus, "applying" is conducted by means of any conventional means, e.g., by brush, by roller, by spraying (e.g., convention air-atomized spray, airless spray, HVLP), by dipping, by drawdown, etc. The commercially most interesting way of "applying" the curable coating composition of the invention is by spraying. Hence, the coating composition is preferably sprayable. Spraying is effected by means of conventional spraying equipment known to the person skilled in the art. The coating is typically applied in a dry film thickness of about 50-600 µm, such as about 50-500 µm (e.g., 75-400 µm, 20-150 µm, 30-100 µm).

The term "at least a part of the surface of a substrate" refers to the fact that the curable coating composition of the invention may be applied to any fraction of the surface (or, for that matter, the entire surface). For many applications, the curable coating composition is at least applied to the part of the substrate where the surface may encounter water.

The term "substrate" means a solid material onto which the curable coating composition is applied. The substrate typically comprises a metal such as steel, iron, aluminum, or glass- or carbon-fiber composite, but also includes wood, plastic, and glass. The substrate may be a metal substrate, in particular a steel substrate. The metal substrate may be coated with an anticorrosive coating such as an anticorrosive epoxy-based coating, e.g., cured epoxy-based coating, or a shop-primer, e.g., a zinc-rich shop-primer. The substrate may also be a glass-fiber reinforced polyester substrate, optionally coated with an epoxy primer coating. The substrate may be at least a part of the outermost surface of a marine structure.

The term "surface" is used in its normal sense, and refers to the exterior boundary of an object. Particular examples of such surfaces are the surface of marine structures, such as vessels (including, but not limited to, boats, yachts, motorboats, motor launches, ocean liners, tugboats, tankers, container ships and other cargo ships, submarines, and naval vessels of all types), pipes, shore and off-shore machinery, constructions and objects of all types such as piers, pilings, bridge substructures, water-power installations and structures, underwater oil well structures, nets, and other aquatic culture installations, and buoys, etc.

The surface of the substrate may be the "native" surface (e.g., the steel surface). However, the substrate is typically coated, e.g., with an anticorrosive coating, so that the surface of the substrate is constituted by such a coating. When present, the anticorrosive coating is typically applied in a total dry film thickness of 20-200 µm, such as 50-150 µm, e.g., 80-125 µm. Alternatively, the substrate may carry a paint coat, e.g., a worn-out fouling release paint coat, or similar. One advantage of the curable coating compositions described herein is that they can be applied directly onto the primed surface without a tie-coat. However, the curable coating compositions described herein can also be applied onto a tie-coat if desired.

The method of the invention may result in the substrate having improved mechanical protection properties, corrosion protection properties, water repellency, and/or oil repellency.

EXAMPLES

Materials

All chemicals and nanofiller were purchased commercially and used as received without any purifications. The silicon dioxide nanopowders were purchased from Sigma-Aldrich Inc., USA; with a particle size of 10-20 nm and a surface area of 175-225 m$^2$/g. Graphene nanoplatelets with an average specific surface area of 500-700 m$^2$/g and an average thickness of 8-12 nm were used as one type of nanofiller and were purchased from Cheap Tubes Inc., USA. EPON™ Resin 828 resin and EPIKURE™ Curing Agent 3175 were obtained from Hexion Inc., USA, and were used as the epoxy resin and curing agent, respectively. EPON™ Resin 828 is a bisphenol A/epichlorohydrin derived liquid epoxy resin and can provide good mechanical, adhesive, dielectric and chemical resistance properties when crosslinked with appropriate curing agents. EPIKURE™ Curing Agent 3175 was used as the curing agent of EPON™ Resin 828.

Hydroxy-terminated poly(dimethylsiloxane) (PDMS, 0.97 g/mL at 25° C.), 3-aminopropyltriethoxysilane (APTES, 0.97 g/mL at 25° C.), dibutyl tin dilaurate (DBTDL, 1.066 g/mL at 25° C.), hexadecane, hexane, and ethanol were purchased from Sigma-Aldrich (USA). 1H,1H,2H,2H-Perfluorodecyltrichlorosilane (FDTS, 1.540 g/mL at 25° C.) was obtained from Alfa Aesar (USA). S-36 steel Q-panels with a surface roughness of 0.5~1.14 µm were used as metallic substrates for the developed coatings (0-Lab, USA).

Example 1

1.1 Fabrication of Nanocarbon-Reinforced Epoxy Composites

Figure 38:
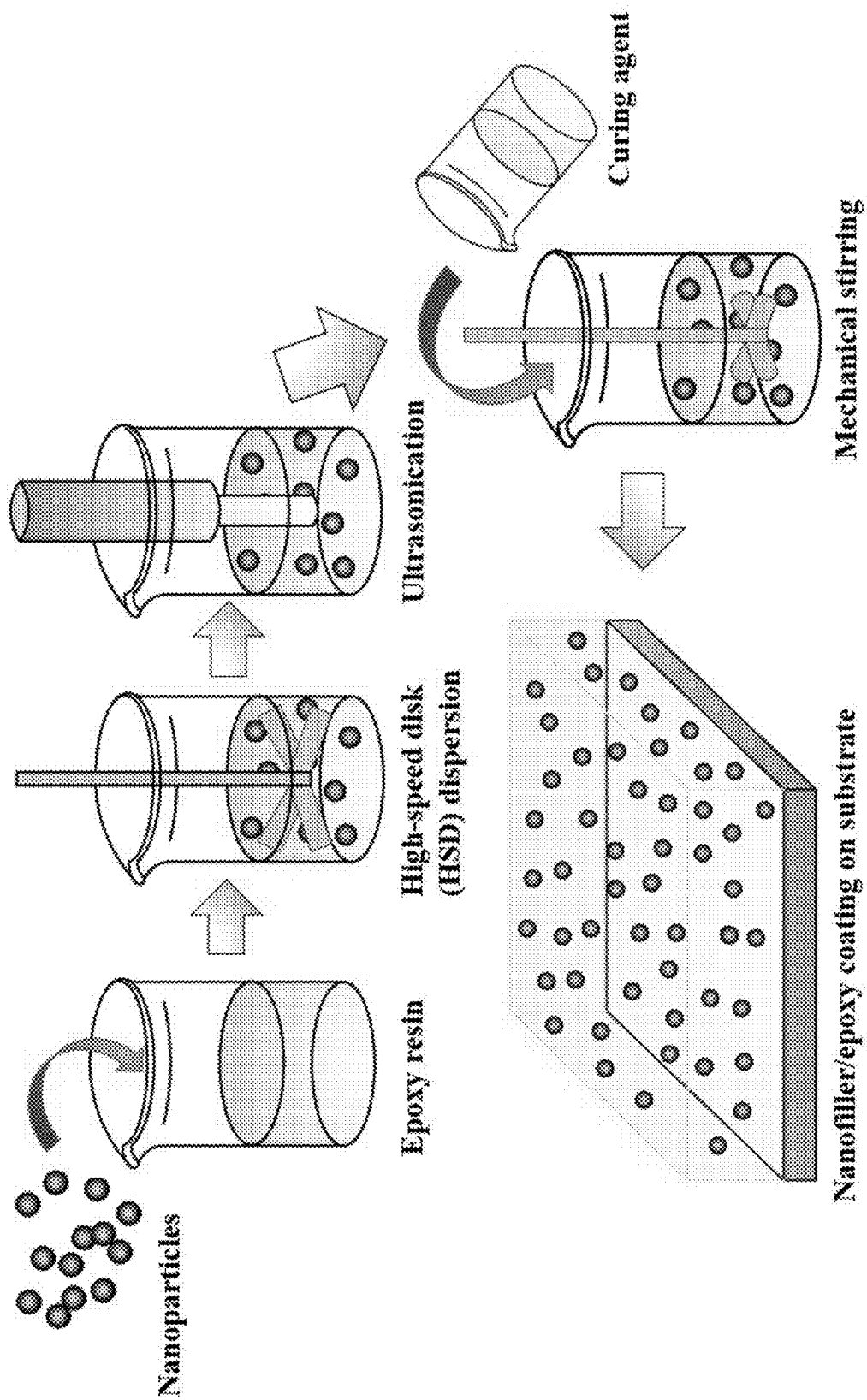
FIG. 38 shows a schematic of the fabrication process.
Figure 39B:
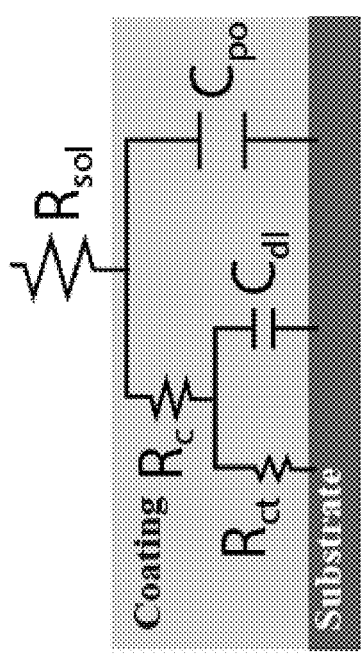
FIGS. 39(a)-39(d) show the equivalent electrical circuit models with four stages FIG. 39(a)-FIG. 39(d).
Figure 39D:
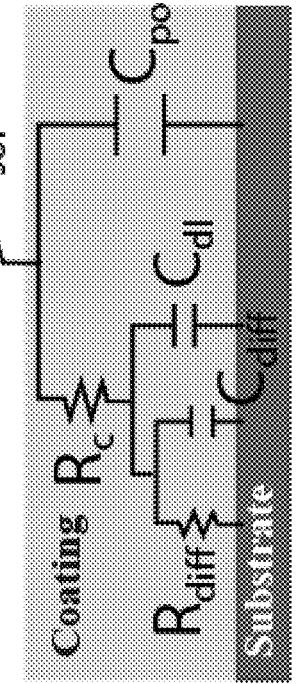
Figure 39A:
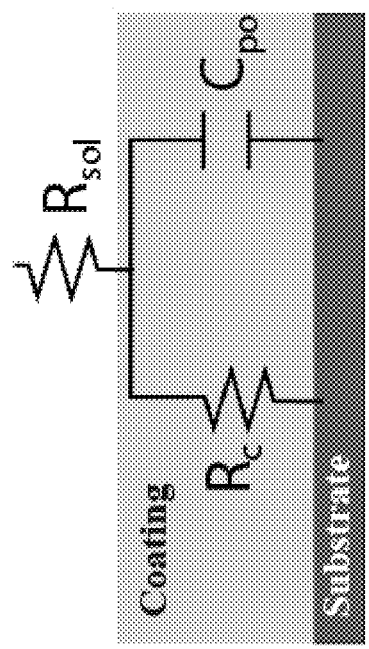
Figure 39C:
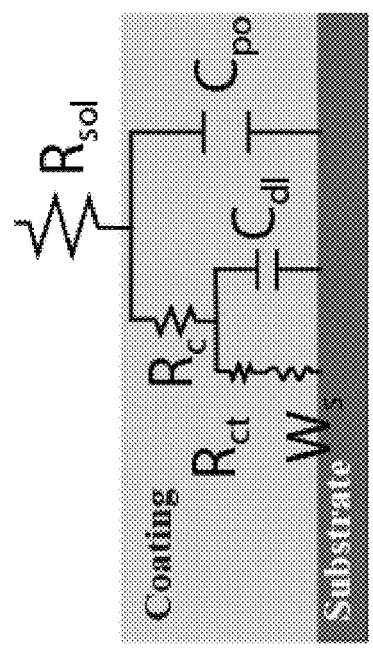

As illustrated in FIG. 38, the nanofillers were dispersed into epoxy matrix by the integration of High-speed disk (HSD) and ultrasonication dispersion methods. The nanofiller particles were added into EPON 828 before the dispersion. The mixture was first mixed by the high-speed disk disperser with a rotation speed 4000 rpm of for 30 mins, which allowed the large particles broken down by the shear stress. To ensure a good dispersion, the solution was followed by ultrasonication with a ¾" probe at 100% amplitude with a total duration of 60 mins, using a 30 s on/off cycle. After dispersion procedure, the resin was mixed with EPIKURE™ Curing Agent 3175 (with a 1:1 mole ratio) by mechanical stirring for 10 mins. The prepared nanocomposites were applied onto difference substrates to fabricate specimens for the varied experiments. Hybrid filler with a combination of GNP and NS was produced, and the concentration of hybrid filler was fixed at 1.0 wt. % with a ratio of 0.25:0.75, 0.5:0.5, and 0.75:0.25. Meanwhile, neat epoxy specimens and epoxy with single nanofiller were used as references.

1.2 Characterization Methods 1.2.1 Electrochemical Corrosion Resistance Test Electrochemical impedance spectroscopy (EIS) test was used to characterize the anticorrosion barrier performance of the coatings. The main applications of EIS test are coating performance evaluation, electrochemical mechanisms and rate analysis, and barrier performance. Gamry Reference 600 Spectroscopy was used to measure the impedance vs. frequency curve, and the obtained curves were used to study the corrosion resistance of the test coatings. During the test, a 3-cm diameter O-ring glass tube with silicon joint was clamped on the test panel. A saturated calomel electrode reference electrode was used for the reference electrode; thus, a platinum mesh was employed as the counter electrode and steel panel was worked as the working electrode. In order to confirm the longer-term corrosion resistance performance, salt spary tests was applied as accelerated durability test. The samples were exposed to a salt fog atmosphere in a Q-Lab Corporation Q-Fog CCT chamber with ASTM B117 specifications. The impedance curves were measured after 100 and 500 hours exposure to evaluate their overall long-term performance. As shown in FIG. 39, equivalent electrical circuits models (EEC) were used to analyze the EIS data and presented as four stages. Model A is to describe the coatings remaining intact the initial stage, where Rsol is solution resistance, Rc is coating resistance and Cpo is constant-phase element of the coating (FIG. 39($a$)). Model B is to represent the initiation of the corrosion reaction, that is, the electrodes were able to penetrate the coating layer to contact with the metal substrate (FIG. 39($b$)). The model B is to simulate the coating-substrate interface, where Rct is charge transfer resistance and Cdl is constant phase element of double-charge. Model B with W is the third stage including the Warburg impedance element (W) when the diffusion effect dominates corrosion (FIG. 39($c$)). The Warburg impedance element indicates that the electrochemical corrosion reactions in the coating-substrate interface is diffusion-controlled. The model C is for the description of severe corrosion damage experienced in the coating, assuming that a thin corrosion product layer is accumulated at the presence of corrosion products and new parameters of constant phase element of diffusion capacitance (Cdiff) and diffusion resistance (Rdiff) are introduced to describe the corrosion product layer (FIG. 39($d$)).

1.2.2 Abrasion Resistance Test

Taber Abraser method was applied to examine the wear resistance of the nanocomposites by the selected abrading wheels and applied loads. With the applied load and the rotation of sample, a circular abrasion mark with an area approximately 30 cm$^2$ will be formed by the abrading wheel. The abrasion resistance is calculated as the mass loss in a specified number of abrasion cycles with the selected loads. Each specimen was tested for a total of 1000 cycles, 1000 g of the load was used during the test, and the rotational speed is 72 rpm with two CS-10 abrading wheels.

1.2.3 Coupon Tension Test

The determination of the tensile properties of CNT reinforced polymer coating was done by the coupon tensile test (ASTM D638). The test was performed by Shimadzu's EZ-X tester (with a testing speed of 1 mm/min). The hardened coupon specimens were clamped at two ends by the grips during the test. Tensile strength was applied to elongate the specimens during the test until the specimens were broke in the narrow cross-sectional test section. Maximum tensile strength and Young's modulus were determined for each specimen.

1.2.4 Water Contact Angle Test

Contact angle test (ASTM D7334) was employed to determine the water-repellency properties indirectly as the obtained results indicate the ability of a liquid to maintain contact with the coated surface. Images were captured by the camera and processed by a computer to calculate the angle between the drop and the substrate.

1.2.5 Nanocomposite Characterization

The particle size distribution of the nanofillers was investigated by dynamic light scattering (DLS) with a submicron particle sizer (Nicomp 380). Furthermore, JEM-2100 high-resolution analytical TEM instrument was used to examine the morphologies and microstructures of single and hybrid nanofillers. The nanofiller were dispersed into ethanol with a proper weight ratio before TEM observation. The size and shape of nanofillers were studied by the obtained TEM images. The nanoparticle structure of the nanofiller were analyzed by Powder X-Ray Diffraction (XRD) patterns which was recorded by a Bruker AXS' D8 Discover multi-purpose X-Ray Diffractometer. The obtained results were used to characterize the nanofiller and also determine the degree of exfoliation.

FTIR analysis was conducted to the neat epoxy and nanocomposites to study reaction mechanism of epoxy resin and the nanofillers. FTIR spectra of neat epoxy, single filler, and hybrid filler composite were obtained by a Thermo Scientific Nicolet 8700 spectrometer.

The micrographs were obtained by a field emission scanning electron microscope (FE-SEM), with a JSM-7600F Schottky at 2 KV. Visual assessment of the prepared samples was able to be performed with this advanced electron microscopy technique. The obtained images from the fractured surface of samples were used to study the dispersion and agglomeration of the different nanofillers. Meanwhile, the SEM images of the abraded sample were used to investigate the relation between surface morphology and water repellency. Surface roughness analysis was performed with an atomic force microscopy, carried out on a Nanoscope IIIa system. Both 2-D and 3-D images were collected in "tapping-mode". By scanning the surface of the coating with a sample-probe, the height changes were recorded, and three-dimensional images will be formed in the process. The obtained data can also be used to analyze the surface roughness of the tested samples.

1.3 Results and Discussion

This section presents the evaluation of the "hybrid effect" on mechanical, electrical, and tribological properties in epoxy nanocomposites. The exemplified hybrid nanofiller composites were combinations of CNT and GNP, CNT and NS, GNP and NS. For each type of filler, the concentration of the nanofiller was fixed at 1 wt. % with five different mix ratios: 0:1, 25:75, 50:50, 75:25, and 1:0.

1.3.1 Characterization of GNP/NS Nanohybrids

Figure 1D:
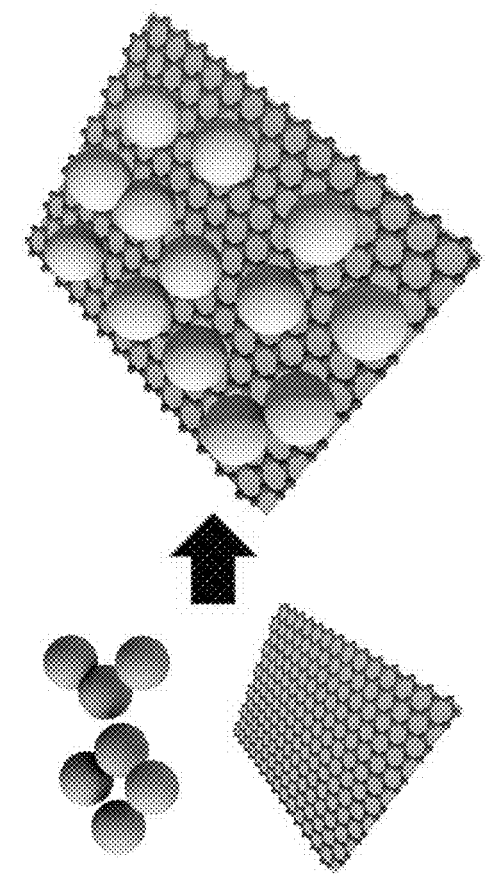
Figure 1A:
Figure 1C:
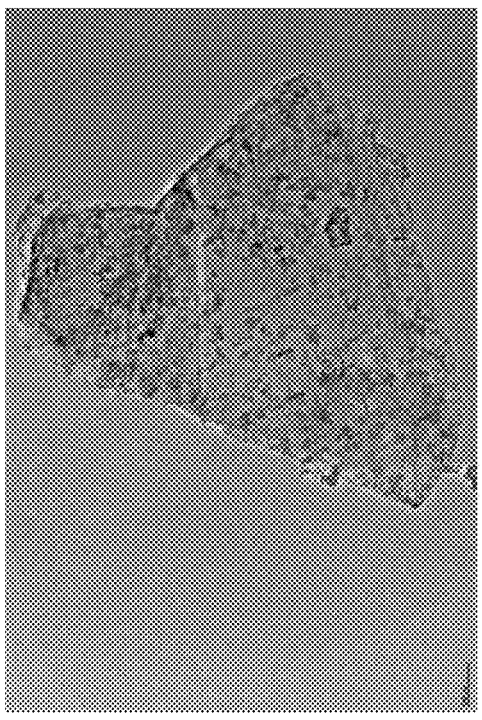

Transmission electron microscopy (TEM) images of GNP, NS and GNP/NS hybrid nanofillers was displayed in FIG. 1(a)-(c), respectively. The TEM graphs at high resolution allow one to observe the nanoparticles virtually and the observation was used to characterize the micro-structures of the nanoparticles.

As shown in FIGS. 1(a) and (b), the GNP and NS nanoparticles could be defined as zero (NS), and two-dimensional (GNP) materials as there were 0, and 2 dimensions larger than 100 nm, correspondingly. The GNP were observed as stacked single layers sheets with an extremely small thickness. Furthermore, homogeneous size distribution of the spherical particles was identified in NS, with an average diameter of 15 nm. FIG. 1(c) presented direct evidence for the formation of the GNP/NS hybrid nanofillers. The images confirmed that the NS particles have uniformly hanged on the surface of GNP. Apparently, the NS particles were attached to the GNP during the dispersion procedure, which high-speed dispersion and ultrasonication were introduced. Overall, a unique three-dimensional structure was developed in the hybrid nanofillers by combining GNP and NS, as illustrated in FIG. 1(d). Yu et al., *Fibers Polym.*, 17(3):453-459, 2016.

1.3.2 X-ray Powder Diffraction (XRD)

Figures 2A, 2B, 2C:
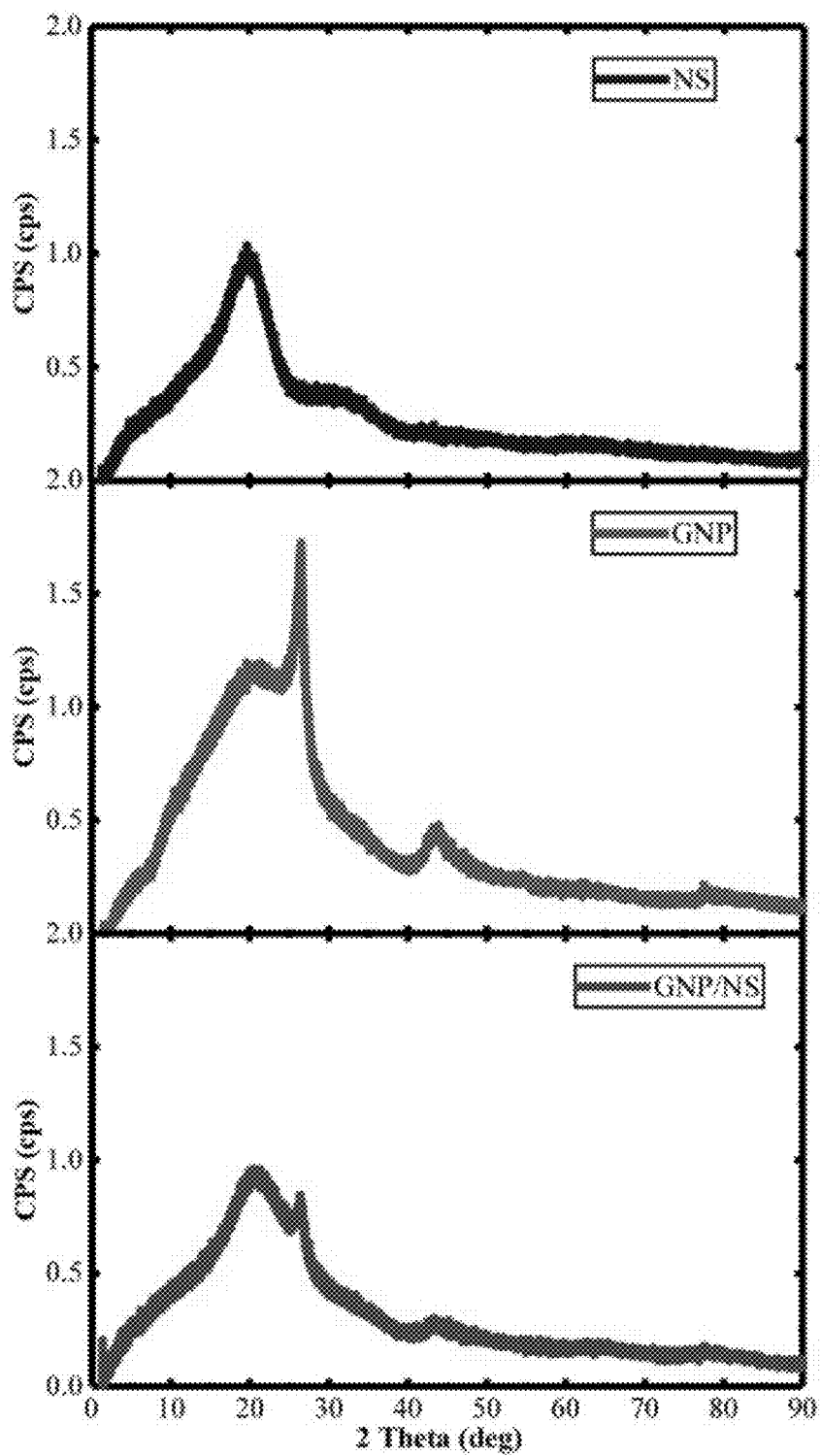
FIGS. 2(a)-2(c) show the X-ray powder diffraction (XRD) curves of FIG. 2(a) GNP, FIG. 2(b) NS, and FIG. 2(c) GNP/NS hybrid filler.

The XRD patterns were conducted to demonstrate the degree exfoliation of various fillers. Wan et al., *Compos. Sci. Technol.*, 82:60-68, 2013. GNP exhibited as crystalline solids with a sharp peak at 26.5°, corresponding highly-ordered nanoparticle structure with an interlay spacing of 3.4 nm, as shown in FIG. 2. For the Nano-silica samples, a broad peak was appeared 19.5°, indicating the assigned $SiO_2$ particles were distributed with an interlayer spacing of 4.5 nm. The broad shaped peak confirmed that the amorphous nature of the Nano-silica. Ammar et al., *Surf Coat. Technol.*, 324:536-545, 2017.

Apart from that, it was clear that the hybrid filler showed two weak diffraction peaks at 26.5° and 19.5° (FIG. 2), attributed to the GNP and NS, respectively. However, note that the intensity of both peaks was weakened compared with singles fillers, especially the peaks that assigned to GNP, indicating proper intercalation and an increased degree exfoliation of GNP sheets in the matrix. Ramezanzadeh et al., *Chem. Eng. J.*, 303:511-528, 2016. The improved exfoliation state in the hybrid system suggested that the presence of NS particles destroyed the agglomerate of GNP sheets during the dispersion procedure, and after that, the covered NS on the GNP sheets has prevented them restacking together. Pourhashem et al., *Surf. Coat. Technol.*, 311:282-294, 2; Wan et al., *Compos. Sci. Technol.*, 82:60-68, 2013; Ramezanzadeh et al., *Chem. Eng. J.*, 303:511-528, 2016; Yu et al., *Fibers Polym.*, 17(3):453-459, 2016.

1.3.3 Particle Size Analysis

Figure 3:
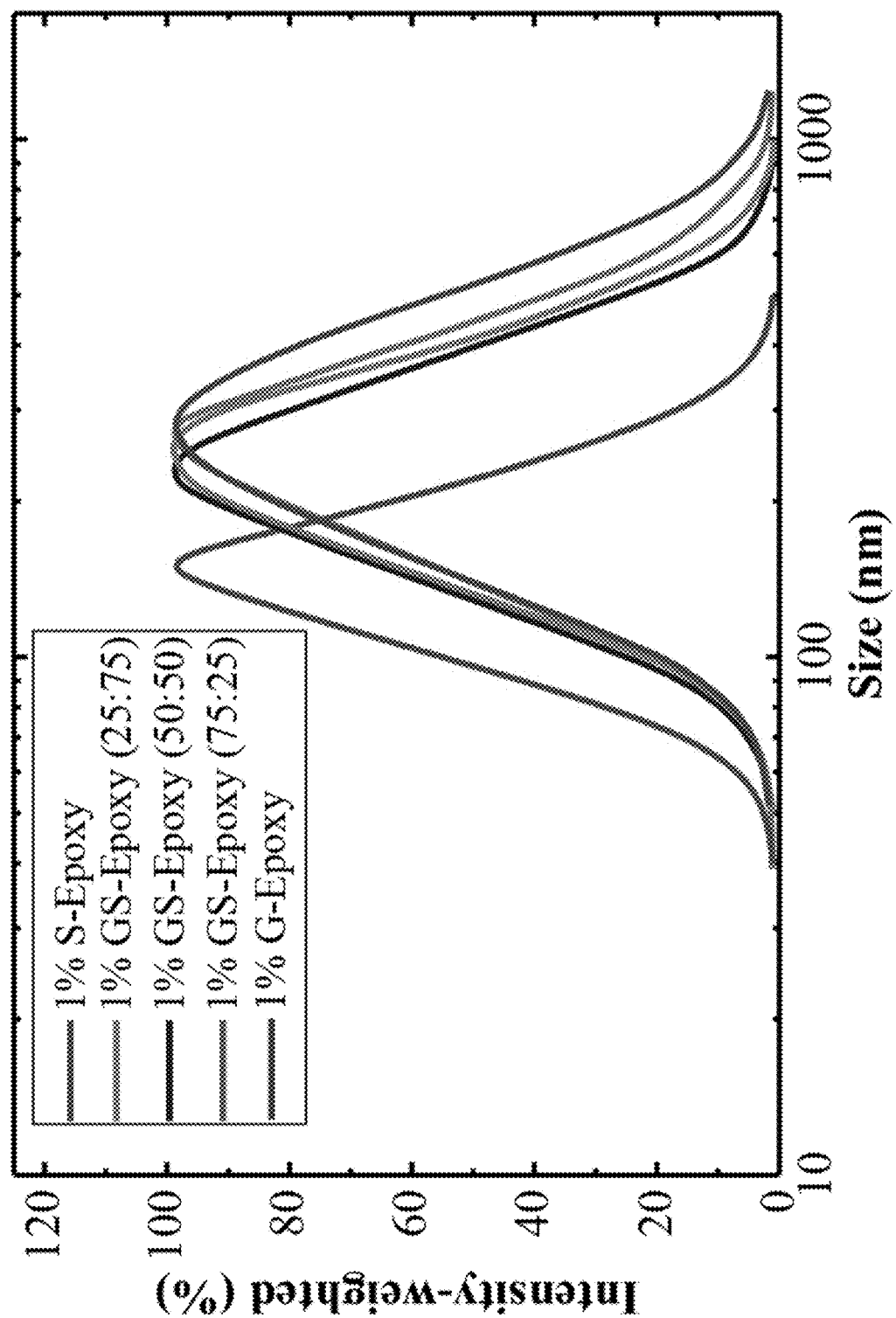
FIG. 3 shows the particle size distribution of single and hybrid nanofillers.
Figure 4B:
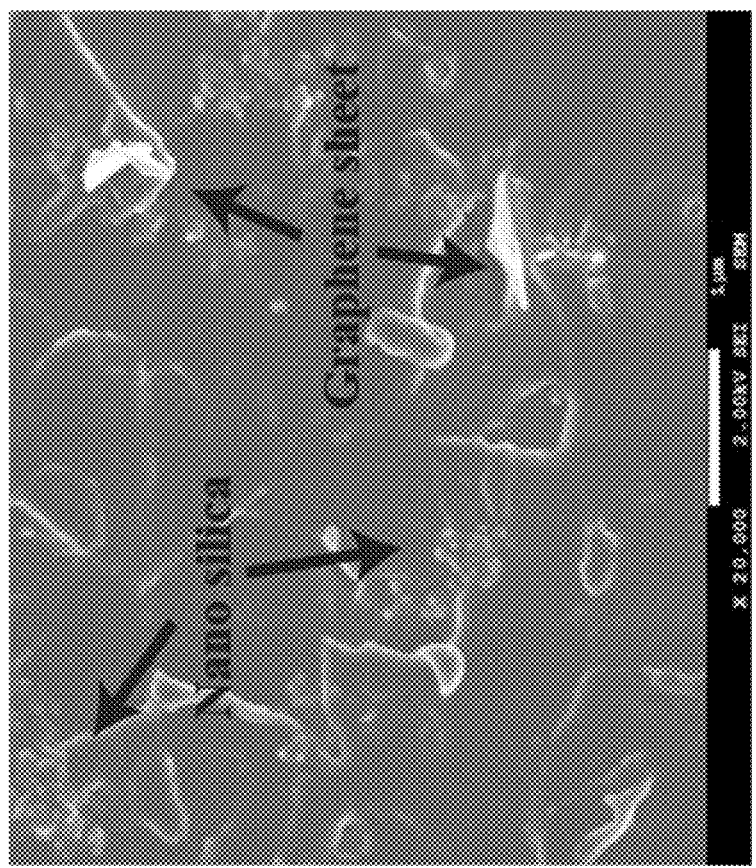
FIGS. 4(a)-4(b) show the SEM cross section image of FIG. 4(a) 1% S-Epoxy and FIG. 4(b) 1% GS-Epoxy (50:50).

To get more information on the synergistic effect of hybrid nanofillers, the particle size distributions of single and hybrid fillers were measured by a dynamic light scattering (DLS) analyzer. Particle size distributions of GNP, NS, and the hybrid filler were illustrated in FIG. 3. A narrow size distribution was observed in NS particles, and most of the particles were ranged in 70-120 nm. The results revealed that the NS particles were further stacked up after dispersion as the NS particles were purchased commercially with a size 10-20 nm. Particle size of the GNPs were in the range of 100 to 1000 nm, and it has been confirmed by the TEM images (FIG. 1(a)) that the GNP particles were stacked up sheets. As observed that the particle size distribution of the GNP/NS hybrid fillers was narrower than GNP particles, and also the average size was much smaller than the GNP particles. These observations indicated that the dispersion level was significantly improved in the hybrid filler system with a reduced tendency to agglomeration. Abdollahi et al., *Ind. Eng. Chem. Res.*, 53(27):10858-10869, 2014. The formation of nanoparticles aggregates was mitigated, which was further confirmed by the SEM images (FIG. 4).

Figure 4A:
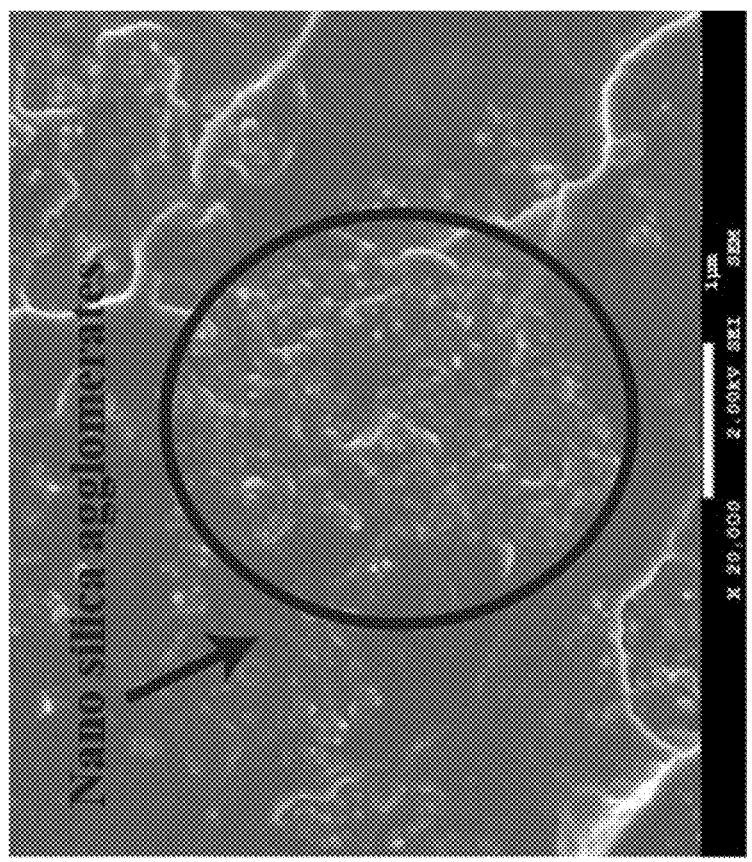

FIGS. 4(a) and (b) illustrated as typical examples to present the interfacial bonding between the nanofillers and polymer matrices. Compare with FIG. 4(a), which displayed a rich NS domain area with a large NS agglomerate; the results indicated that the dispersion of NS were significantly changed by the presence of the GNPs (FIG. 4(b)). The well-dispersed GNPs can inhibit or mitigate the formation of NS aggregates in the polymer matrix. It could be easily observed that some nanofillers were wrapped with the epoxy resin and partially pulled out from the fracture surface. The nanofillers were surrounded by the polymer which could provide more effective reinforcement. Overall, strong bonding between the hybrid nanofiller and polymer matrices was obtained as both GNP and NS were embedded into the epoxy.

1.3.4 Fourier-Transform Infrared Spectroscopy (FTIR)

Figure 5:
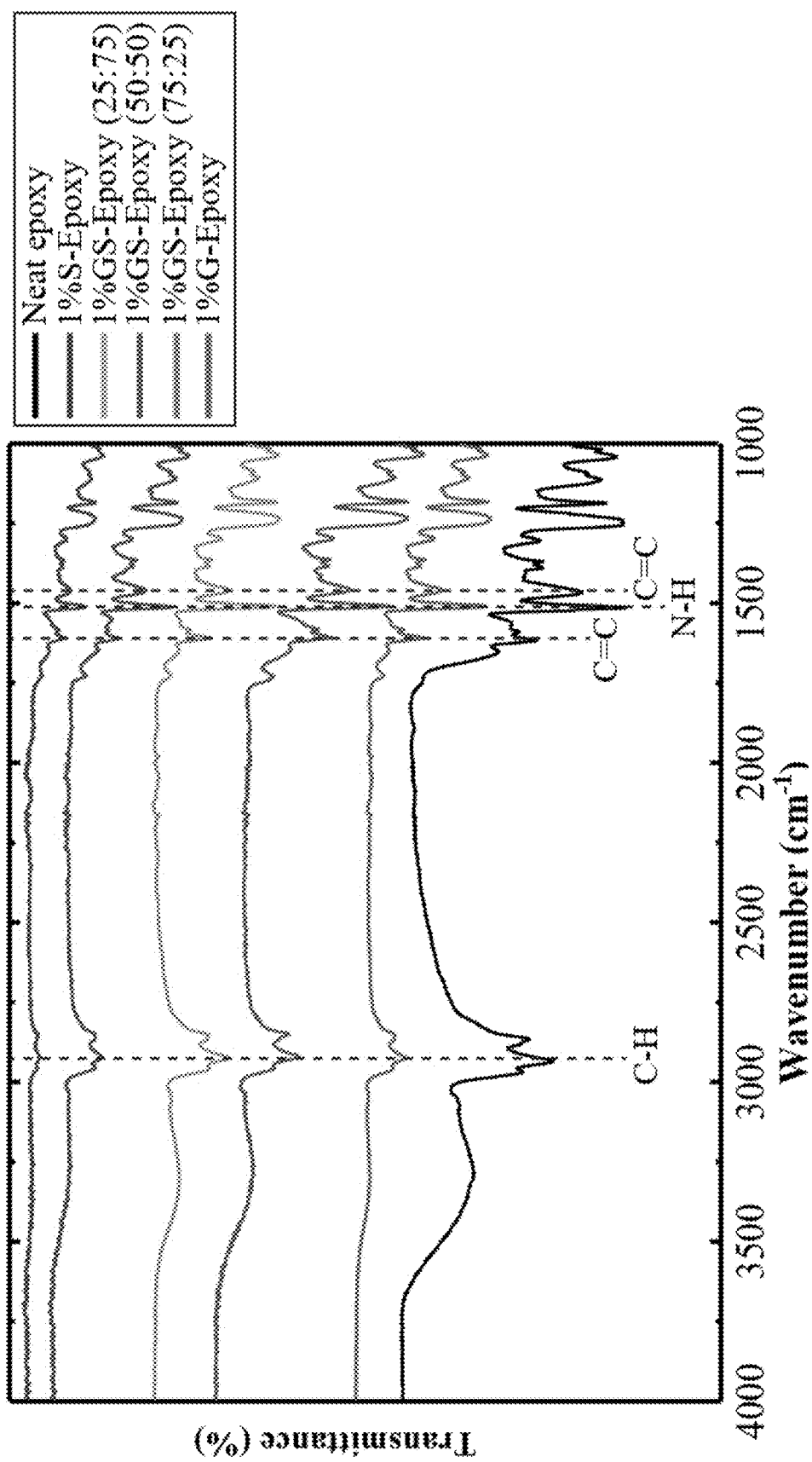
FIG. 5 shows the FTIR spectra of nanofiller/epoxy composites.

FTIR analysis was conducted on neat epoxy, single filler/epoxy, and hybrid filler/epoxy nanocomposites to understand the possible chemical reaction between polymer and nanofillers. The characteristic peaks (FIG. 5) for all the samples were very similar which could be proof of that there was no chemical reaction between polymer and nanofillers. Several peaks were pointed out to characterize the neat epoxy and nanocomposites. The peak at 2920 cm$^{-1}$ was due to the C—H stretch of the polymer backbone, and the peaks at 1607, and 1456 cm$^{-1}$ were used to characterize the DGEBA epoxy resin which were attributable to the aromatic ring stretching of C═C. Nuruddin et al., *Polym. Polym. Compos.*, 25(4):273, 2017; Ji et al., *Express Polym. Lett.*, 10(11):950, 2016; Yang et al., *J. Appl. Polym. Sci.*, 110(5): 2980-2988, 2008.

The peak for the N—H deformation around 1507 cm$^{-1}$ represented the primary amine of hardener used for epoxy resin. It was clear to observe that the intensity of this peak in all the nanofiller/epoxy composites was decreased compared with neat epoxy, this may probably because some amino groups did not take parts in ring-opening polymerization reaction due to the agglomeration of nanoparticles. However, the intensity of hybrid filler composites was significantly stronger than both 1% G-Epoxy and 1% S-Epoxy at this peak, indicated agglomeration was dramatically reduced in the hybrid filler group, especially 1% GS-Epoxy (50:50). Nuruddin et al., *Polym. Polym. Compos.*, 25(4): 273, 2017; Gonzalez et al., "Applications of FTIR on epoxy resins-identification, monitoring the curing process, phase separation and water uptake," in *Infrared Spectroscopy-Materials Science, Engineering and Technology*, InTech, 2012.

1.3.5 EIS Spectra Analysis

EIS measurement of the specimens were performed to characterize the corrosion resistance of the nanocomposite coatings during exposure. FIG. 6(a)-(f) present the Bode plots for steel substrate coated by different coatings when exposed to salt spray for 0, 100, and 500 hours. The values of impedance modulus at low frequency region (commonly use 0.01 Hz) in the Bode plots could be employed as an indicator of the corrosion barrier performance of the coatings. Qiu et al., *ACS Appl. Mater. Interfaces*, 9(39):34294-34304, 2017. Moreover, the phase angle is an effective indicator of the intactness and damage of corrosion protection coatings. Principally, the phase angles of an intact coating would reach up mostly approached 90° in a wide frequency region, the decrease of the minimum phase angle value and the increase of the breakpoint's frequency present the degree of coating delamination. de Leon et al., *ACS Appl. Mater. Interfaces*, 4(6):3169-3176, 2012; Ramezanzadeh et al., *Prog. Org. Coat.*, 72(3):410-422, 2011.

Initially, the collected data indicated that the neat epoxy coating was incapable to behave as an intact coating for corrosion protection, as a clear bend of was observed in phase angle curve in the tested frequency region. Compared with the neat epoxy, the phase angle remained close to 90 degrees in all the tested frequency, which reflected that the coating films behaved as an intact layer to protect the substrates. Moreover, all the nanofiller/epoxy groups exhibited higher impedance, suggesting that the protective coatings have excellent corrosion barrier performance. Obviously, the hybrid filler groups displayed stronger corrosion resistance reinforcement than the single filler groups, as the increase in $|Z|_{0.01\ Hz}$ values and phase angle. The values of $|Z|_{0.01\ Hz}$ for the GS-Epoxy coatings were around 7^10, higher than the neat epoxy coating by 1 order. Overall, it turned out that model A in FIG. 39(a) was suitable for all the nanofiller/epoxy groups at the fresh stage, and the performance of neat epoxy could be described as Model B with Warburg impedance element. The corresponding EEC models for the test specimens at different exposure hours were summarized in Table 1.

TABLE 1

EIS data associated with different stages of the equivalent electrical circuit models.

| Label | Weight ratio of GNP and NS | Exposure to accelerated environmental stresses | | |
|---|---|---|---|---|
| | | Onset | 100-hr | 500-hr |
| Neat epoxy | / | Model B with W | Model B with W | Model C |
| 1% S-Epoxy | 0:1 | A | B with W | B |
| 1% GS-Epoxy(25:75) | 25:75 | A | B with W | B with W |
| 1% GS-Epoxy(50:50) | 50:50 | A | A | A |
| 1% GS-Epoxy(75:25) | 75:25 | A | A | B with W |
| 1% G-Epoxy | 1:0 | A | B | B with W |

Figure 6B:
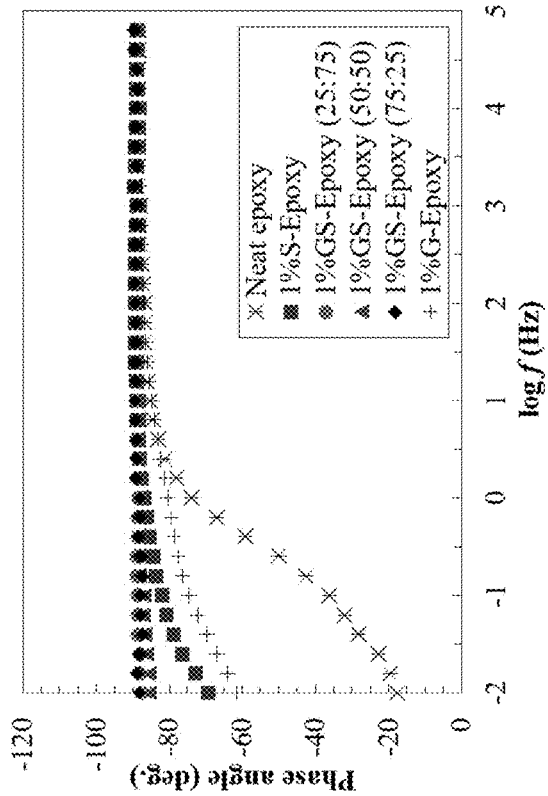
FIGS. 6(a)-6(f) show the impedance curve and phase angle curve of the GNP/NS epoxy before exposure (FIG. 6(a) and FIG. 6(b), respectively), and after 100 hours (FIG. 6(c) and FIG. 6(d), respectively), and 500 hours (FIG. 6(e) and FIG. 6(f), respectively).
Figure 6D:
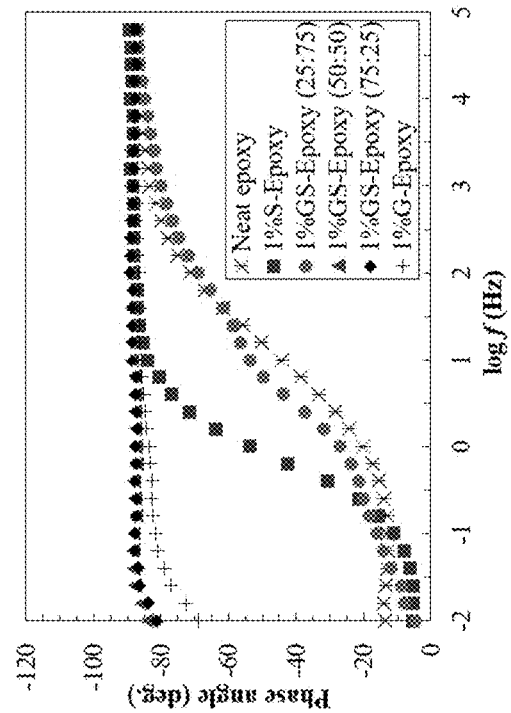
Figure 6A:
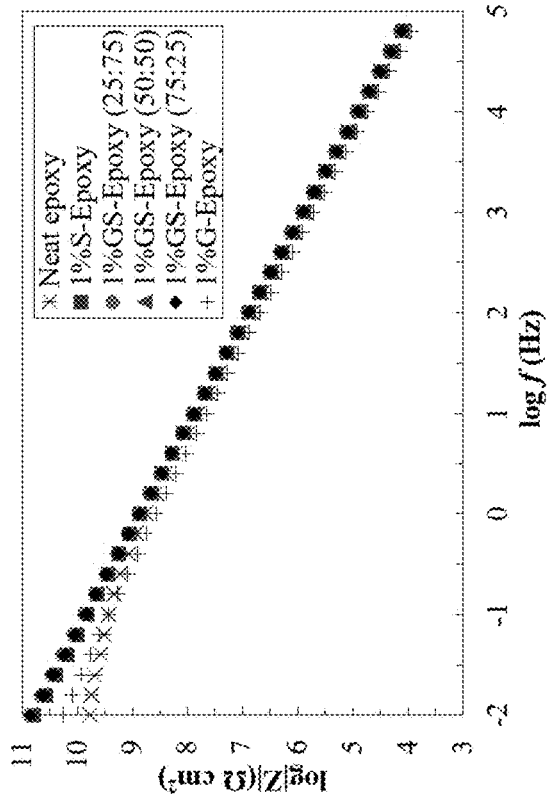
Figure 6C:
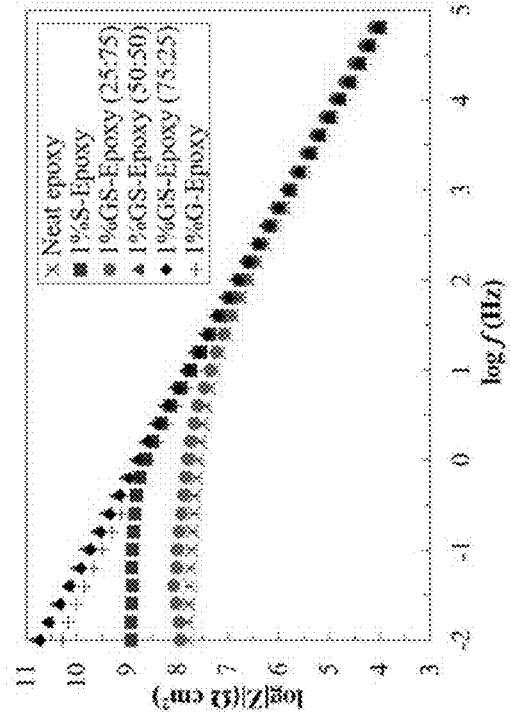
Figure 6F:
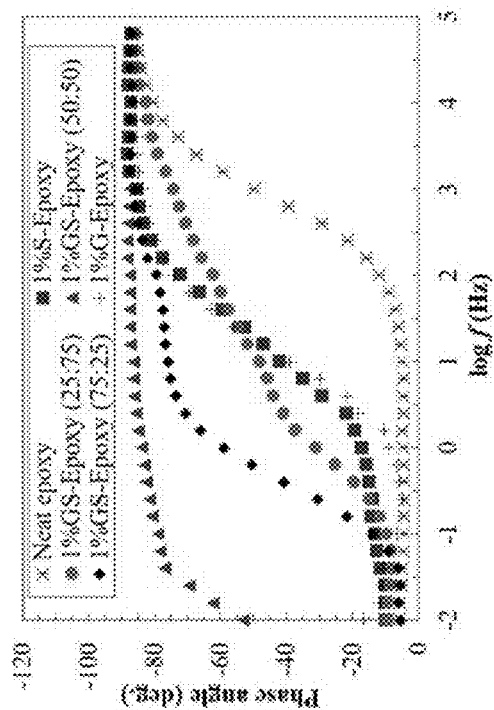
Figure 6E:
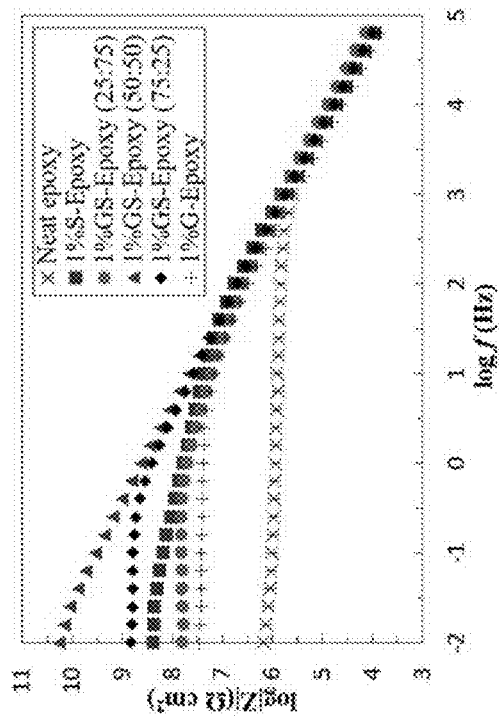

After 100 hours of exposure, FIGS. 6(c) and (d) shows evidence of that the neat epoxy has developed significant delamination and damage as the $|Z|_{0.01\ Hz}$ decreased by 2 orders, and the breakpoint of phase angle shifted from low frequencies toward middle frequencies. At this point, the neat epoxy coating was suffered the most severe corrosion damage and the corresponded suitable EEC model was Model B with Warburg impedance element. In addition, results also indicated that the 1% GS-Epoxy (25:75) has weaker corrosion protection compared with other nanocomposites, hence, a remarkable drop of impedance value and phase angle shift were also observed at 100 hours for the 1% GS-Epoxy (25:75) samples, which the overall performance was suitable for model B. Overall, similar profiles were observed in the 1% GS-Epoxy (50:50) and 1% GS-Epoxy (75:25) samples, this behavior revealed that excellent corrosion protection properties were maintained at 100 hours, which model A was still well fitted for the EIS results.

After 500 hours of exposure, 1% GS-Epoxy (50:50) showed its extraordinary anti-corrosion performance, regardless of exposure time. It was clear to observe that high impedance value has been maintained during exposure, as the impedance value was over $10^{10}\Omega/cm^2$ for both 100 hours and 500 hours. All the coatings with nanofillers exhibited improved barrier properties as expected, hence, model C was applied to neat epoxy at this stage. However, compared to the coatings with single fillers, no significant improvement was observed in the other coatings with hybrid filler, thus, the impedance value of 1% GS-Epoxy (25:75) and 1% GS-Epoxy (75:25) were close to the 1% S-Epoxy specimen. In summary, the 1% GS-Epoxy (50:50) sample remained in model A during the whole exposure, while 1% G-Epoxy, 1% GS-Epoxy (25:75) and 1% GS-Epoxy (75:25) were in model B with Warburg elements.

1.3.6 Coating Damage Indices

Figure 7B:
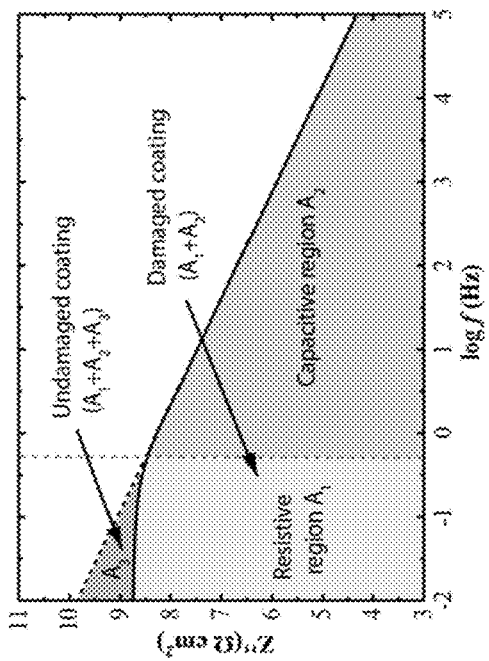
FIGS. 7(a)-7(b) show the damage indices for the coating degradation assessment, FIG. 7(a) coating damage index I, and FIG. 7(b) coating damage index II.
Figure 7A:
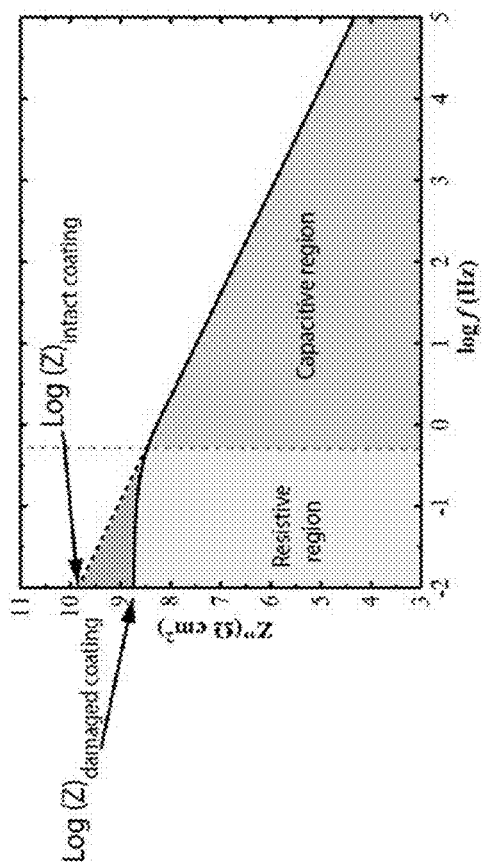

Evaluation of the degradation process on the coating-substrate interface was conducted by coating damage indices. As identified in FIG. 7, two types of coating damage indices, I and II, were employed to quantify the performance of the coating under severe corrosive environment. FIGS. 7(a) and (b) illustrated the principle of the damage indices, and the analysis was respect to the Bode plot from EIS results.

The damage index I, $DI_1$, was determined by the reduction of Zmod values at low frequencies (0.01 Hz) during coating degradation process, as shown in equation below:

$$DI_1(\%) = \left(\frac{\log Z_{damaged\ coating}}{\log Z_{intact\ coating}}\right) * 100 \qquad (1)$$

where, $Z_{intact\ coating}$ and $Z_{damage\ coating}$ are impedance value at intact and damaged stages, respectively.

In addition, the damage index II, $DI_2$, was identified the coating degradation at all tested frequency range:

$$DI_2(\%) = \left(\frac{A_1 + A_2}{A_1 + A_2 + A_3}\right) * 100 \qquad (2)$$

where, the region below the impendence curve could be separated into the capacitive ($A_2$) and resistive region ($A_1$) by the breakpoint frequency values where phase angle reaches −45°. Ammar et al., *Surf Coat. Technol.*, 324:536-545, 2017. Compared with a perfect intact coating, an extra area ($A_3$) could be determined above the resistive region ($A_1$) for the damaged coating. As electrolyte solution penetrated the coating system, which initiated coating damage and corrosion reaction occurred at the coating-substrate interface, let to a decrease in the capacitive region and increase in the resistive region. Ramezanzadeh et al., *Corros. Sci.*, 103:283-304, 2016.

Figure 8A:
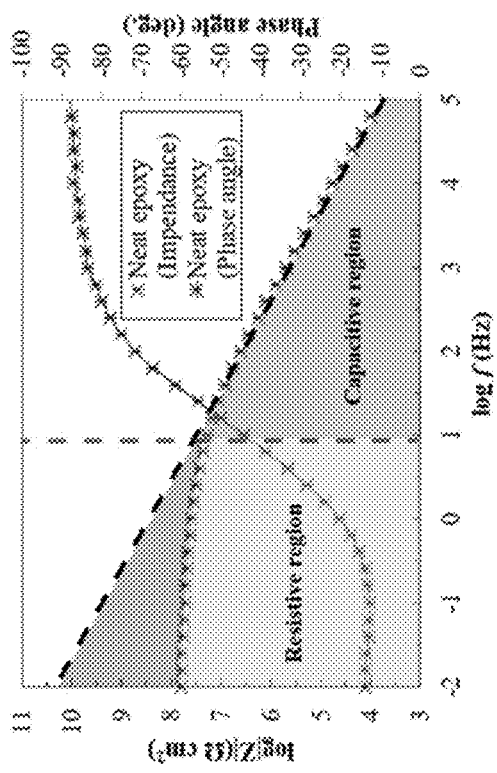
FIGS. 8(a)-8(d) show the Bode plots with the determining the breakpoint frequency and the corresponding capacitive and resistive regions, before and after exposure, for neat epoxy (FIG. 8(a) and FIG. 8(b), respectively) and 1% GS-Epoxy (50:50) system (FIG. 8(c) and FIG. 8(d), respectively).
Figure 8B:
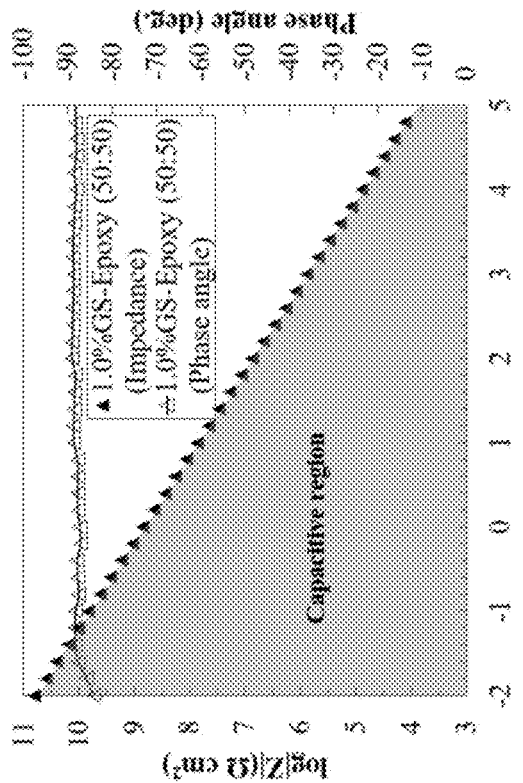

FIGS. 8(a) and (b) illustrated the bode plot of neat epoxy coating at the fresh stage and after 100 hours exposure, correspondingly. As the resistive and capacitive region were presented, it can be clearly observed that the area of the resistive region has increased significantly, indicating the diffusion of electrolyte in the coating, hence, coating delamination and reduction of adhesion between coating and substrate. Particularly, the coating damage indices were calculated by equation (1) and (2) with regarded to the EIS data. The neat epoxy had a damage index value of 91% and gradually reduced to 74% when exposure time up to 100 hours. Similarly, the damage index II of neat epoxy at initial stage was 89% and decreased to 63% after 100 hours exposure.

Figure 8C:
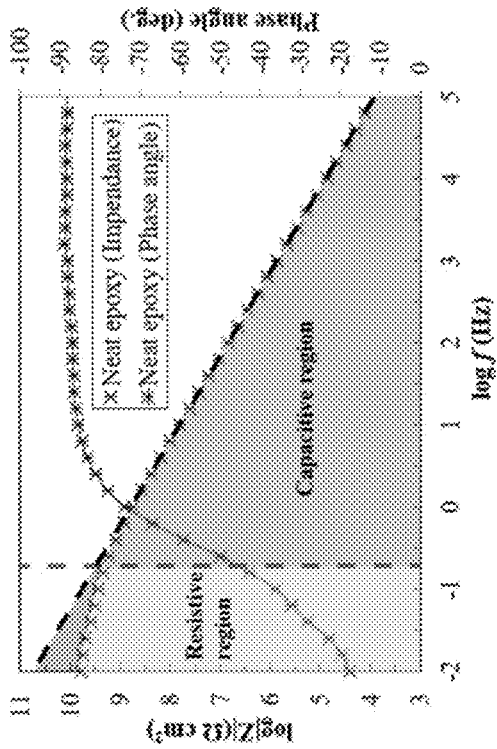
Figure 8D:
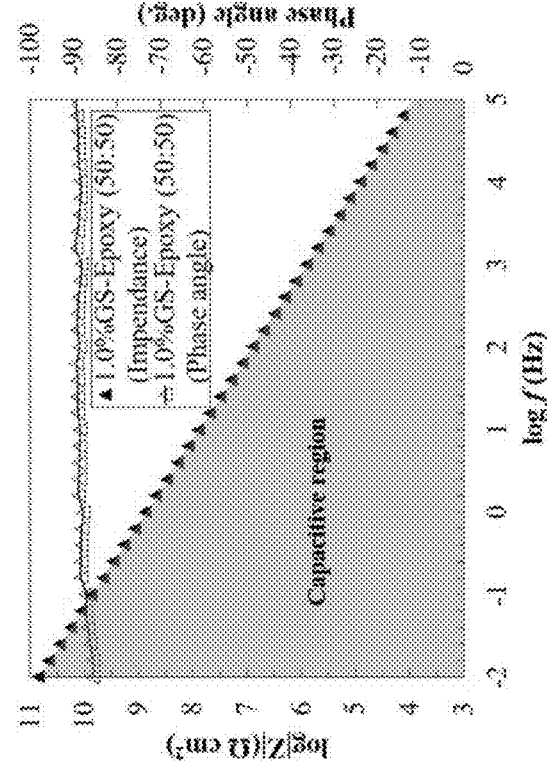

On the other hand, the incorporation of nanofillers results in enhancing the barrier properties as the capacitive region has remained relatively large compared with neat epoxy coating. As illustrated in FIGS. 8(c) and (d), the Bode plots of 1% GS-Epoxy (50:50) revealed that a capacitive behavior was observed in the tested frequency range during the exposure, thus, indicating the coating system functioning as intact coating without corrosive media penetration and delamination. Moreover, for the 1% GS-Epoxy (50:50) sample, both the coating indices I & II remained at 100% after 100-hour exposure, indicating that the coating layer stayed intact and effective prevented the corrosive media reach the metallic substrate.

TABLE 2

Damage indices of the test samples over varying exposure time periods (%)

| | Exposure to accelerated environmental stresses | | | | | |
| --- | --- | --- | --- | --- | --- | --- |
| | Onset | | 100-hr | | 500-hr | |
| Label | $DI_1$ | $DI_2$ | $DI_1$ | $DI_2$ | $DI_1$ | $DI_2$ |
| Neat epoxy | 91% | 89% | 74% | 63% | 59% | 43% |
| 1% G-Epoxy | 100% | 100% | 98% | 100% | 73% | 75% |
| 1% S-Epoxy | 100% | 100% | 83% | 83% | 78% | 61% |
| 1% GS-Epoxy(25:75) | 100% | 100% | 77% | 76% | 74% | 63% |
| 1% GS-Epoxy(50:50) | 100% | 100% | 100% | 100% | 100% | 100% |
| 1% GS-Epoxy(75:25) | 100% | 100% | 100% | 100% | 84% | 85% |

Figures 9A, 9B:
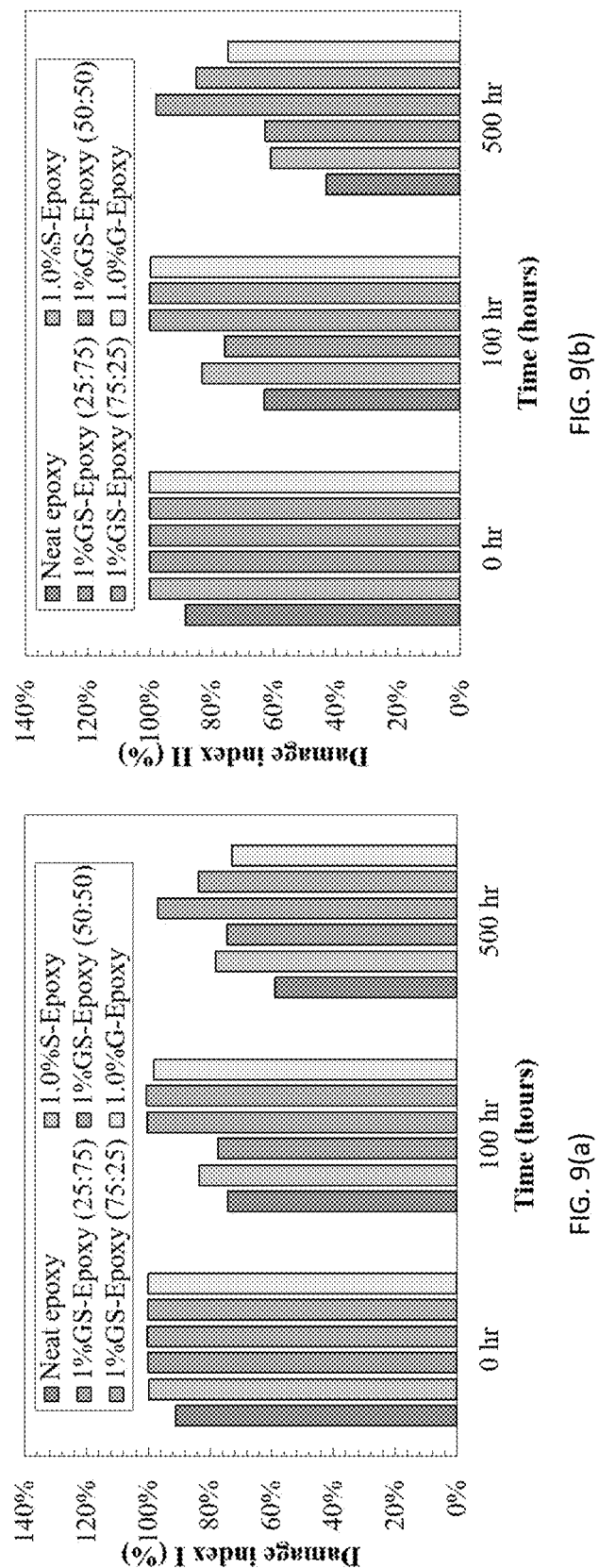
FIGS. 9(a)-9(b) show the coating damage indices of the prepared coatings, FIG. 9(a) coating damage index I, and FIG. 9(b) coating damage index II.

The results of coating damage indices were illustrated in FIG. 9 and summarized in Table 2. The neat epoxy film exhibited the weakest anti-corrosion properties, as the lowest values were observed in both indices during the whole test ranges. The results suggested that the addition of GNP and NS would lead different improvements on the anti-corrosion performance. The 1% G-Epoxy coatings exhibited undamaged at 100 hours, however, showed a significant increase at 500 hours. On the other hand, compared 1% G-Epoxy coatings, only a slight improvement on the coating damage was observed in 1% S-Epoxy group, however, the damage process was much slower between 100 to 500 hours. As the hybrid filler was incorporated within the epoxy resin, superior corrosion protection properties were observed.

Especially for the 1% GS-Epoxy (50:50) group, the coating film retained as an intact barrier behavior while all the other coating systems showed different levels of damage. A clear benefit of the hybrid filler system on the anti-corrosion performance was obtained, as the reinforced coating could completely prevent the corrosive media penetrated film and reach the coating-substrate interface.

1.3.7 Water Absorption

Researchers have studied the mechanism of polymer-based coating based on EIS measurements (Philippe et al., *J. Electrochem. Soc.*, 150(4):B111-B119, 2003; Lacombre et al., *Electrochimica Acta*, 231:162-170, 2017), and the penetration of water into the coating is expected to increase the coating capacitance due to the dielectric constant of water is higher than typical polymers (Brasher et al., *J. Appl. Chem.*, 4(2):62-72, 1954). The model that employed for quantifying the water uptake was employed by Brasher and Kingsbury, and presented in the equation:

$$\phi = \frac{K \log\left(\frac{c_t}{c_0}\right)}{\log(\varepsilon_w)} \quad (3)$$

where $\Phi$ is the water content volume percentage; $C_t$ and $C_0$ are the capacitance for before and after the test, respectively; $\varepsilon_w$ is the dielectric constant of water at the working temperature (equal 78.5 at 25° C., and 75 at 35° C.). Brasher et al., *J. Appl. Chem.*, 4(2):62-72, 1954.

Figure 10:
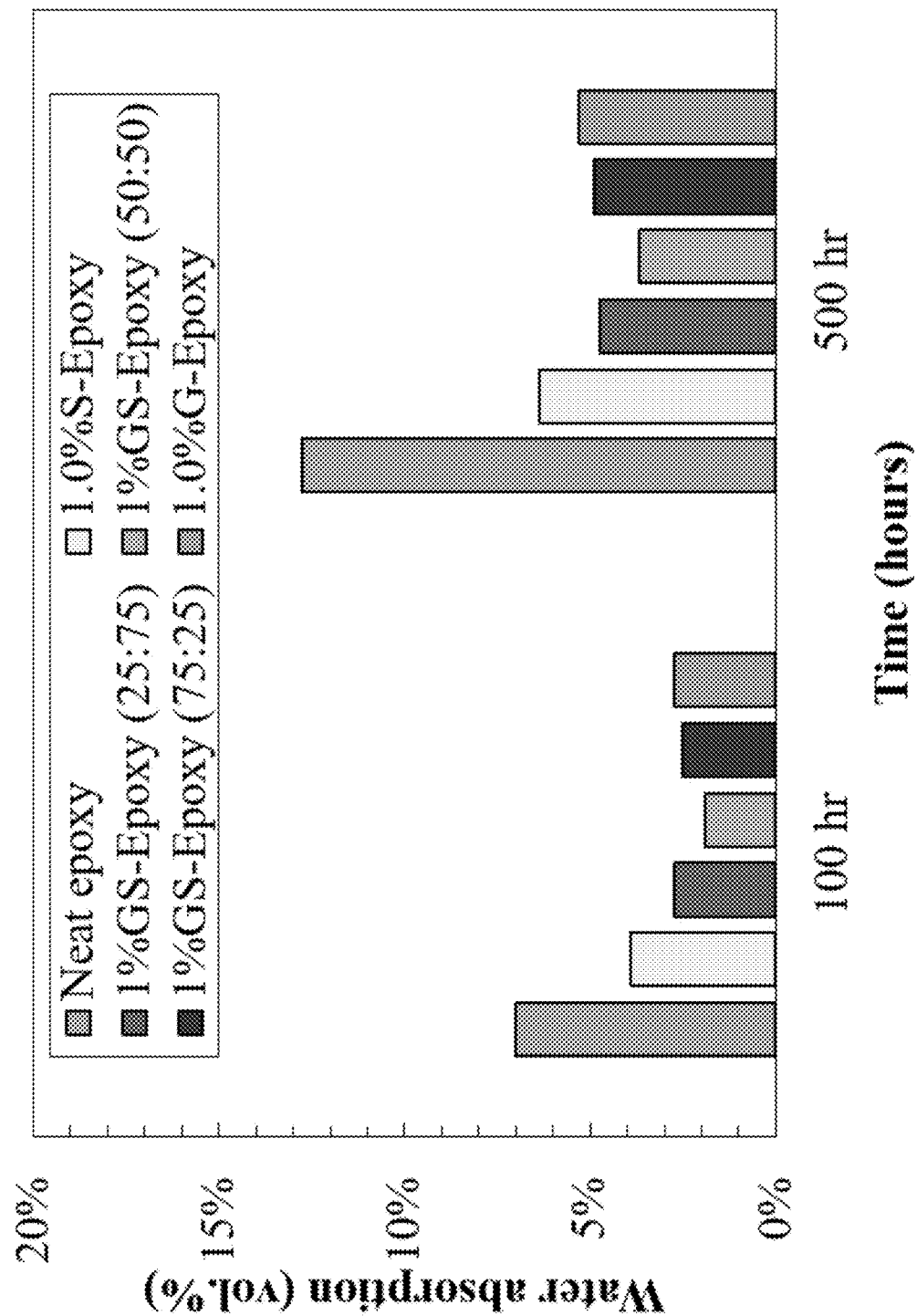
FIG. 10 shows the volume percentage of water absorption.
Figure 11A:
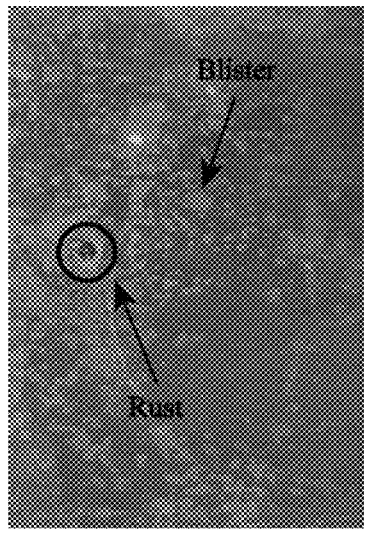
FIGS. 11(a)-11(f) show the photographs of localized corrosion and blister on prepared coatings FIG. 11(a) neat epoxy, FIG. 11(b) 1% S-Epoxy, FIG. 11(c) 1% G-Epoxy, FIG. 11(d) 1% GS-Epoxy (25:75), FIG. 11(e) 1% GS-Epoxy (50:50), and FIG. 11(f) 1% GS-Epoxy (75:25).
Figure 11B:
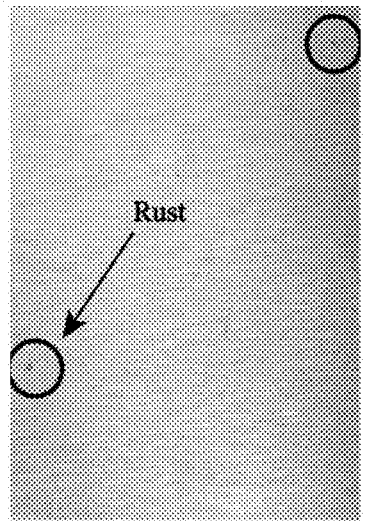
Figure 11C:
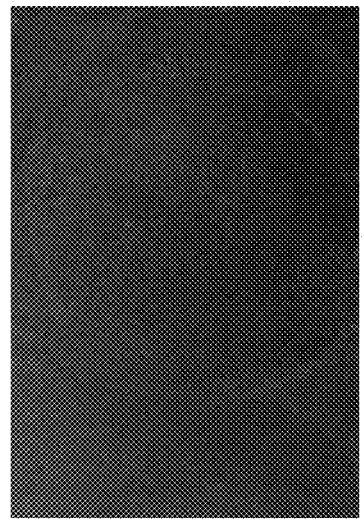
Figure 11D:
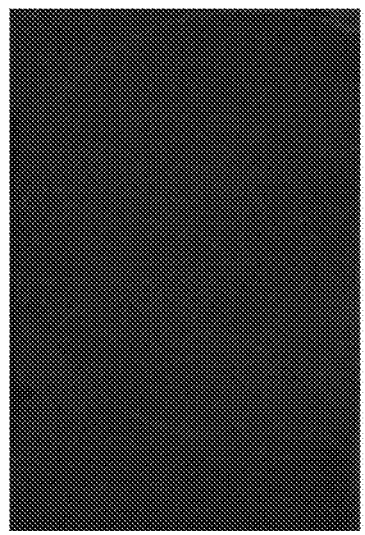
Figure 11E:
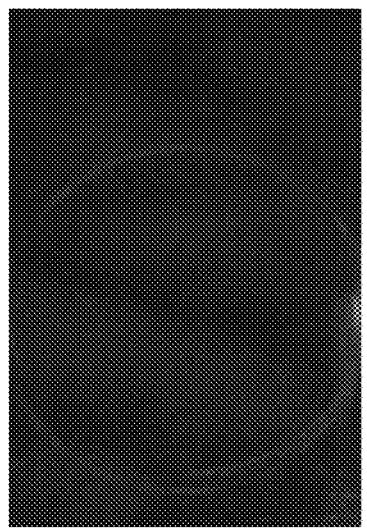
Figure 11F:
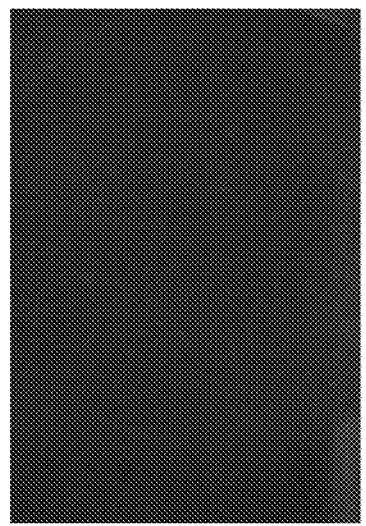

The calculated water absorptions were shown in FIG. 10, thus, presented as volume fractions of water absorbed. The results clearly demonstrated that the water absorption was reduced by the incorporation of nanofillers, thus, the presence of nanofillers effectively increased the ability to blocked water penetrated into the coating layer. Moreover, stronger water barrier performance was observed in all hybrid filler coatings, as compared to the coatings with single filler (1% G-Epoxy and 1% S-Epoxy). Evidently, the most noticeable enhancement on barrier performance was observed in 1% GS-Epoxy (50:50) sample, which the lowest water absorption values were obtained during the whole exposure. This dramatically increased barrier performance could be attributed to the formation of GNP/NS network; hence, these results were in agreement with the reported results of particle dispersion and coating damage indices.

1.3.8 Effects of Nanofiller on the Occurrence of Blistering and Localized Corrosion The anti-corrosion performance of the coating films was also investigated by visual assessment after exposure, as displayed in FIG. 11. Evidently, localized blisters and corrosion products were appeared on the neat epoxy coating, indicating weak corrosion protection and barrier properties of the coating film. This phenomenon was attributed to the corrosion products accumulations and adhesion loss between the coating and substrate. Moreover, no significant localized blister was observed on NS/epoxy coatings, with a much smaller size of corrosion products. By contrast, no rust and blister occurred in the GNP/epoxy and hybrid filler/epoxy coatings. These results clearly demonstrated that the incorporation of nanofillers has significantly enhanced the corrosion protection performance of the epoxy coatings.

1.3.9 Abrasion Resistance Test

Figure 12B:
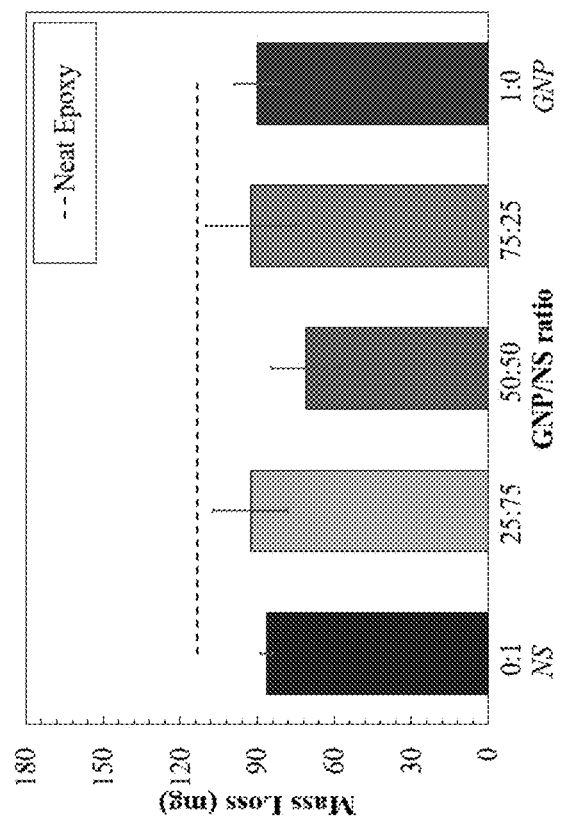
FIGS. 12(a)-12(b) show the mass loss of hybrid nanofiller composites, FIG. 12(a) mass loss over different abrasive cycles, and FIG. 12(b) mass loss over varying nanofillers.
Figure 12A:
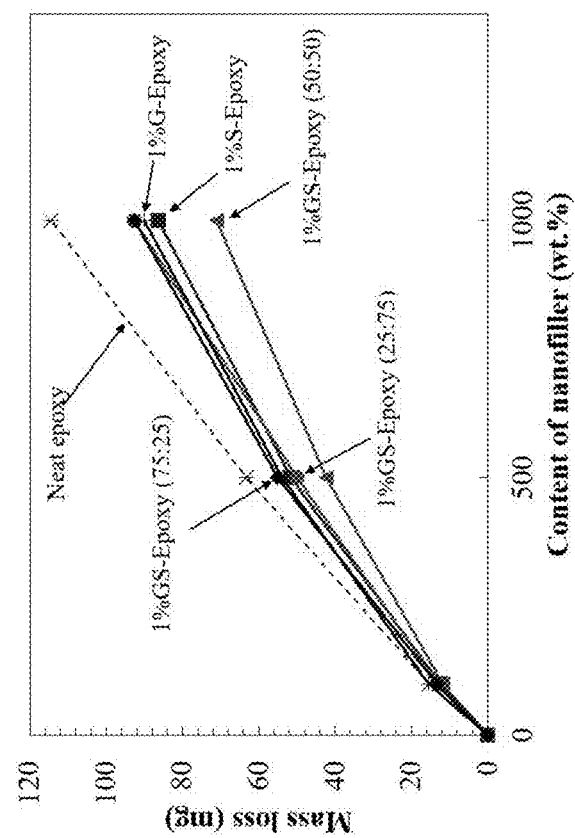

Coatings with strong abrasion resistance can protect the substrate from damage by friction, and extent the service life of the structure. The abrasion resistance of the tested coatings was characterized by the Taber abraser test and wear mass loss was measured during the test. Less mass loss after the test indicates the coating has better abrasion resistance. FIG. 12 illustrated the wear mass loss values from the abrasion test, thus, the neat epoxy was used as a reference to compare with all the nanofiller reinforced coatings.

Figure 13B:
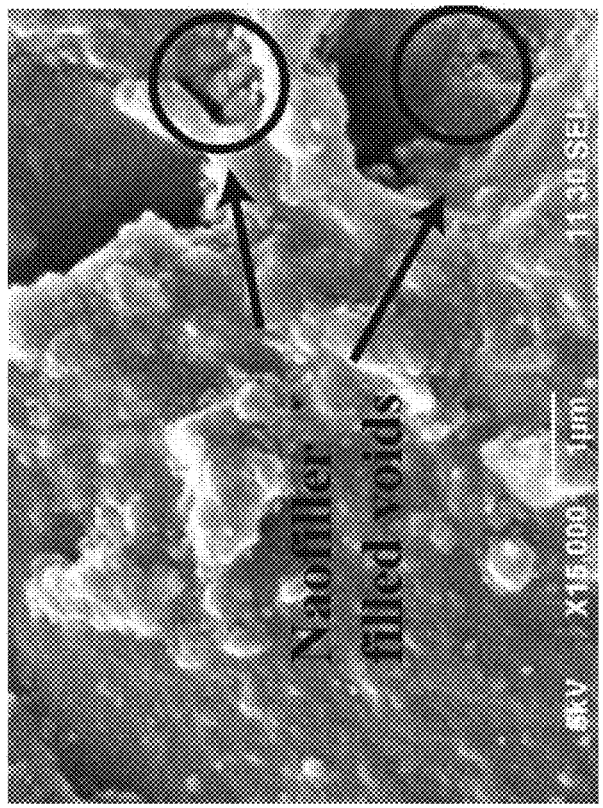
FIGS. 13(a)-13(b) show the SEM images of the abraded surface for FIG. 13(a) neat epoxy surface with voids, and FIG. 13(b) NS/epoxy with filled voids.
Figure 13A:
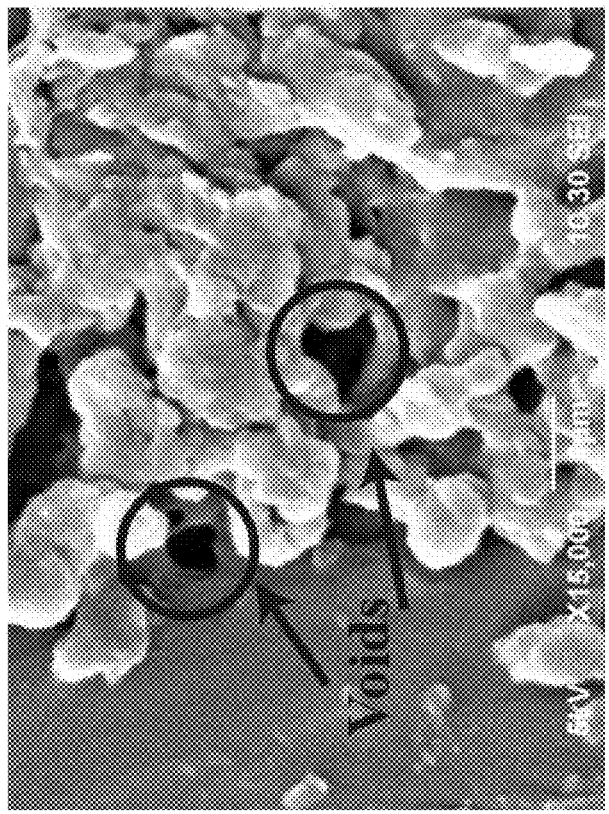
Figure 15B:
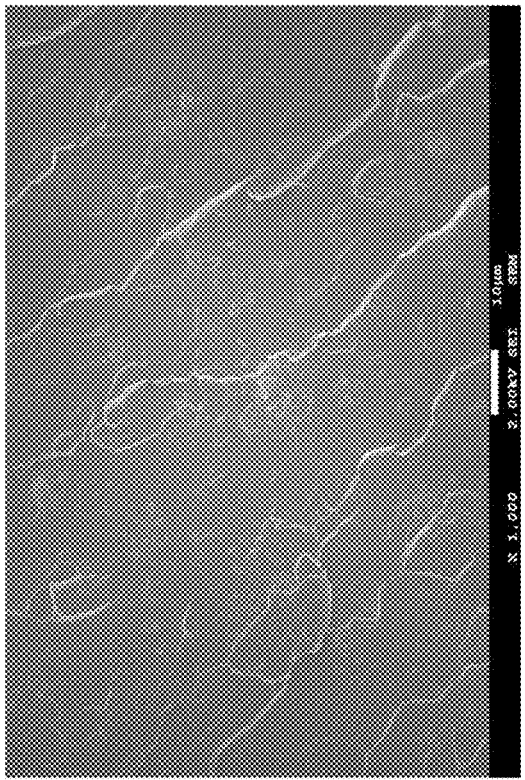
FIGS. 15(a)-15(f) show the SEM image of fracture surface for FIG. 15(a) neat epoxy, FIG. 15(b) 1% GS-Epoxy (25:75), FIG. 15(c) 1% GS-Epoxy (50:50), FIG. 15(d) 1% GS-Epoxy (75:25), FIG. 15(e) 1% G-Epoxy, and FIG. 15(f) 1% S-Epoxy.
Figure 15D:
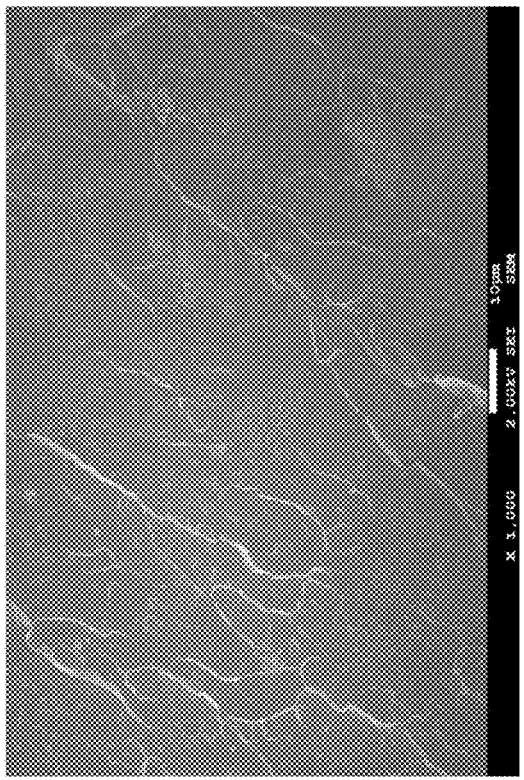
Figure 15A:
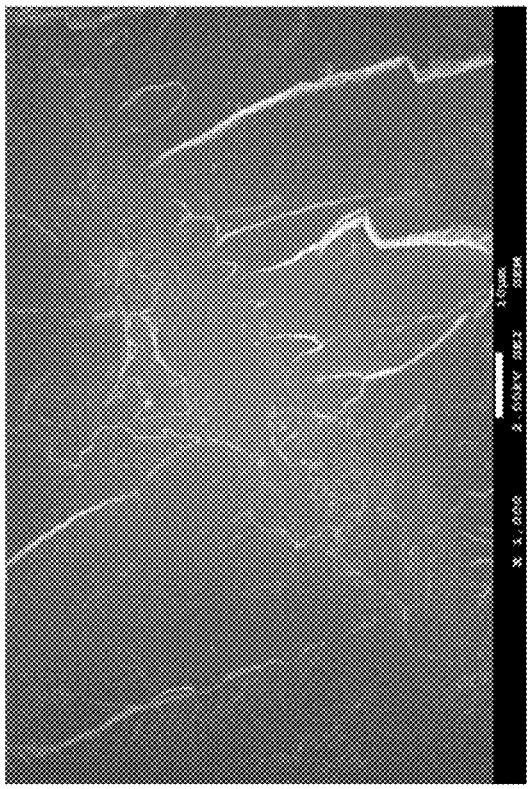
Figure 15C:
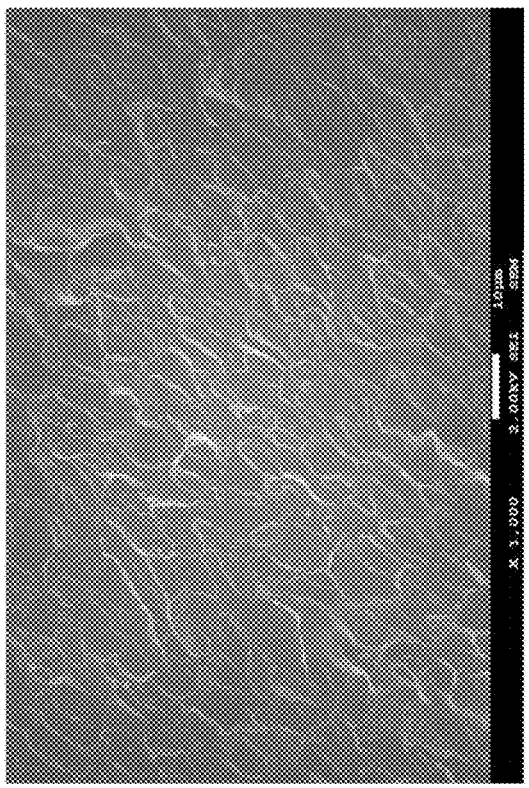
Figure 15F:
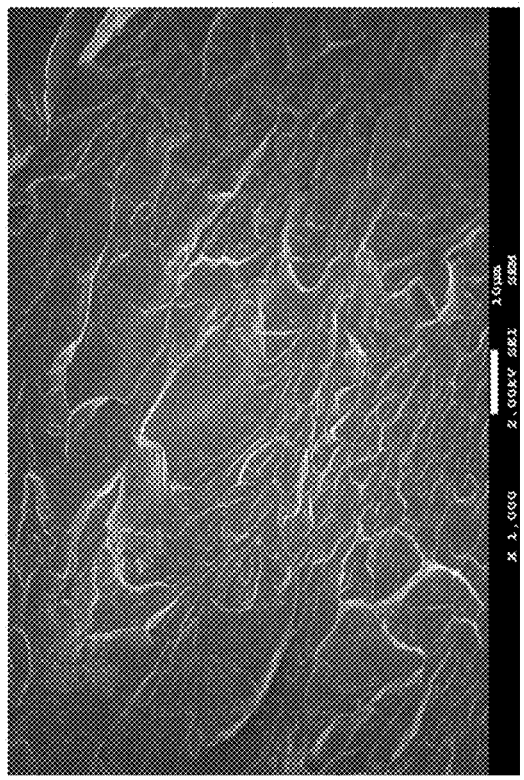
Figure 15E:
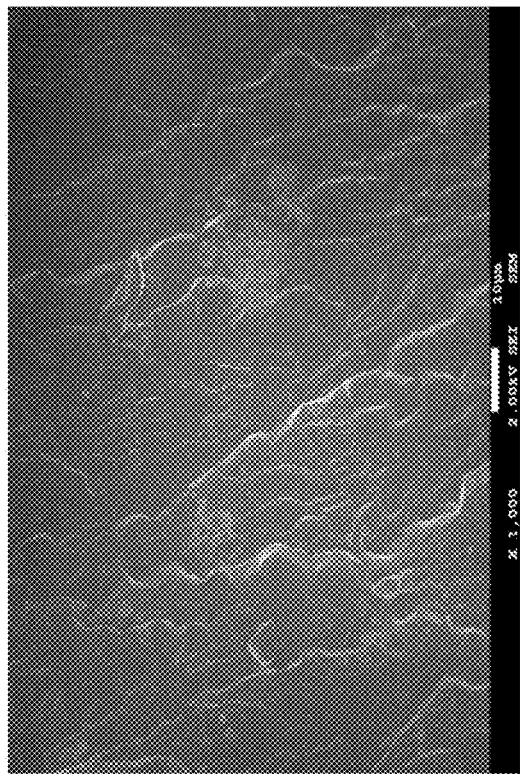

The mass loss of the neat epoxy film was 114 mg, improvement on abrasion resistance was observed in all the tested nanofiller/epoxy samples. The maximum improvement of abrasion resistance was obtained in 1% GS-Epoxy (50:50), which the weight of mass loss was decreased by 44%. For the composites containing hybrid nanofiller with a ratio of 25:75 and 75:25, the mass loss was generally higher than single filler groups (1% G-Epoxy and 1% S-Epoxy). The generalizability of research work suggested that abrasion resistance is dependent on the cohesion or strength of the coatings, and the ability to transfer the applied load during the abrasion process. Fan et al., *Prog. Org. Coat.*, 86:125-133, 2015; Daniels et al., *J. Colloid Interface Sci.*, 205(1):191-200, 1998. Without nanofillers, the neat epoxy coating film contains micro-pores, which leads a weaker abrasion resistance. This suggestion was confirmed by the SEM images of the abraded surface for the neat epoxy film, therefore, a porous surface with air entrapped voids was detected in the FIG. 13(*a*). The addition of nanofillers would bond the polymeric matrix and fill the pores (FIG. 13(*b*)), hence, increase the cohesion or strength of the coating and results an improvement in abrasion resistance. Daniels et al., *J. Colloid Interface Sci.*, 205(1):191-200, 1998. Additionally, one reasonable suggestion is, with a suitable mix ratio, the presence of another nanofiller could result a stronger improvement on abrasion resistance compared to the single filler groups. Otherwise, the reinforcement could be lower than the single filler composites.

1.3.10 Coupon Tensile Test

The tensile properties of hybrid nanofiller reinforced epoxy was characterized by the coupon tensile test (ASTM D638). To evaluate the influence of varied mix ratios in the hybrid nanofillers, FIG. 14 presented the relationship between mix ratio vs. maximum tensile stress, strain at failure and Young's modulus, respectively.

The results in FIG. 14(*a*) revealed that, compared with the neat epoxy, an improvement of tensile stress was obtained in all tested nanofiller reinforced composites. Similar to the abrasion resistance, the highest reinforcement of tensile stress was observed in the 1% GS-Epoxy (50:50) group (37.1 MPa), with an improvement of 56% compared with neat epoxy. The overall results revealed that there was no significant difference between 1% S-Epoxy, 1% GS-Epoxy (25:75), and 1% GS-Epoxy (75:25). Strong evidence indicated that the combination of GNP and NS in a ratio of 50:50 formed the most robust nanoparticles network. Furthermore, the results of failure strain are presented in FIG. 14(*b*). Unlike the tensile stress curve, higher failure strain was obtained in the composites that reinforced by with higher content of NS. Thus, similar values of failure strain were observed in 1% S-Epoxy, 1% GS-Epoxy (25:75) and 1% GS-Epoxy (50:50), which were around 3%. However, slightly reduction on the strain values were obtained in groups with higher GNP content, these results indicated the presence of GNP led a decrease in the flexibility of the composites. The Young's modulus curves were displayed in FIG. 14(*c*), the observation revealed that the largest increase of 16% was observed at the 1% GS-Epoxy (50:50) group while the other hybrid filler system exhibited no significant difference in Young's modulus. Thus, it was reasonable to hypothesize that the addition of NS could decrease the stiffness of the composites as the lower Young's modulus was also observed in NS/epoxy system.

The overall results suggested that the addition of NS would increase the strength and strain of the epoxy resin, however, a reduction of stiffness was observed which revealed a weaker ability to resists deformation. No significant impact on the test results was observed in GNP/ composites, indicating the tensile properties of the epoxy resin was not improved by the addition of GNP. Evidently, it can be claimed that there exists a critical ratio between GNP and NS which the strength, strain, and stiffness of the composites could be improved, thus, at this stage the ratio was 50:50.

FIG. 15 illustrated the fracture surfaces for specimens that fractured under tensile stress. The relatively smooth surface was observed in neat epoxy comparing with nano-reinforced composites. This typical brittle fracture from pure epoxy representing the low impact resistance and fracture toughness of the neat epoxy. In contrast, the fracture surface was significantly rougher for all the nanocomposites than the pure epoxy, specially for the composites containing GNP/ NS fillers with a mix ratio of 50:50 (FIG. 15(c)), where higher surface roughness and more compacted cleavages were observed, indicating the signs of signs of higher energy absorption and better fracture resistance. This observation was consistent with the experiment results that obtained from the tensile test. Similar observations were found in other tested groups, which can be a good representative of the strong adhesion between the reins and well-dispersed nanofillers in the polymer matrix.

1.3.11 Characterization of Robust Hydrophobic Surface

Figure 16B:
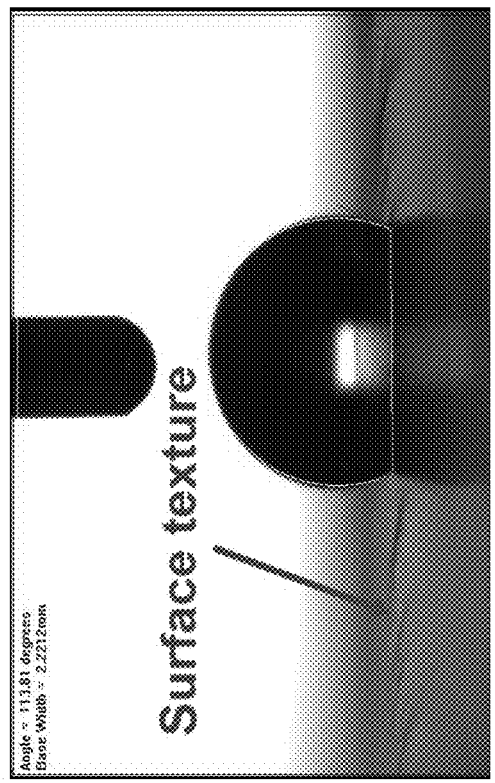
FIGS. 16(a)-16(b) show the FIG. 16(a) Photograph and FIG. 16(b) contact angle of 1% GS-Epoxy (50:50) after medium grade abrasion.
Figure 16A:
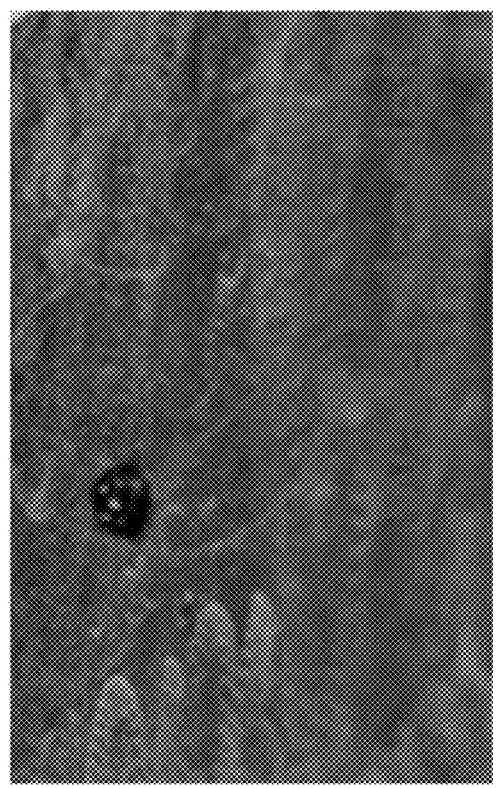

The application of hydrophobic surface was often limited by its durability due to its mechanical instability. The function is easy to be impaired after rigorous physical damages that caused by abrasion and scratching. Nine et al., *ACS Appl. Mater. Interfaces*, 7(51):28482-28493, 2015. Abrasion with sandpaper was applied to the coating film, and the contact angle was measured on the abraded surfaces in order to evaluate the robustness of the nanocomposites. Different grit sandpapers were applied on the coating surface of all the tested samples. Sandpapers with medium, mild, and fine grade abrasive grades were empolyed in order to create varied mechanical damges. FIG. 16 was showing as an example of a sample after abrasion: it was a 1% GS-Epoxy (50:50) panel which has applied with medium grade abrasion.

Figure 17:
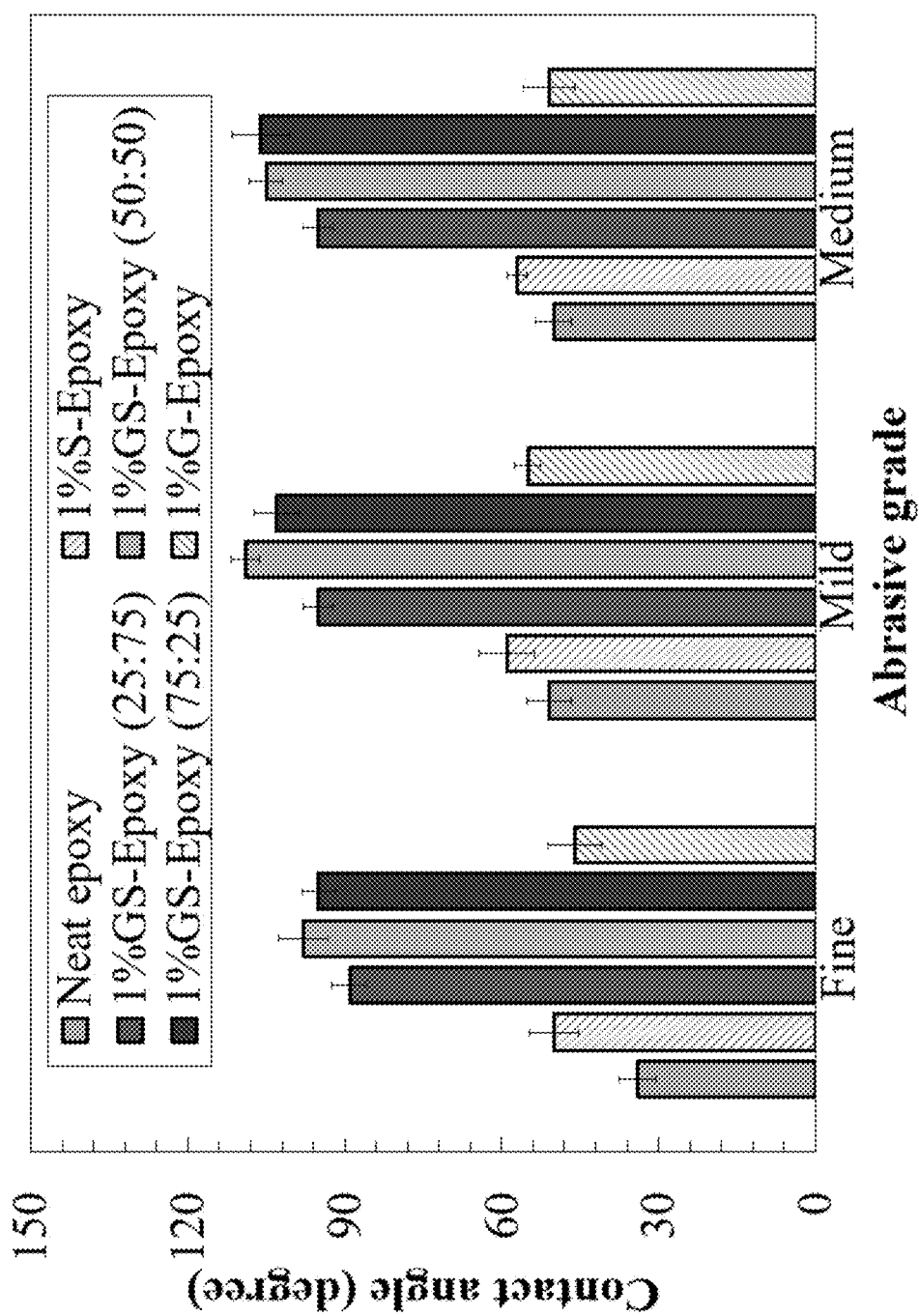
FIG. 17 shows the contact angle of coatings with nanofiller after abrasion.

Strong evidence revealed that the coating films were robust enough to maintain the hydrophobic properties after abrasion. A schematic of the contact angles of the tested coating films was illustrated in FIG. 17, the contact angle (CA) of the neat epoxy specimen retained around 50 degrees for the neat epoxy specimen after the abrasion. On the other hand, CA with a value around 110 degrees was obtained in the nanocomposites with hybrid nanofillers. Similar results were observed in all tested fillers with varied mix ratios of nanofillers.

Furthermore, AFM and SEM techniques were used to investigate the micromorphology of the tested samples. Similar to the natural leaf, such as lotus leaf, island-like spots were obtained on the surfaces leads to the enhanced hydrophobicity of the nanocomposite coatings. In addition, the water repellency was also contributed by the exposed hydrophobic nanoparticles. Hydrophobic nanotexture was obtained, and this finding was verified by using advanced microscopy technologies.

Figure 18A:
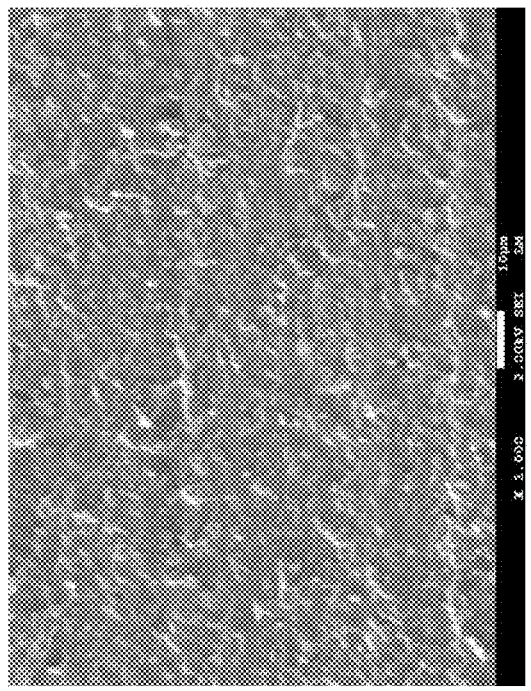
FIGS. 18(a)-18(c) show the SEM images of FIG. 18(a) neat epoxy and FIG. 18(b) 1% GS-Epoxy (50:50) after abrasion, and FIG. 18(c) raised hill with exposed nanofillers in 1% GS-Epoxy (50:50) specimen.
Figure 18B:
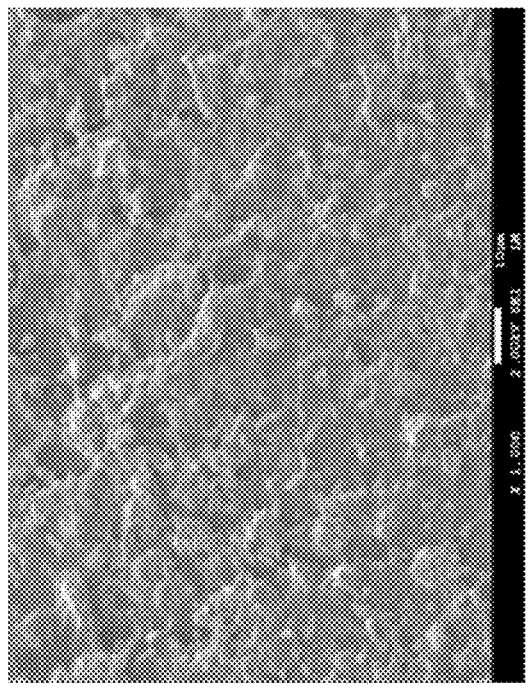
Figure 18C:
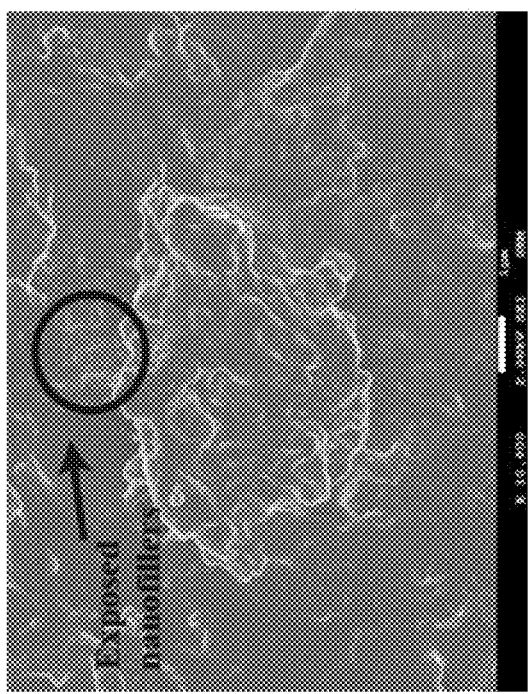
Figure 40:
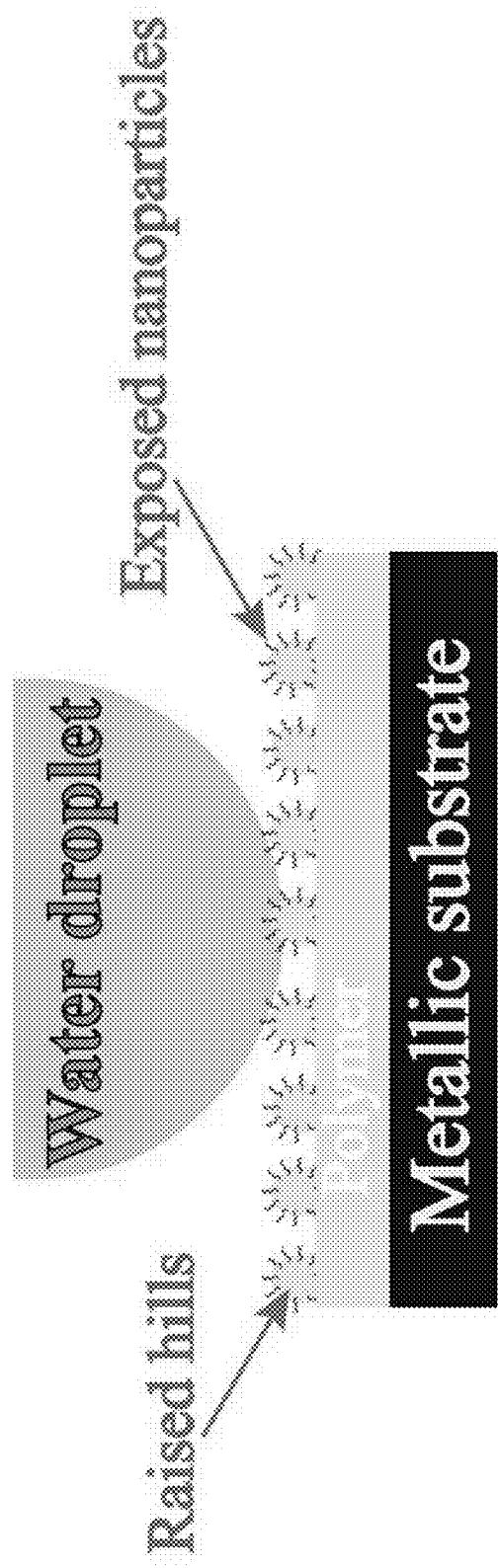
FIG. 40 shows the mechanism of the enhanced hydrophobicity.

FESEM images were applied to examine the morphology of the abraded surfaces. FIGS. 17(a) and (b) are illustrated the abraded surface of neat epoxy and hybrid nanofiller composite of 1% GS-Epoxy (50:50), correspondingly. A rougher surface was obtained in the nanocomposites with well distributed small hills. This well distributed hills formed a network that has the similar effect of the natural leaves. FIG. 18(c) illustrated a representative rasied hill, exposed nanofillers were also able to be observed in this area. The combination of surface texture with these micro hills and exposed hydrophobic nanofillers formed a surface with higher water repellency properties which was illustrated in FIG. 40.

Figure 19A:
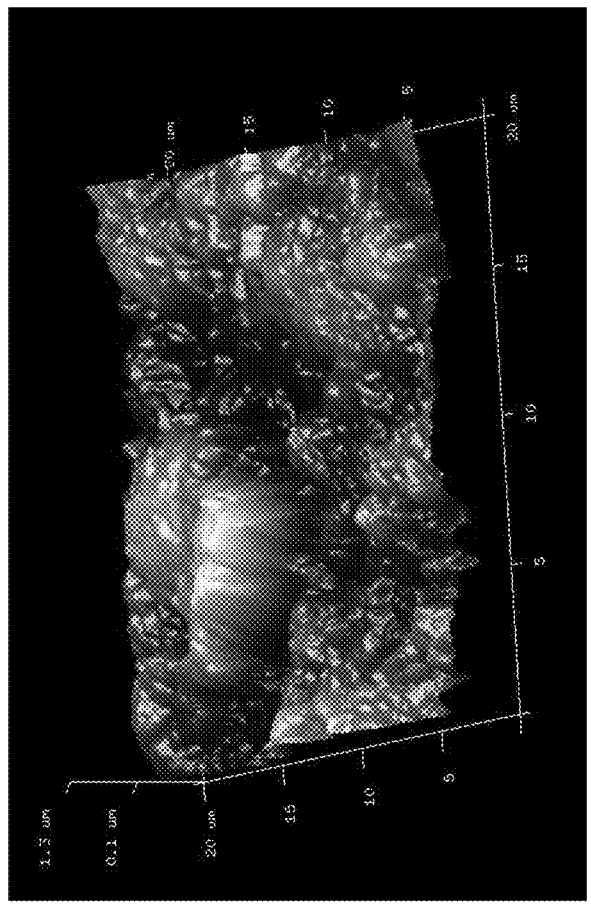
FIGS. 19(a)-19(c) show the FIG. 19(a) 3D, FIG. 19(b) 2D, and FIG. 19(c) cross section AFM images of 1% GS-Epoxy (50:50) after abrasion.
Figure 19C:
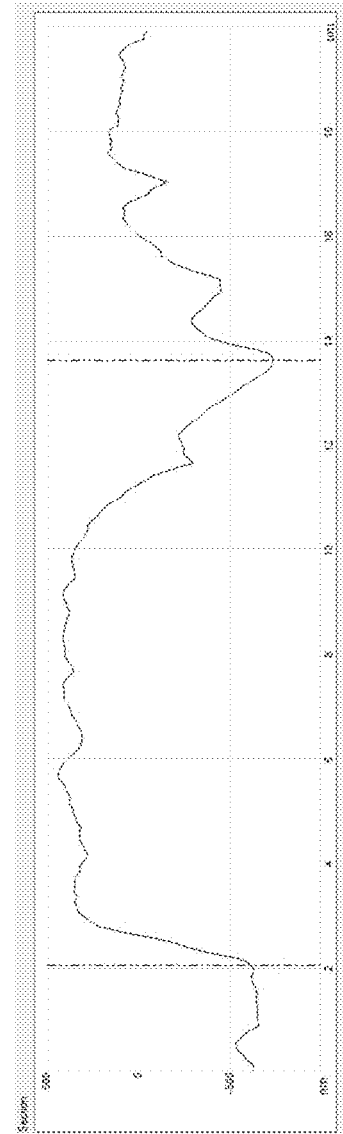
Figure 19B:
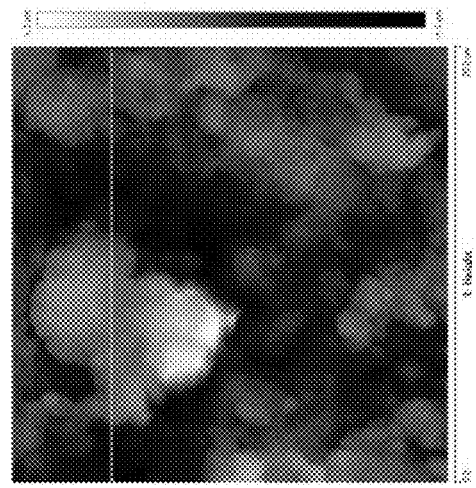
Figure 20A:
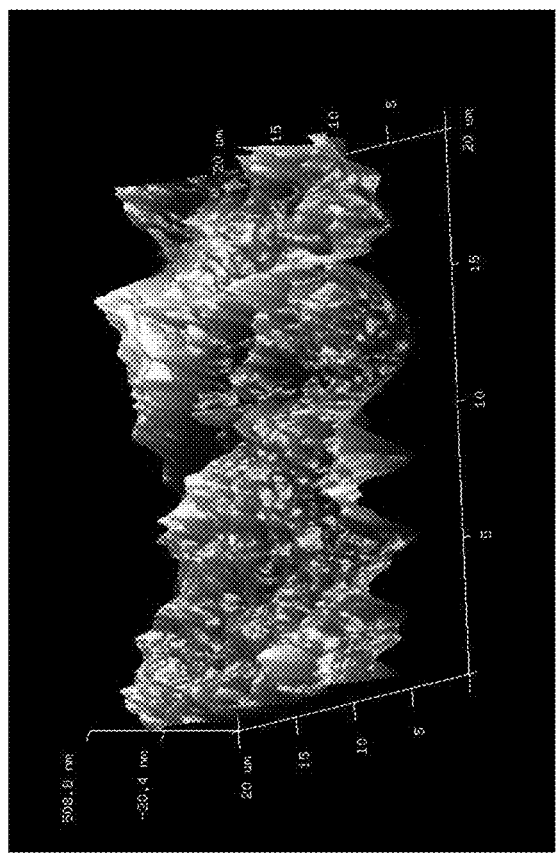
FIGS. 20(a)-20(c) show the FIG. 20(a) 3D, FIG. 20(b) 2D, and FIG. 20(c) cross section AFM images of neat epoxy after abrasion.
Figure 20C:
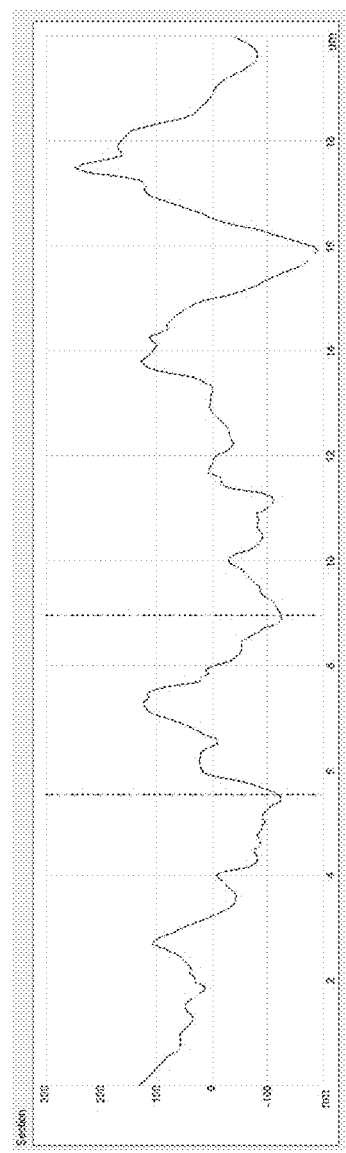
Figure 20B:
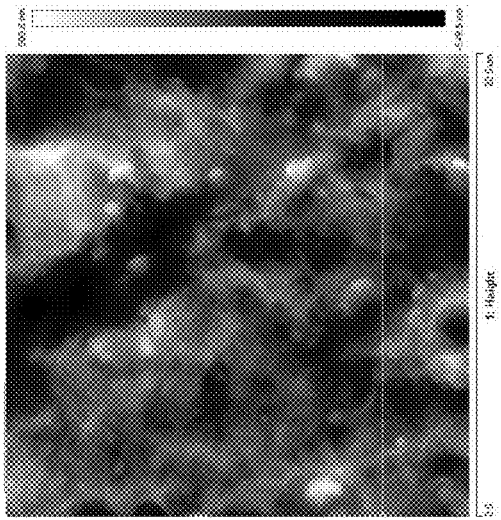

AFM test was performed to examine the morphology of the abraded surfaces by illustrating 3-dimensional images. FIGS. 19 and 20 illustrate the top surface of the 1% GS-Epoxy (50:50) and neat epoxy specimen, correspondingly. The result shows the 1% GS-Epoxy (50:50) has a higher surface roughness (Ra=265 nm) than the neat epoxy (Ra=108 nm). One typical raised hill was showed in FIG. 20, the height was found around 1 μm and width was 11 μm. On the other hand, a surface with lower roughness with only jagged peaks was observed in the neat epoxy sample.

1.4 Conclusions

Overall, the coating compositions of the invention with GNP/NS hybrid-filler reinforced nanocomposites have robust anti-corrosion and hydrophobic properties. The test results demonstrate synergistic effects of the hybrid fillers, in particular a remarkable enhancement in abrasion resistance, mechanical strength, barrier properties, corrosion protection performance, and water-repellency. The combination of GNP/NS in a ratio of 50:50 exhibited highest improvements on corrosion and mechanical performance, most likely due to the presence of GNP, which improved the dispersion of NS, and the NS enhanced the exfoliation degree of GNP. Thus, the GNP/NS epoxy coating compositions of the invention may be used as high-performance protection coatings.

Example 2

2.1 Synthesis of Nanoparticle-Polymer Composite

Figure 41:
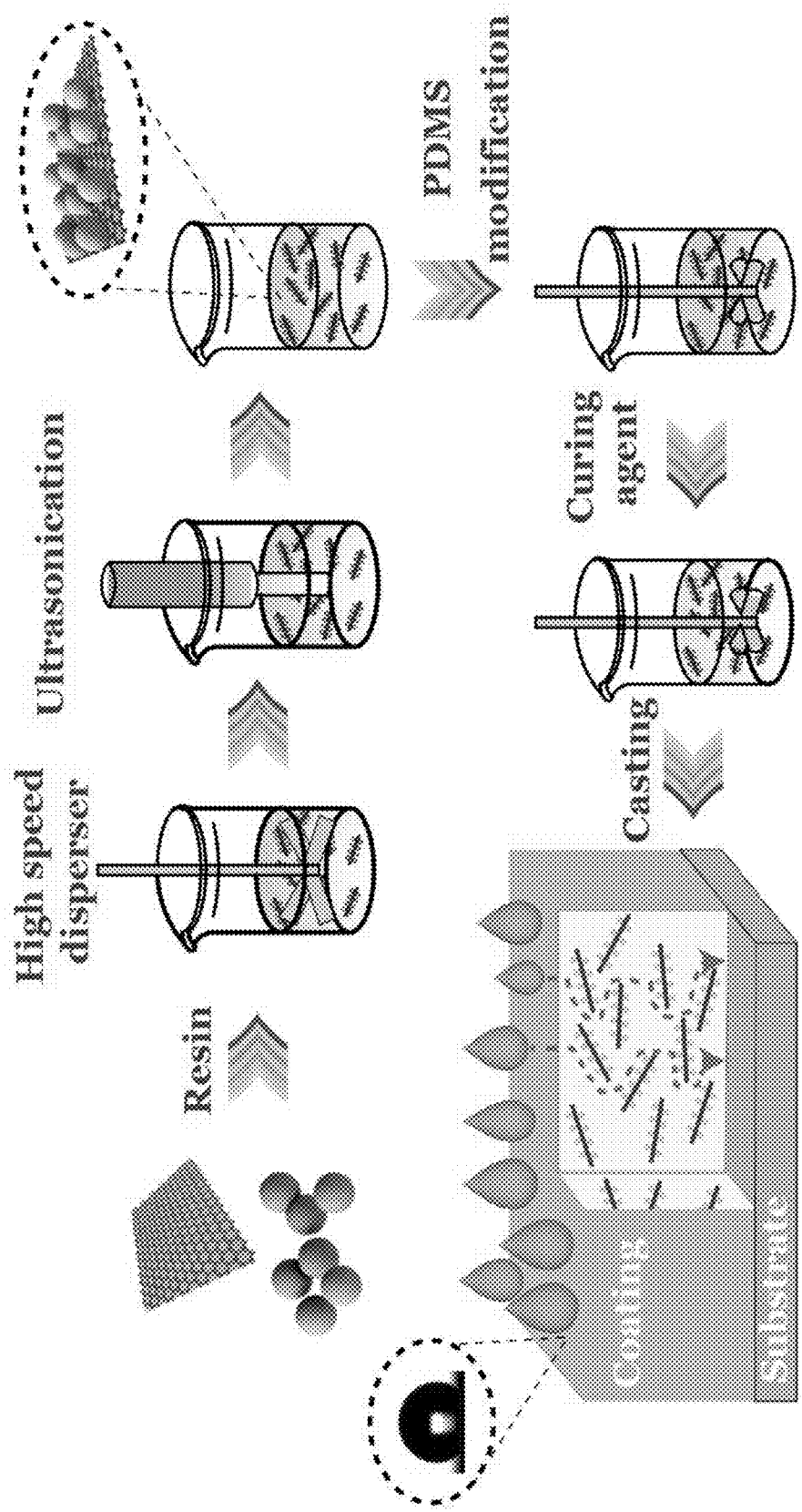
FIG. 41 shows a schematic of the fabrication process.

The fabrication process of the nanoparticle-polymer composites coating was illustrated in FIG. 41. To obtain a homogeneous solution, the nanofillers were dispersed into the epoxy resin by using a dispersion method that integrated with high-speed disk (HSD) and ultrasonication. 0.5 g of graphene nanoplatelets and nano-silica were mixed into 65 g of EPON™ 828 resin, with a high-speed disperser at a rotation speed of 4000 rpm for 30 mins. After that, the mixture was ultrasonicated with a ¾" probe, and the ultrasonication was using a 30 s on/off cycle, with a total duration of 60 min. After the dispersion, the obtained nanofiller/ epoxy solution was used for PDMS modification. PDMS (7.21 g), APTES (2.05 g), and DBTDL (0.072 g) were added in the solution, while the solution was subjected to a mechanical stirring for 20 min. The stirring speed was controlled to 800 rpm and the solution was heated to 80° C., which allowed the PDMS to react with epoxy resin. The mixture was cooled to room temperature and mixed with EPIKURE™ Curing Agent 3175 (35 g) at 600 rpm for 10 min; then the nanocomposite coatings were ready to apply on substrates. The mixture design for each specimen was presented in Table 3, and the neat epoxy was used as a reference.

TABLE 3

Mixture design of all prepared coatings

| Group | Epoxy Resin wt. % | PDMS Wt. % | GNP/NS Nanofiller wt. % |
|---|---|---|---|
| Neat epoxy | 100.0 | 0.0 | 0.0 |
| PDEP | 90.0 | 10.0 | 0.0 |
| GS-EP | 100.0 | 0.0 | 1.0 |
| GS-PDEP | 90.0 | 10.0 | 1.0 |

2.2 Characterization Methods

2.2.1 Characterization

The characterization of nanofillers and nanocomposites was carried out by several techniques, which include scanning electron microscopy (SEM), transmission electron microscopy (TEM), X-Ray Diffraction (XRD) and Fourier transform infrared spectroscopy (FTIR). The TEM images of nanofillers were collected by JEOL JEM-2100 high-resolution analytical transmission electron microscopy, and the images were used to examine the microstructure of the hybrid nanofiller virtually. The XRD patterns were conducted to demonstrate the intercalation and degree of exfoliation of the nanofillers, and the results were collected by Bruker AXS' D8 Discover multipurpose X-Ray Diffractometer. FTIR analysis was conducted to study the reaction mechanism of epoxy and polydimethylsiloxane. A Thermo Scientific Nicolet 8700 spectrometer obtained FTIR spectra of neat epoxy and PDMS/epoxy composite. The surface micrographs of nanocomposite in this study were recorded by JSM-7600F Schottky field-emission scanning electron microscope (FE-SEM); thus, SEM images of fracture and abraded surface were utilized to analyze the fracture toughness and wear resistance for the composites, respectively.

2.2.2 Corrosion Resistance

The corrosion resistance of the developed nanoparticle-polymer coatings was evaluated by the electrochemical impedance spectroscopy (EIS) test. The test was utilized a three-electrode cell setup, which consisting of a reference electrode (saturated calomel electrode), a counter electrode (platinum mesh), and a working electrode (test panel). A 30-mm diameter O-ring glass tube was clamped on the coated panels and filled with 1.0% NaCl solution; hence, the tested area was exposed to a conductive electrolyte solution during the test. The EIS measurement was herein carried out by a Gamry equipment (Reference 600 potentio/Galvanostat/ZRA), and test frequency range of 100 kHz to 10 mHz. The collected data were converted into Bode plots with impedance and phase angle curves.

To examine the long-term corrosion barrier properties of the developed coating systems, the salt spray exposure (ASTM B117) was carried out as an accelerated durability test. The specimens were exposed to salt fog spray (5.0% NaCl solution) with evaluated temperature (35° C.) while kept in a 0-Fog CCT chamber, and EIS measurements were conducted before, 24, 100, and 200 hr after the exposure.

Figure 42B:
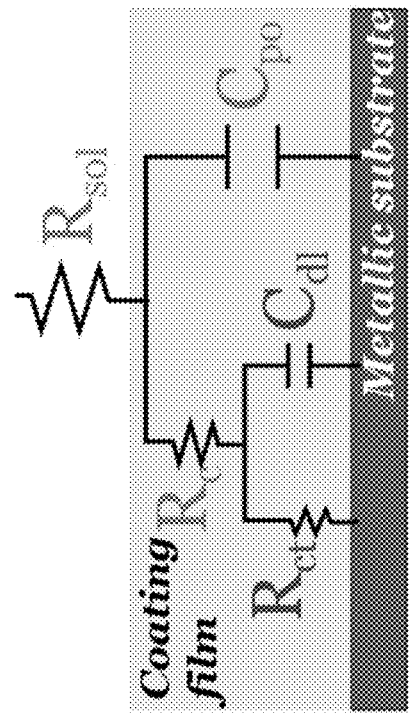
FIGS. 42(a)-42(c) show the equivalent electrical circuit models at three stages.
Figure 42A:
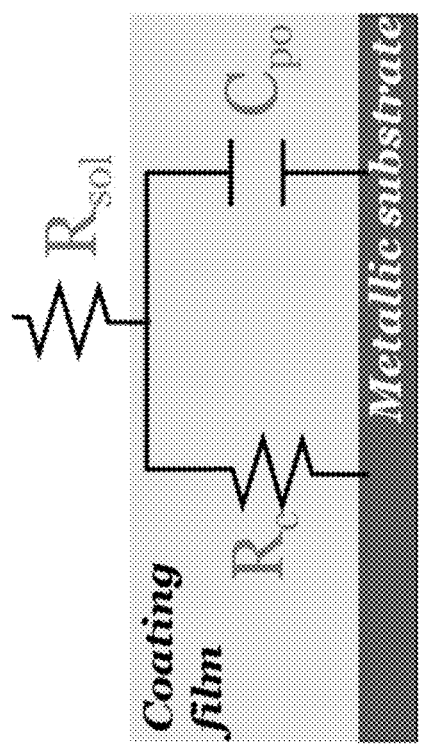
Figure 42C:
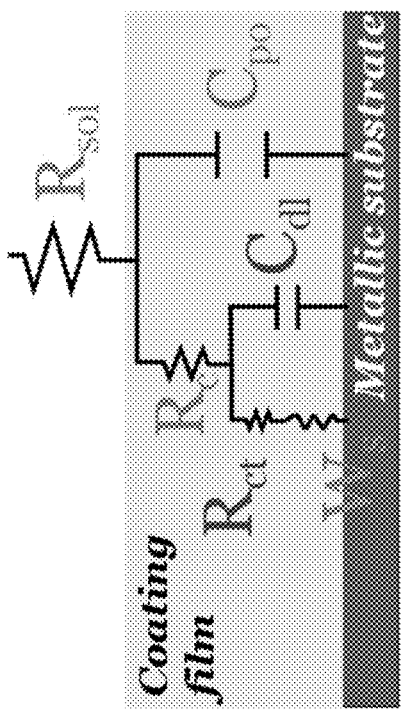

The obtained EIS data were fitted into an equivalent electrical circuit (EEC) model to describe the coating degradation process caused by corrosion impacts. As described in FIG. 42, three EEC models were illustrated in this study, and each model presented a different corrosion damage stage of a coating. Model A describes the coating that behaves an intact layer for corrosion protection, indicating the metallic substrate is isolated from corrosive media in the environment (FIG. 42(a)). At the stage, the EIS data can be fitted into a model consisting of $R_{so}1$ (solution resistance), $R_c$ (coating resistance) and $C_{po}$ (constant-phase element of the coating). The corrosive electrodes can penetrate the coating once the coating is damaged or has defects. Once the electrodes reach the coating-substrate interface, the corrosion reaction will be initiated. At this stage, Model A is not suitable to represent the coating performance; thus, $R_{ct}$ (charge transfer resistance) and $C_{dl}$ (constant phase element of double-charge) are added into the EEC model to describe the corrosion reaction, and the new model is illustrated as Model B in FIG. 42(b). After that, once the corrosion reaction is dominated by diffusion effect in the system, the Warburg impedance element (W) should be included in the EEC model to describe this stage, and the EEC model was named as Model B with W (FIG. 42(c)).

Figure 21:
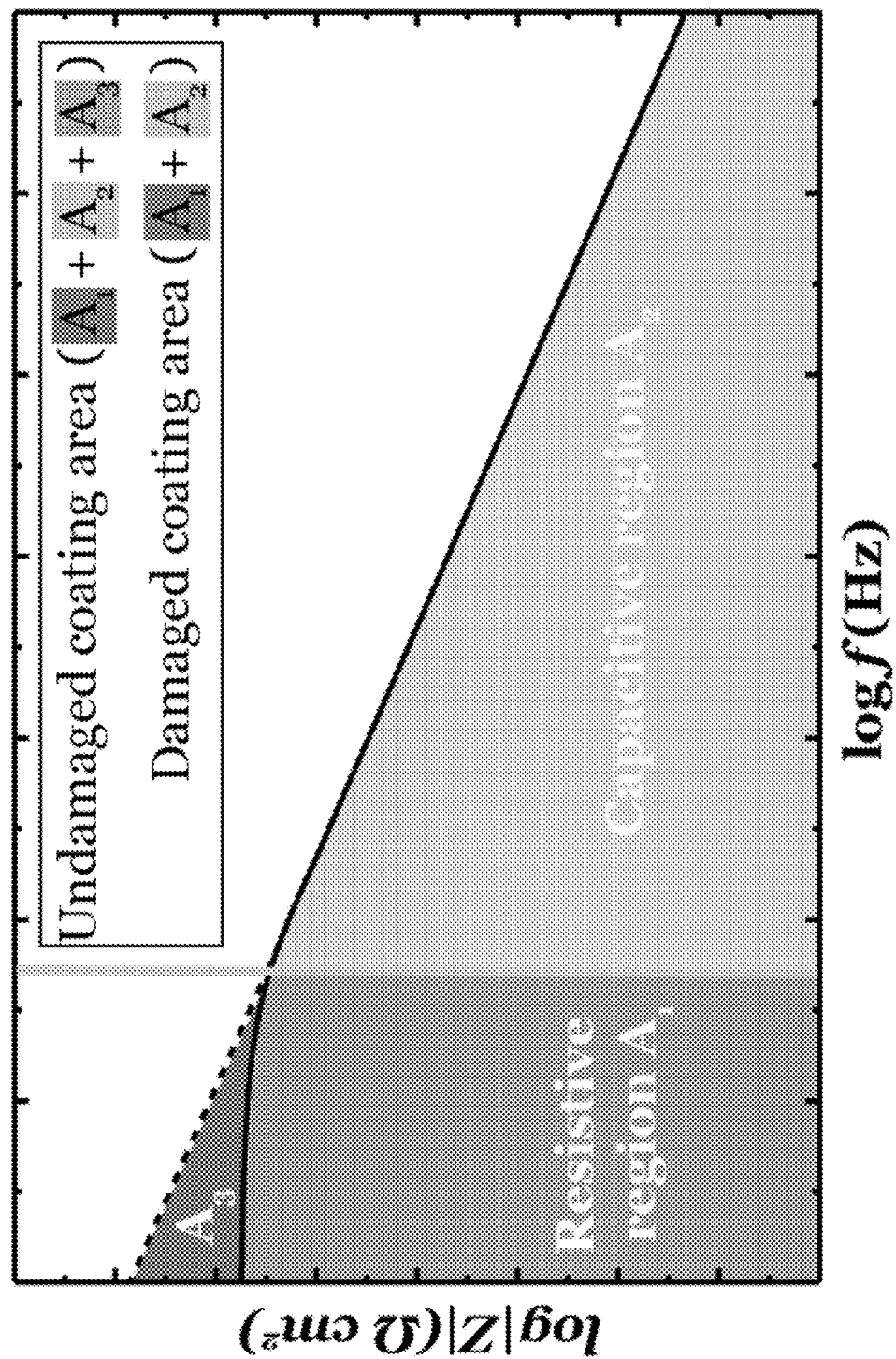
FIG. 21 shows the coating damage index for the coating degradation assessment.

In order to determine the degree of coating degradation over expose time, the coating damage index was employed as it can effectively describe the corrosion protection of a coating. The formulation was modified from early work from researchers (Ammar et al., Surf. Coat. Technol., 324: 536-545, 2017; Ramezanzadeh et al., Corros. Sci., 103:283-304, 2016), and as shown below:

$$DI(\%) = \left(\frac{A_1 + A_2}{A_1 + A_2 + A_3}\right) * 100 \quad (4)$$

where, the combination of $(A_1+A_2)$ is the area under the impedance curved for a damaged coating, and the $(A_1+A_2+A_3)$ denotes the area for an ideally perfect coating film (FIG. 21). Larger index value indicates less the coating degradation is, so the 100% index value means the coating behaves an intact film for corrosion protection.

2.2.3 Abrasion Resistance

Wear resistance of the prepared coatings was evaluated by Taber abraser test by following ASTM D 4060. The coating samples were abraded by two CS-10 abrading wheels, with a rotation speed of 72 rpm and an applied load of 1000 g. Each specimen was subjected to 1000 abrasion cycles, and the weight at 100, 500, and 1000 cycles was recorded. Both total mass loss and wear index was employed to evaluate the abrasion resistance of the composites:

$$\text{Mass loss (mg)} = M_{intact} - M_{abraded} \quad (5)$$

where, $M_{intact}$ refers to the initial weight before coating, and $M_{abraded}$ is the remaining mass after abrasion.

$$\text{Wear index (mg per cycle)} = \frac{M_{intact} - M_{abraded}}{\text{Number of abrasion cycles}} \quad (6)$$

In this case, both the total mass loss and mass loss rate of specimens were used to characterize the wear resistance of coatings.

2.2.4 Tensile Properties

To understand the damage tolerance of the coatings of the invention, a coupon tensile test was employed to characterize the tensile properties of each composite. The test was carried out by using a Shimadzu's EZ-X tester in accordance with ASTM D638 standard. The testing speed was controlled as 1 mm/min until failure; thus, tensile strength, elongation at break, and Young's modulus were calculated for each specimen.

2.2.5 Contact Angle

The hydrophobicity of the nanoparticle-polymer coatings was characterized by water contact angle test, by following ASTM D7334. Water droplet was gently deposited on the coating surface and images were captured by a camera, then the water contact angle (WCA) was calculated by a computer based on the obtained images.

2.3 Results and Discussion 2.3.1 X-Ray Diffraction (XRD) of Hybrid Nanofillers

Figure 22B:
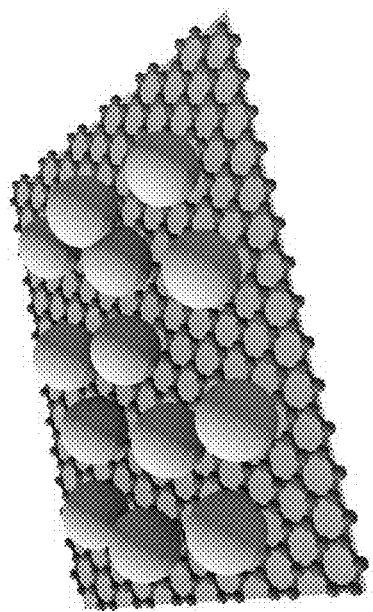
FIGS. 22(a)-22(c) show the FIG. 22(a) XRD patterns of the nanofillers, FIG. 22(b) TEM image of the GNP/NS hybrid nanofillers, and FIG. 22(c) schematic of the GNP/NS hybrid nanofillers.
Figure 22C:
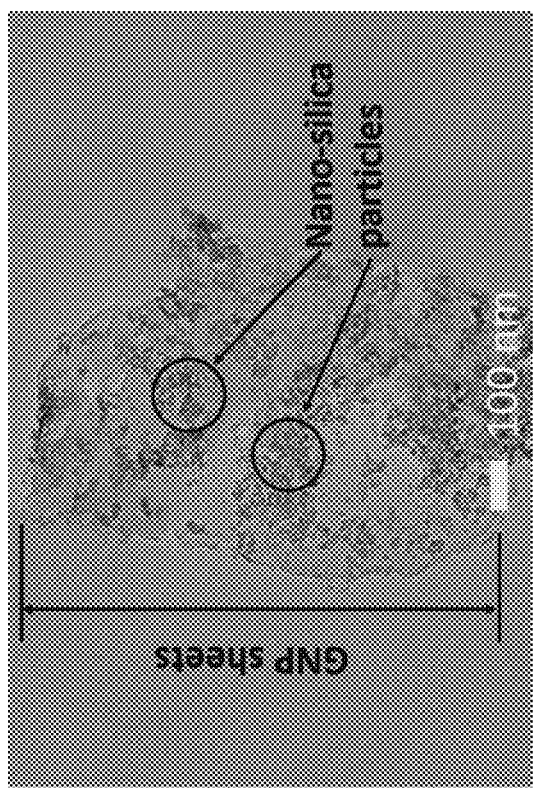
Figure 22A:
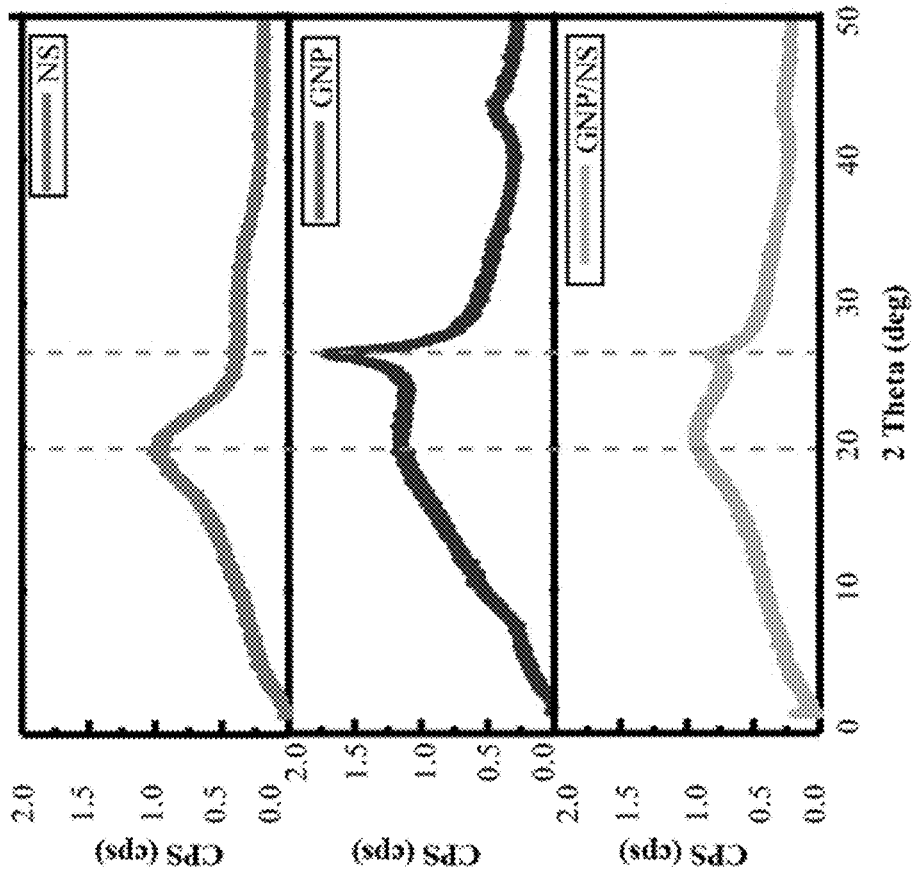

The XRD patterns of GNP, NS, and GNP/NS hybrid nanofillers were presented in FIG. 22(a). The GNP particles exhibited a sharp diffraction peak at 2θ=26.5°, indicating the GNP nanosheets are highly ordered crystalline structure. A board peak was obtained at an angle around 2θ=19.5° in nano-silica particles, which revealed that the $SiO_2$ particles have an amorphous structure in nature. Furthermore, the GNP/$SiO_2$ hybrid nanofillers exhibited two peaks at 2θ=19.5° and 26.5°; the first peak was attributed to the $SiO_2$ nanoparticles and the second one was assigned to GNP nanosheets. Results showed that the intensity of both peaks was weakened compared with single fillers, especially the peaks that originated from GNP. This observation indicating the presence of NS particles improved the intercalation and exfoliation of GNP nanosheets. Ramezanzadeh et al., *Chem. Eng. J.*, 303:511-528, 2016. Moreover, the improved exfoliation state implied the NS particles broke down the agglomerate of GNP sheets during the dispersion procedure, and the NS particles that covered the GNP surface behaved as a spacer to prevent GNP sheets restacking together after dispersion. Wan et al., *Compos. Sci. Technol.*, 82:60-68, 2013; Pourhashem et al., *Surf. Coat. Technol.*, 311:282-294, 2017; Ramezanzadeh et al., *Chem. Eng. J.*, 303:511-528, 2016; Yu et al., *Fibers Polym.*, 17(3):453-459, 2016.

Supporting this, the TEM micrograph was presented to show the morphology of the GNP/$SiO_2$ hybrid nanofillers. It is well known that the NS and GNP nanoparticles could be defined as zero, and two-dimensional materials, respectively. FIG. 22(b) showed that the GNP nanosheets were covered by the NS particles that were hanged on the surface. Apparently, the GNP/NS hybrid nanofiller formed into a special three-dimensional material, and the microstructure of the hybrid nanofillers was schematically illustrated in FIG. 22(c). This confirmed that the NS particles were attached to the surface of GNP during the dispersion procedure, which included high-speed dispersion and ultrasonication. Like mentioned earlier, and the presence of NS could prevent the GNP sheets restacking to form agglomerates after dispersion.

2.3.2 Fourier Transform Infrared Spectroscopy (FTIR) Spectra

Figure 23:
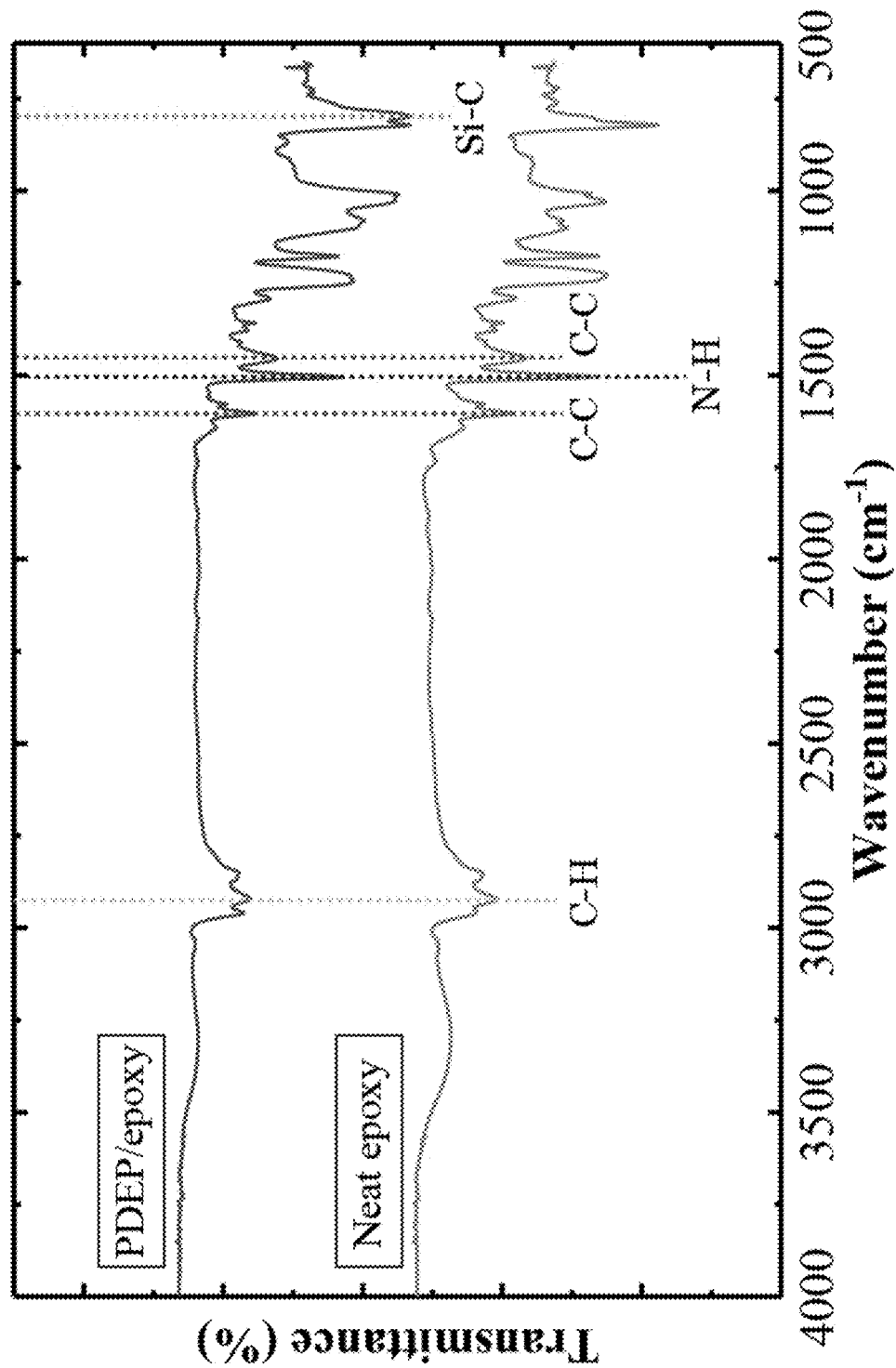
FIG. 23 shows the FTIR spectra of the neat epoxy and PDMS/epoxy composites.

FTIR spectra was utilized to study the chemical structure of neat epoxy and PDMS modified epoxy system, which investigated the chemical reaction between neat chemicals. As shown in FIG. 23, for both of the composites, the absorption peak at 2920 $cm^{-1}$ was related to the C—H stretch of the polymer backbone, while the C=C aromatic ring stretching was observed at 1607 and 1456 $cm^{-1}$. Nuruddin et al., *Polym. Polym. Compos.*, 25(4):273, 2017; Ji et al., *Express Polym. Lett.*, 10(11):950, 2016; Yang et al., *J. Appl. Polym. Sci.*, 110(5):2980-2988, 2008. A strong peak at 1507 $cm^{-1}$ was attributed to the primary amine of hardener used for epoxy resin. Nuruddin et al., *Polym. Polym. Compos.*, 25(4):273, 2017; Gonzalez et al., "Applications of FTIR on epoxy resins-identification, monitoring the curing process, phase separation and water uptake," in *Infrared Spectroscopy-Materials Science, Engineering and Technology*, InTech, 2012. However, a new peak appeared at 803 $cm^{-1}$ for the PDMS/epoxy system, which was corresponded to the Si—C band; this result indicated the reaction occurring between PDMS and epoxy resin. In addition, no peak appeared in 3500 $cm^{-1}$ in the PDMS/epoxy system, which is an also indication of the reaction between hydroxyl-terminated PDMS and epoxy as there was no free OH group in the composite. Ammar et al., *Prog. Org. Coat.*, 92:54-65, 2016.

2.3.3 Corrosion Barrier Performance of the New Developed Nanocomposite Coating

Corrosion barrier performance plays a vital role in coating's overall performance, and electrochemical impedance spectroscopy (EIS) measurement was utilized then the results were displayed using Bode plots. In order to determine the long-term performance of prepared coating systems, the coated samples were exposed to salt fog spray (5.0% NaCl solution) under-evaluated temperature (35° C.), and EIS measurement was conducted periodically.

Generally, researchers suggested that the impedance value at low frequency (0.01 Hz) represented the coating barrier properties; thus, the higher $Zmod_{0.01\ Hz}$ in the impedance curve, the better corrosion protective property that the coating has. Moreover, the phase angle curve reflects the intactness of a coating system, and a value of 0° and 90° represents the coating has low and high degrees of intactness, correspondingly. Overall, a perfect coating film has a straight line with a slope of −1 in impedance curve and phase angle values are close to 90° in wide frequencies; in this case, the coating can prevent electrolyte media to penetrate into the coating-substrate interface and initiate corrosion reaction.

At the fresh stage, the neat epoxy coating exhibited good corrosion protection performance for the substrate. However, according to the impedance plot, an apparent bend was obtained in the low frequencies, while the phase angle reduced to 17° in the corresponded frequency region. In addition, the EIS data was well-fitted to the Model B with the Warburg model at this stage (Table 2). These observations revealed that the neat epoxy could not behave as an intact barrier film against corrosive electrodes. This was further confirmed by the EIS measurements after exposure, the impedance values were significantly reduced as the exposure time elapsed. Meanwhile, the frequency that has a low phase angle was shifted to the higher frequency region, indicating the micropores and cracks in the coating film was developed. These observations revealed that the neat epoxy was damaged while exposing to the salt spray, which made it not suitable to provide long-term protection for the metallic substrate.

Figure 24A:
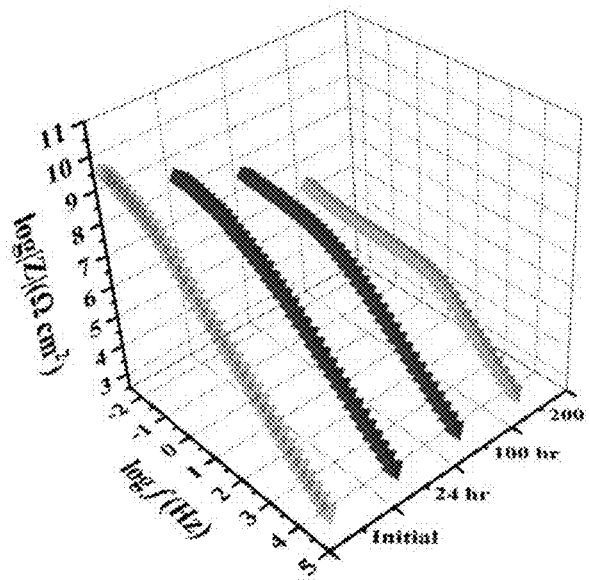
FIGS. 24(a)-24(h) show the impedance and phase angle curves of the neat epoxy (FIG. 24(a) and FIG. 24(b), respectively), PDEP (FIG. 24(c) and FIG. 24(d), respectively), GS-EP (FIG. 24(e) and FIG. 24(f), respectively), GS-PDEP coatings (FIG. 24(g) and FIG. 24(h), respectively).
Figure 24B:
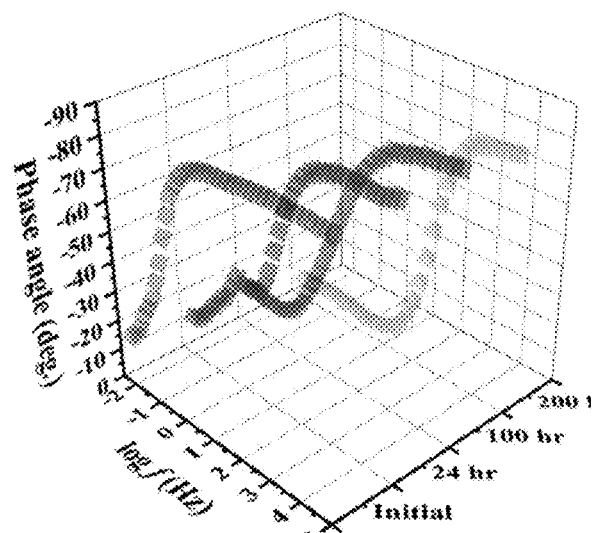
Figure 24C:
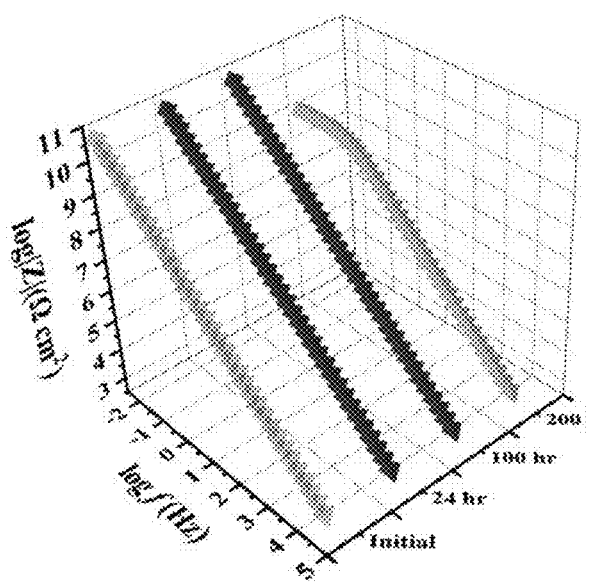
Figure 24D:
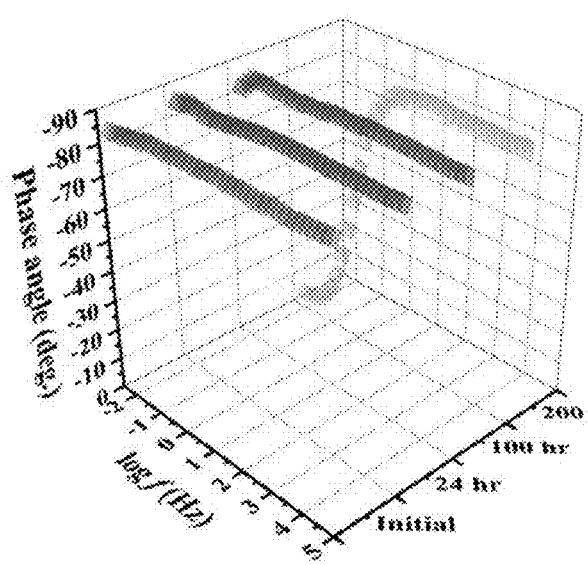
Figure 24E:
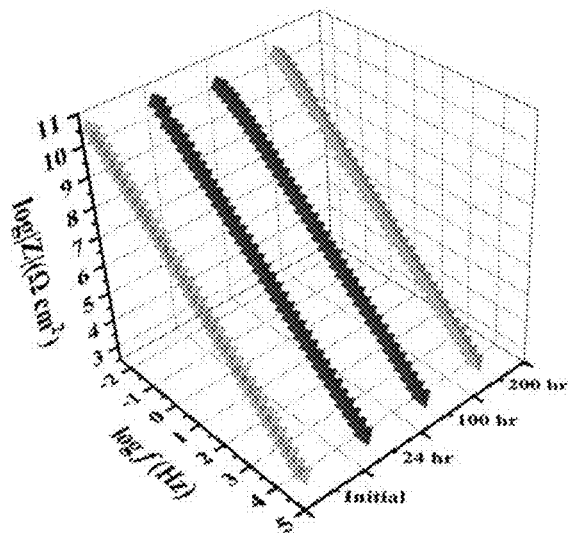
Figure 24F:
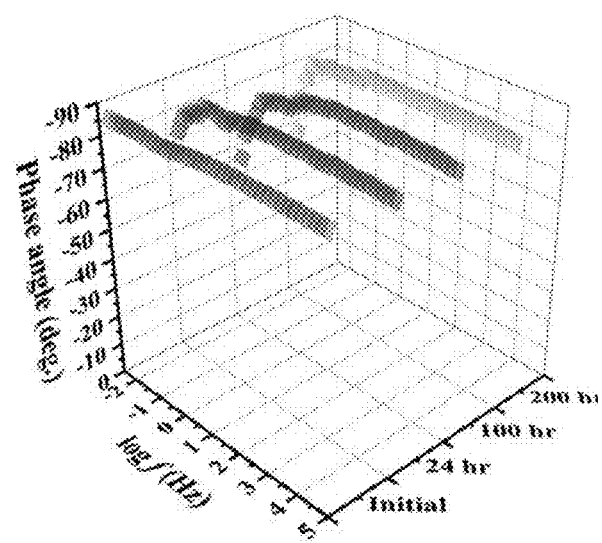

On the other hand, as clearly illustrated in FIG. 24(c)-(f), the incorporation of GNP/NS nanofillers and PDMS both resulted in a remarkable enhancement in the anti-corrosion performance. Higher $Zmod_{0.01\ Hz}$ values and phase angles were obtained before and after exposure in GS-EP and PDEP samples, compared with the neat epoxy. However, a reduced impedance value was observed after 200 hr exposure in GS-EP coating, and it could be understood that even the penetration pathways were enlonged by the addition of nanofiller, the corrosive media were still able to reach the coating-substrate interface after long time exposure. Results revealed that the incorporation of PDMS in epoxy resin resulted in a significant improvement in corrosion barrier protections, as no significant changes were observed in impedance curves. In this case, the enhanced corrosion resistance was attributed to the hydrophobic polymer coating resin. Ammar et al., *Surf Coat. Technol.*, 324:536-545, 2017. However, slight degradation was still observed in the PDEP coating system; as shown in FIG. 24(d), apparent reduction was found in the phase angle curves, as the phase angle value at 0.01 Hz dropped to 60° after 100-hour exposure.

Figure 24G:
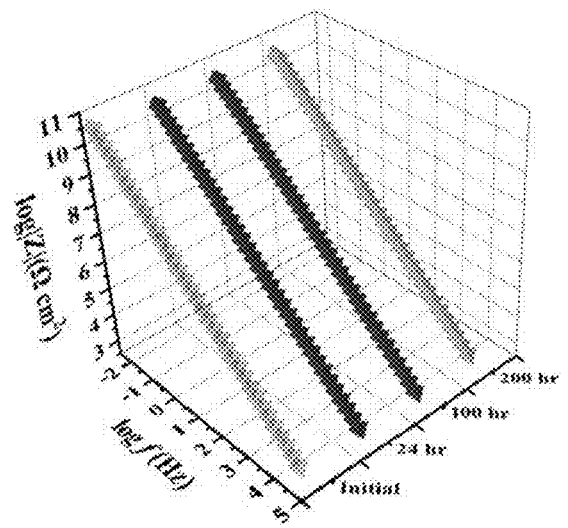
Figure 24H:
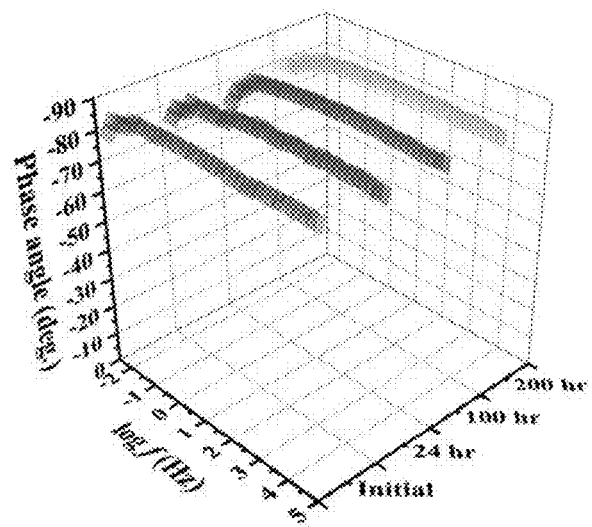

The prepared PDMS modified epoxy coating with 1% GNP/NS demonstrated high impedance value at the low-frequency region, and the phase angle was around 90° in both high and low-frequency regions. The long-term performance of the GS-PDEP coatings showed a good agreement with the EIS results at the fresh stage. As clearly illustrated in FIG. 24(g), the GS-PDEP coatings significantly enhanced the long-term barrier performance, as the Zmod values for maintained higher than $10^{10}$ in the test range. Moreover, the value of phase angle in the low frequency remained unchanged and close to 90° in GS-PDEP coating. As presented in Table 4, the GS-PDEP was remained at Model A before and after the exposure, indicating the samples have effectively against the corrosion attacks, which was consistent with the findings in FIG. 24. The results reflected an excellent protective property of the coatings, which was attributed to the combination of the elongated penetration pathway and hydrophobic surface provided by the hybrid nanofillers and PDMS in the polymeric matrix, respectively.

combination of resin modification and nanofiller reinforcement had outperformed the coating with the single enhancements.

2.3.4 Abrasion Resistance of the New Developed Nanocomposite Coating

The abrasion resistance plays a vital role in quantifying the damage tolerance of a protective coating, and the anti-abrasion performance was herein evaluated by using the Taber abraser method (ASTM D 4060). The total wear mass loss and the wear index were employed to characterize the abrasion resistance of the developed coating systems, and less mass loss and wear index indicates better abrasion resistance.

Figure 26A:
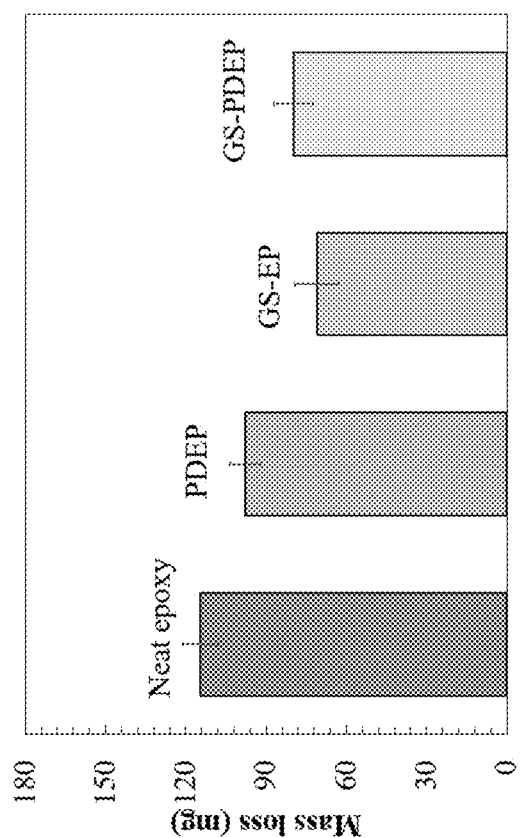
FIGS. 26(a)-26(c) show the FIG. 26(a) total mass loss of the test samples after abrasion test.
Figure 26C:
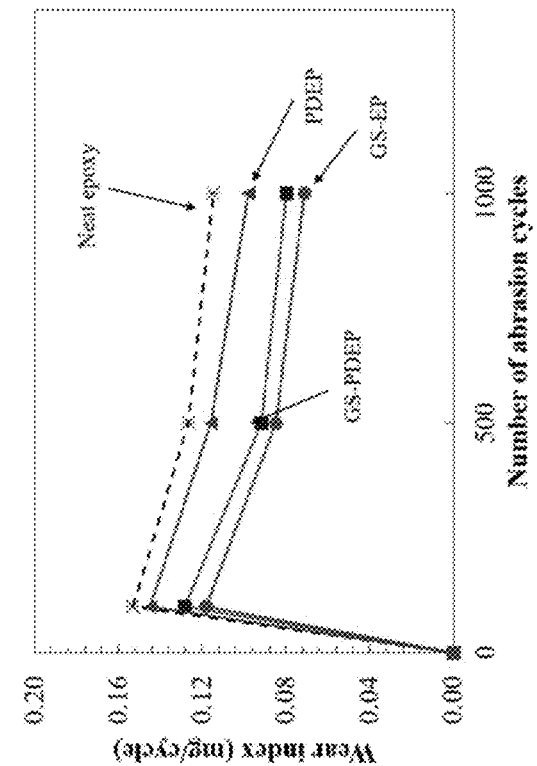
Figure 26B:
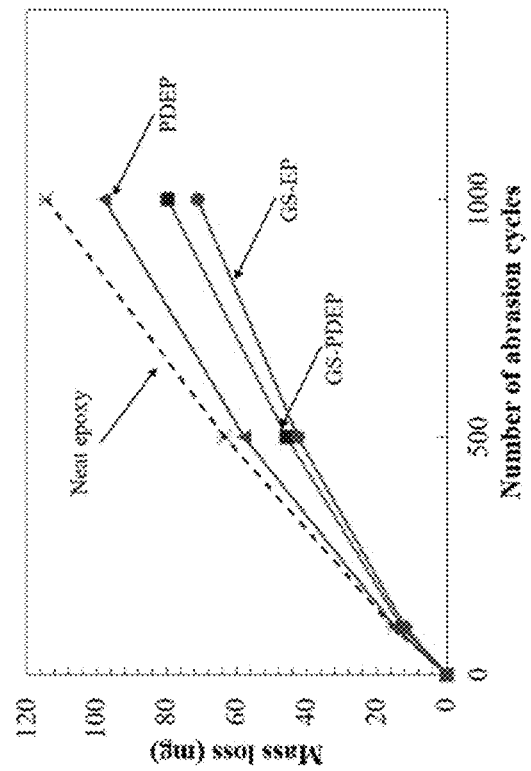

As displayed in FIG. 26, the neat epoxy had the highest mass loss during the test, which were around 15, 63, and 115 mg at 100, 500, and 1000 cycles, correspondingly. Inclusion of PDMS into epoxy resin showed an improved abrasion resistance, and the mass loss reduced 15% at 1000 cycles. Particularly, the better anti-abrasion performance was offered by the incorporation of GNP/NS hybrid nanofillers into the polymer. The mass loss was around 71 mg in GS-EP specimen which was 38% less than the neat epoxy. Therefore, the results suggested that the incorporation of nano-

TABLE 4

Equivalent electrical circuit models for the developed coating during exposure

| | Exposure to accelerated environmental stresses | | | |
|---|---|---|---|---|
| Label | Onset | 24-hr | 100-hr | 200-hr |
| Neat epoxy | Model B with W | Model B with W | Model B with W | Model B with W |
| PDEP | Model A | Model A | Model A | Model A |
| GS-EP | Model A | Model A | Model A | Model B |
| GS-PDEP | Model A | Model A | Model A | Model A |

Figure 25:
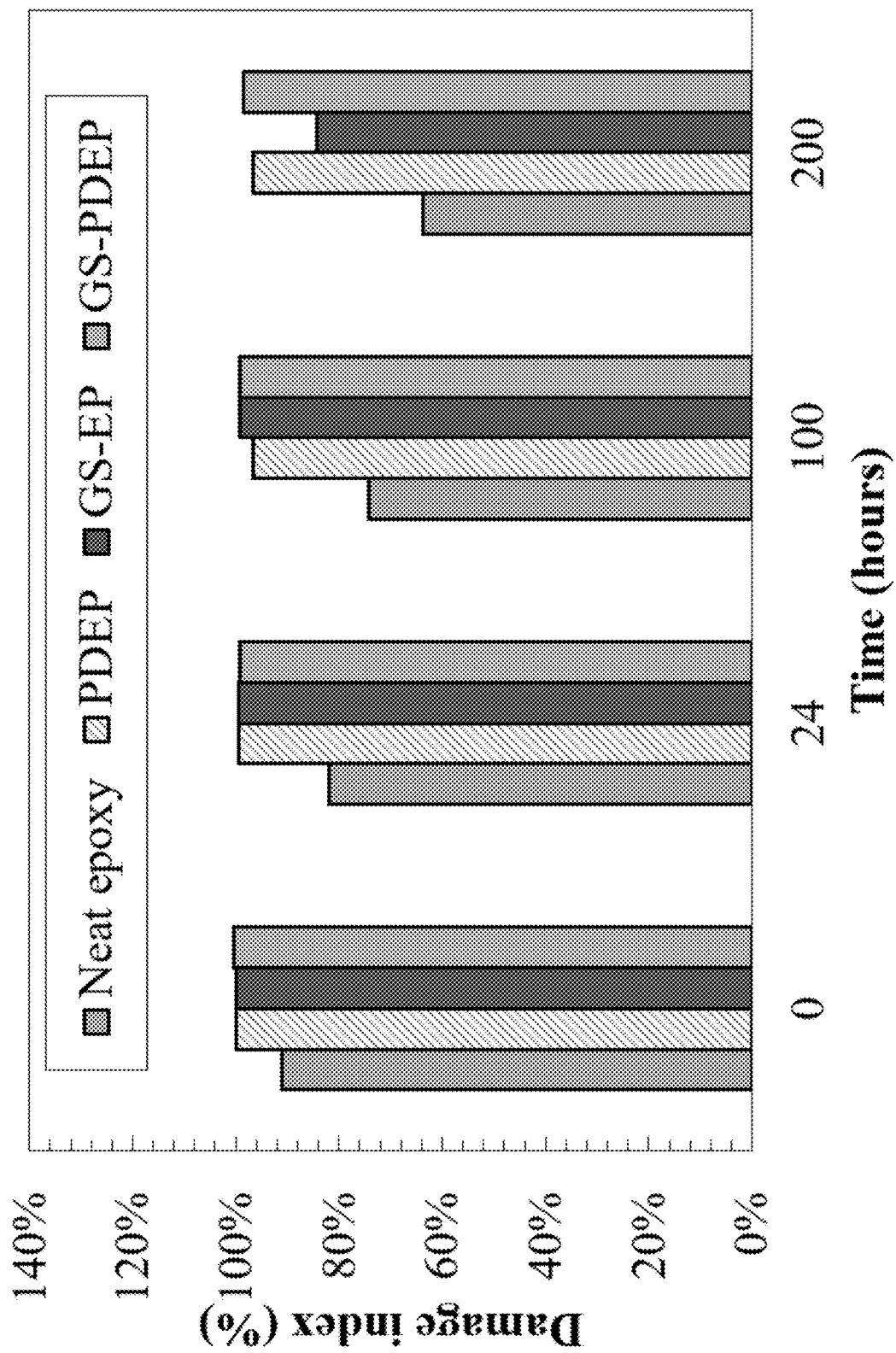
FIG. 25 shows the damage index for the coating degradation assessment.

FIG. 25 presented the damage index values of all the samples and the analysis of the damage index was in accordance with the equation 1 and FIG. 21. The results confirmed the findings in the Bode plots or equivalent circuit models. Clearly, in all the test specimens, the neat epoxy always exhibited the weakest corrosion protection, and the corrosion protection significantly degraded when the exposure time elapsed. The results confirmed that the existence of defects in the neat epoxy group at the initial stage, as the index value was 82%; moreover, severe damages were developed as the index value decreased to 64% at 200 hours.

On the other hand, the index values for PDMS/epoxy and GNP/epoxy composites were both around 100% before exposure, suggesting that they were behaved as an intact film to protect the substrate, and high index values were maintained at 24 and 100 hr exposure for both coatings. However, degradation was observed in the GS-EP sample after 200 hr, indicating the elongated diffusion pathway attributed by nanofillers could dramatically improve the corrosion resistance in the short-run, but the coating was still weak in durability for a long-term test due to the hydrophilic epoxy resin. Conversely, the PDMS/epoxy coating (PDEP) showed its extraordinary anti-corrosion performance, regardless of exposure time in salt spray, this suggesting that the increased hydrophobicity could effectively prevent the penetration of corrosive media and resulted in improved durability against corrosive environment. Particularly, the combination of PDMS and nanofiller reinforcement exhibited the highest index value regardless of the testing duration, as the GS-PDEP coating maintained an index value of 100% at all times. This phenomenon confirmed that the fillers could assist the composites by transferring the abrasive forces to the nanofillers during the deformation process, which confirmed elsewhere. Wang et al., *Compos. Part B Eng.*, p. 107103, 2019; Fan et al., *Prog. Org. Coat.*, 86:125-133, 2015. Superior improvement in the abrasion resistance was also observed in the GS-PDEP specimens, indicating the addition of nanofillers has dramatically strengthened the PDMS/epoxy composites as well. To understand the anti-abrasion performance over time, the mass loss and wear index at varied abrasion cycles were summarized and presented in FIG. 26. The results revealed that the incorporation of PDMS or nanofillers enhanced the epoxy composite regardless of the number of abrasion cycles. Based on the observations from FIG. 26(b), all the specimens had a nearly constant rate between mass loss and abrasion cycles. The wear index values indicated that the GS-PDEP samples had less mass loss rate regardless of the abrasion cycles. For instance, the neat epoxy had a wear index value of 0.15, 0.13, and 0.11 mg/cycle at the 100, 500, and 1000 cycles, correspondingly; while the mass loss rate of the GS-PDEP group was 0.13, 0.092, and 0.080 mg/cycle at the tested cycles.

Figure 27B:
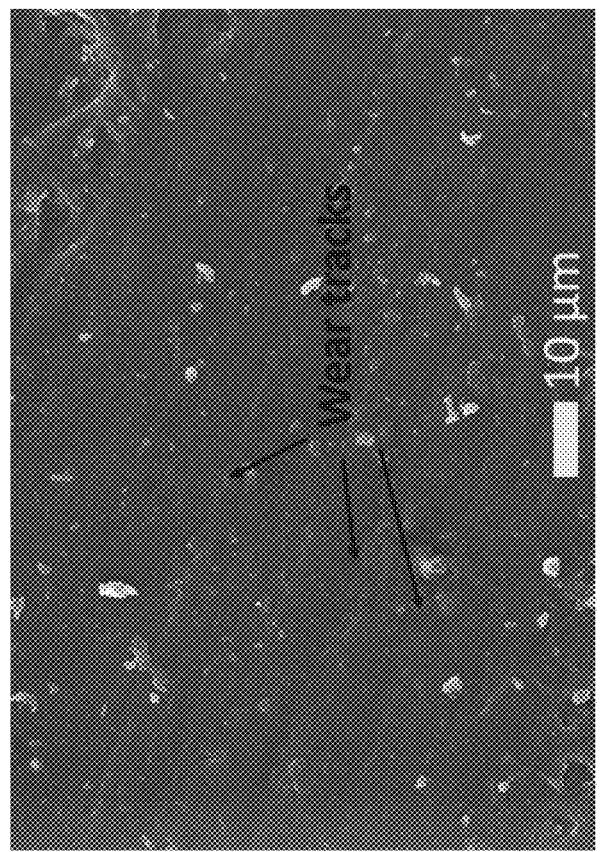
FIGS. 27(a)-27(b) show the SEM images of abraded surface for FIG. 27(a) neat epoxy and FIG. 27(b) GS-PDEP sample.
Figure 27A:
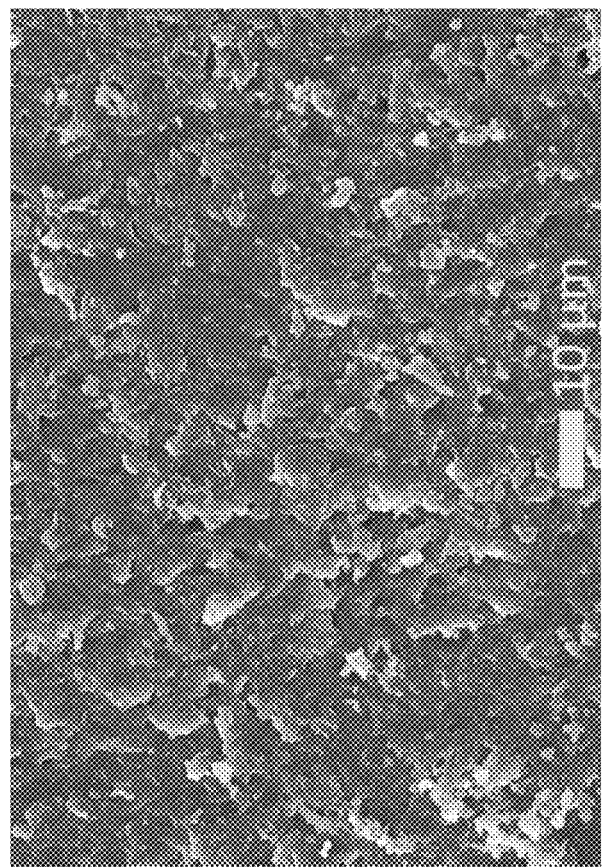

The SEM images of the worn surface were employed to demonstrate the feature of the specimens with enhanced abrasion resistance. The neat epoxy and GS-PDEP composites were selected as a representative in FIG. 27. Apparently, the neat epoxy composite was subjected to a severed plastically deformation, which attributed to the low wear resistance, as the surface was rougher with a large proportion of micro-cleavages and fractures. On the contrary, improved surface features were observed in GS-PDEP composite, as decreases in the amount and size of micro-grooves indicating an enhancement of wear resistance, which showed a strong agreement with the results from Taber abrasion test.

2.3.5 Tensile Behavior of the New Developed Nanocomposite Coating

Figure 28A:
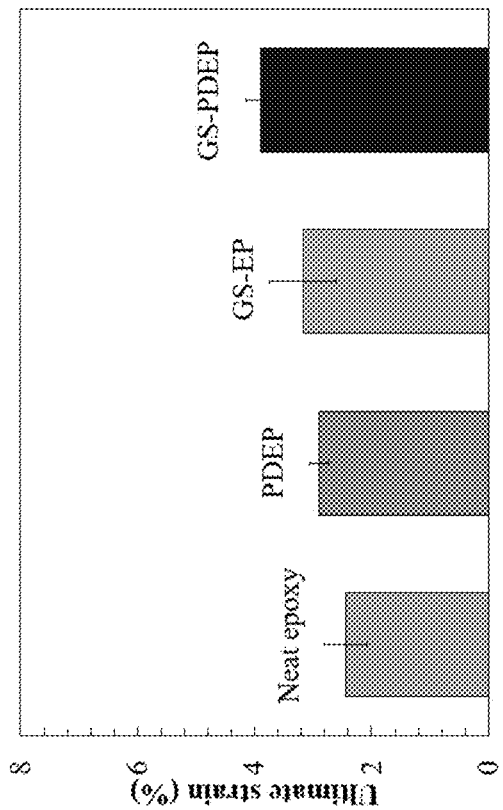
FIGS. 28(a)-28(c) show the tensile properties of 1% GS-PDEP coating, FIG. 28(a) tensile strength, FIG. 28(b) strain at failure, and FIG. 28(c) Young's modulus.
Figure 28B:
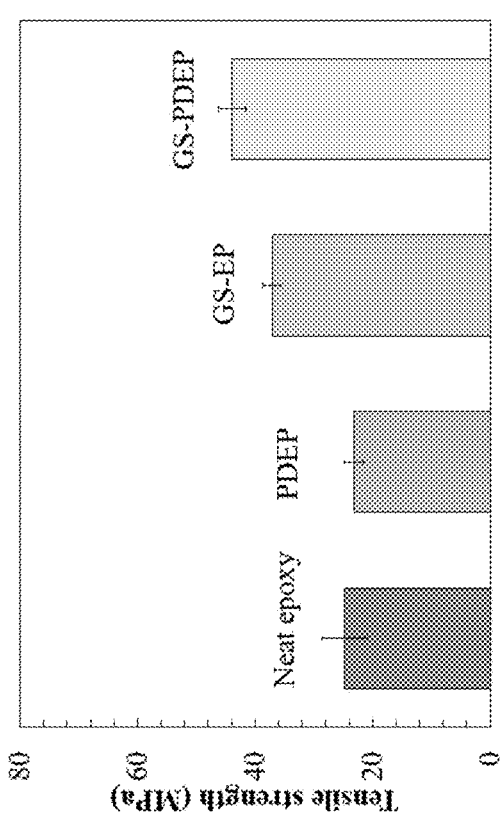
Figure 28C:
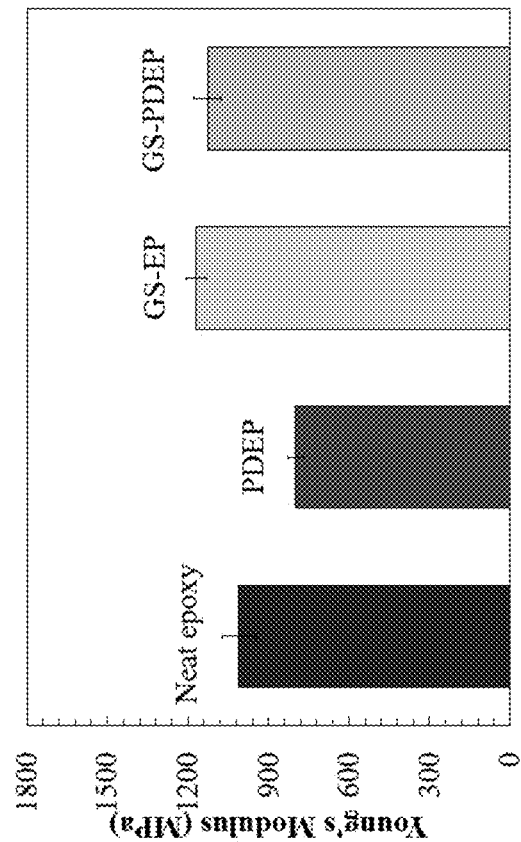

The tensile properties of the protective coating could assist in evaluating their tolerance against mechanical damage for real-world application, and FIG. 28 presented the analysis of tensile properties for the developed coatings. The analysis was conducted by a coupon test, which allowed to address the tensile strength $$\left(\sigma = \frac{P}{A}\right),$$

strain at failure $$\left(\varepsilon = \frac{\Delta L}{L_0}\right),$$

and Young's modulus $$\left(E = \frac{\sigma}{\varepsilon}\right)$$

of the composites, where P is the ultimate load, A is the cross-sectional area, Lo and ΔL are initial length and change in length, respectively.

FIG. 28(*a*) showed that the neat epoxy had a tensile strength of 24.7 MPa, and a slight degradation was observed when PDMS modification was added into epoxy. This indicated that the addition of PDMS could not enhance the tensile strength of the composite. However, the GNP/NS hybrid nanofillers significantly improved the tensile properties as the strength raised to 37.1 MPa in the GS-EP group. Surprisingly, similar to abrasion resistance properties, the hybrid nanofiller also showed dramatically enhanced tensile strength in PDMS-Epoxy composite. The tensile strength of GS-PDEP was 43.9 MPa, which increased by 78% compared with neat epoxy. This indicated the incorporation of well-dispersed GNP/NS hybrid nanofillers resulted in enhanced tensile strength in both neat epoxy and PDMS-Epoxy resins.

The ultimate strain is the elongation at the point of failure when the coating is subjected to deformation. Improvement was observed in all the modified composites; thus, the addition of PDMS and hybrid nanofiller led to an increase in ultimate strain, as shown in FIG. 28(*b*). Apparently, the highest reinforcement was obtained in GS-PDEP composite, and the ultimate strain was 4.0% while the neat epoxy was 2.4%.

The Young's modulus of the GS-PDEP nanocomposites exhibited an identical trend with the tensile strength and strain (FIG. 28(*c*)). The addition of PDEP reduced Young's modulus of the neat epoxy, while the GNP/NS nanofillers attributed significant improvement. Particularly, the GS-PDEP group has a similar Young's modulus value with the GS-EP composite, which increased by about 12% compared with the neat epoxy.

Figure 29B:
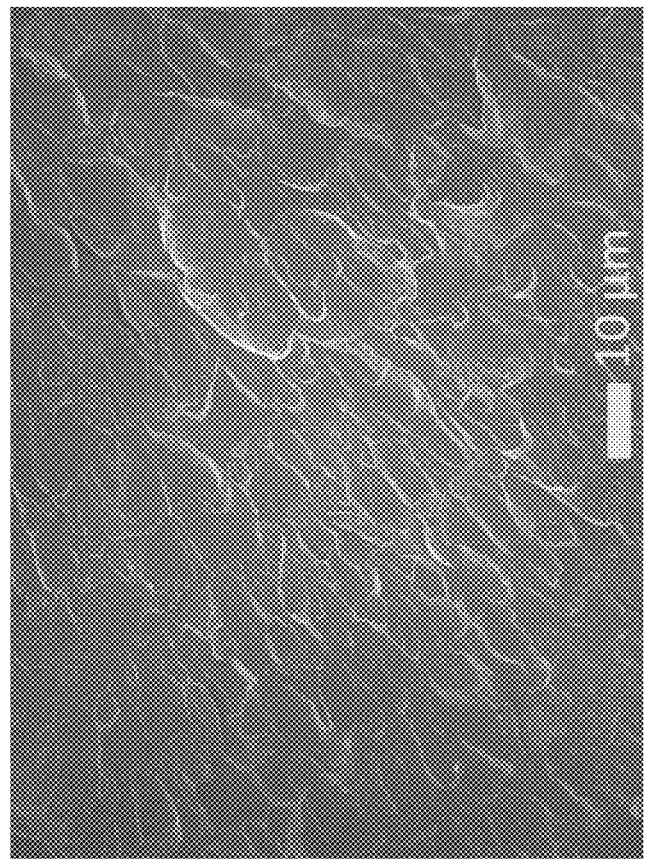
FIGS. 29(a)-29(b) show the cross-sectional SEM images of fractured surface for FIG. 29(a) neat epoxy and FIG. 29(b) GS-PDEP sample.
Figure 29A:
Figure 30:
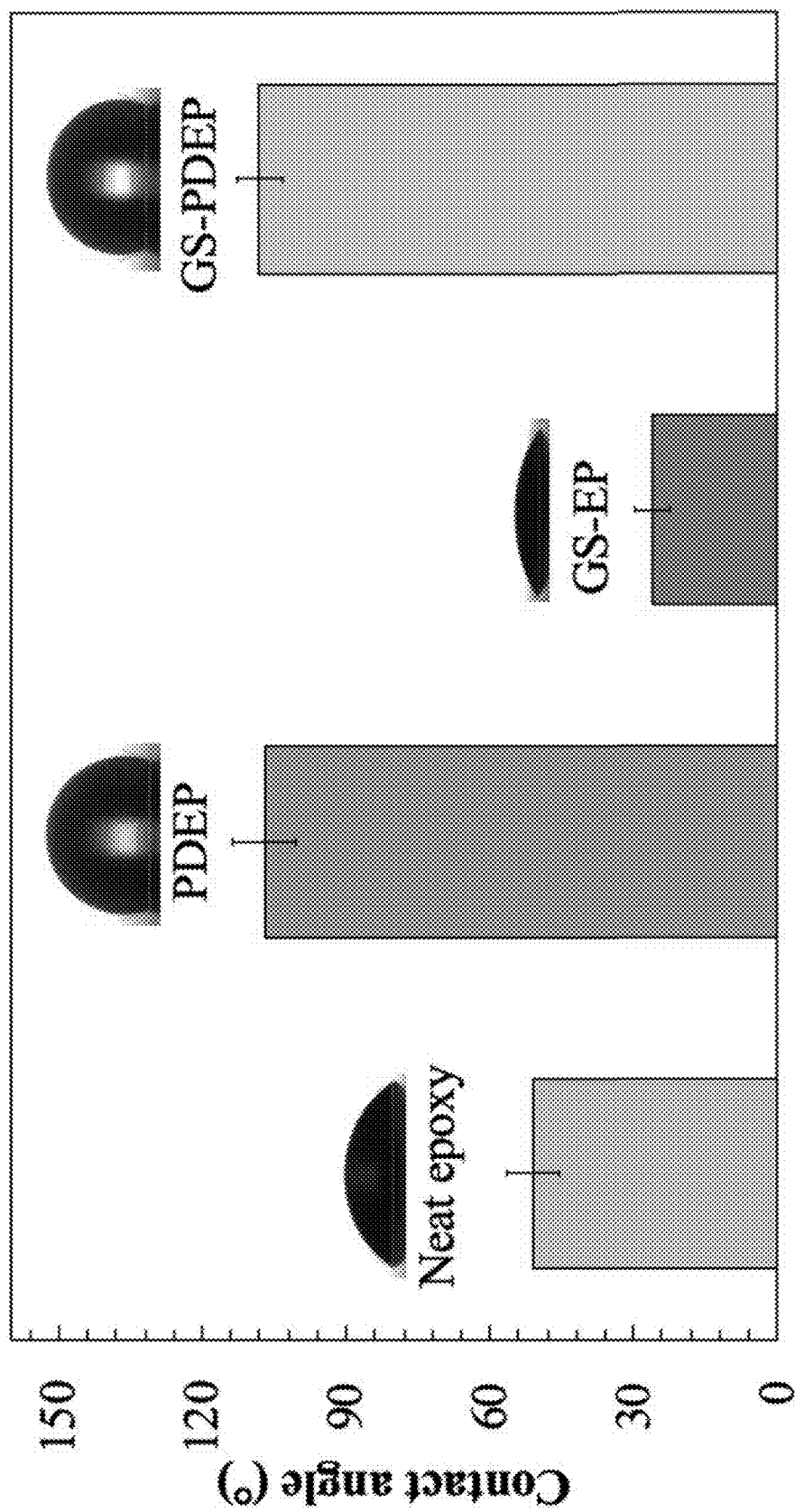
FIG. 30 shows the water contact angle of the developed coatings.

The SEM image of fracture surfaces for the neat epoxy and GS-PDEP specimens was selected as presented in FIG. 29. It seemed that the pure epoxy has a relatively smooth surface compared with the GS-PDEP sample, representing a typical brittle fracture from the epoxy sample under tensile stress. On the contrary, the GS-PDEP specimen has a significantly rougher fracture surface, with more compacted cleavages and complicated texture, implying the composite has higher energy absorption and better fracture toughness. This observation showed a strong agreement with the finding from the tensile test results in FIG. 28.

2.3.6 Contact Angle Measurement of the New Developed Nanocomposite Coating

The water contact angle (WCA) test was utilized to characterize the water-repellency of the developed coatings. The contact angle of the neat epoxy was 51°, indicating the surface was hydrophilic that easy to attract and absorb water in a moist environment; thus, it resulted corrosion reaction to the metallic substrate and eventually shortened the service life. The addition of GNP/NS hybrid nanofiller showed a reduced water repellency and the WCA decreased to 26°. With the content of PDMS in the epoxy resin, the WCA of the coating increased to 110°, as presented in FIG. 28. In addition, similar improvement was also observed in the GS-PDEP group, indicating a superhydrophobic nature was induced to prevent water from penetrating the coating.

2.4 Chemical and Mechanical Stability of the Hydrophobic Coating

Figure 31A:
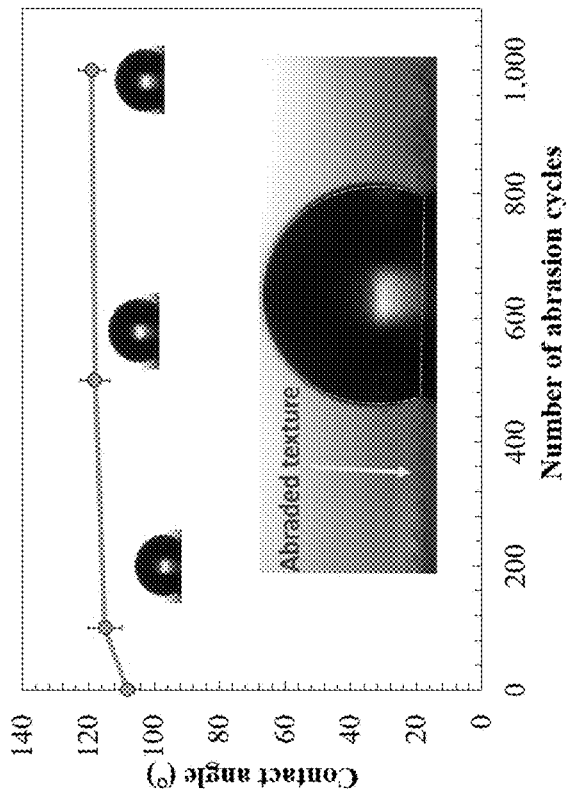
FIGS. 31(a)-31(c) show the water contact angles of the GS-PDEP coating versus FIG. 31(a) salt fog exposure time, and FIG. 31(b) abrasion cycles, and FIG. 31(c) SEM image of the GS-PDEP coating surface after abrasion.
Figure 31B:
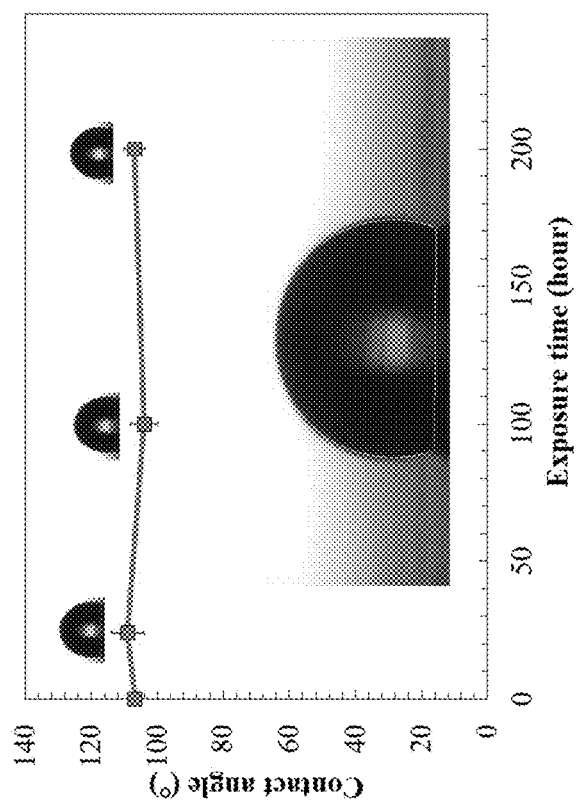
Figure 31C:
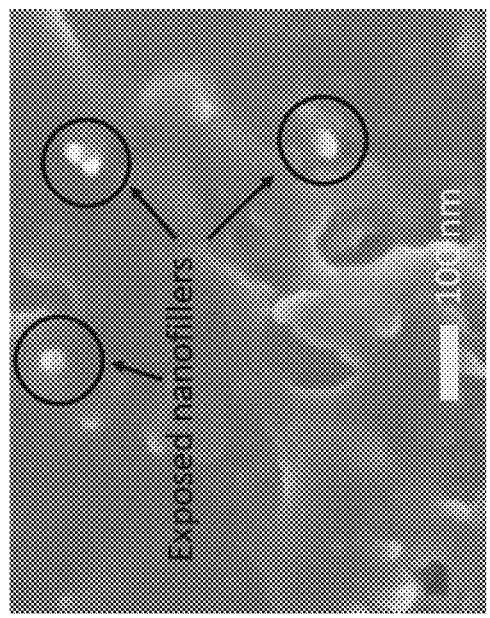

To study the stability of the water repellency against various damages, the water contact angle was measured after the developed GS-PDEP nanocomposite coating subjected to salt fog spray and abrasion test. As shown in FIG. 31, the GS-PDEP coating was durable against the corrosive environment and mechanical damage, which are the major challenges for superhydrophobic surfaces. It was clear that the GS-PDEP coating has superior water repellency with great durability, which can prevent the water from penetrating the coating in real-world applications.

FIG. 31(*a*) presented the contact angle changes with salt spray hours, while the coating was exposed to salt fog spray (5.0% NaCl) and evaluated temperature (35° C.). The results showed that the water repellency was not decreased regardless of the exposure time. As the exposure time increased to 24 and 100 hours, slight changes were observed but the high WCAs have remained. After 200 hours of salt spray, the WCA was maintained around 110°, implying that the developed superhydrophobic coating has excellent chemical stability in a corrosive environment.

The mechanical stability of the GS-PDEP coating was investigated after the abrasion test, and the coating surface was subjected to two CS-10 abrasive rollers with a pressure of 122.6 KPa applied on each roller, which is a typical test method to evaluate heavy-duty protective coatings. FIG. 31(*b*) presented the water contact angle changes with abrasion cycles. The abrasive wheel severely damaged the coating surface during the abrasion test, and abraded textures could be observed on the coating surface. However, even after 1000 cycles of abrasion, the water contact angle was not decreased; surprisingly, a slight increase in WCA was observed. The WCA of the coating raised to around 120° after 100 cycles and remained after 1000 cycles. It was worth to mention that higher water contact angles were observed after the abrasion test; the possible main factor was because more hydrophobic nanofillers were exposed after the top surface of the coating was damaged, which assisted the PDMS-epoxy coating in forming a surface with higher water repellency properties. SEM image of the abraded surface for the developed coating was utilized to confirm this statement, severe damages were observed on the surface while the nanofillers were exposed in the damaged area. Thus, the results proved that the developed coating film was robust enough to maintain the hydrophobic properties after mechanical damages.

2.5 Conclusion

In summary, GNP/NS loaded PDMS/epoxy nanocomposite was synthesized via a facile solvent-free fabrication method, and the obtained coating was suitable for various application methods. The developed coating has a dramatic improvement in anti-corrosion performance, and the coating displayed long-term resistance when they were exposed to accelerated weathering environments. The results of the coupon tensile test confirmed that the inclusion of GNP/NS nanofiller in the polymer resin could improve the strength, strain, Young's modulus, as they are critical mechanical properties for engineering applications. The developed coating also displayed a reduced mass loss after abrasion, indicating a dramatically enhanced wear resistance. SEM images were utilized to examine the surfaces after tensile and abrasion tests virtually. Significantly rougher fracture surfaces with compacted cleavages were observed in the developed coating, as compared to the neat epoxy; indicating the composite has higher energy absorption and fracture resistance. After abrasion, the decreased amount and size of micro-cracks were observed in the developed coating; this observation indicated the coating has stronger toughness when subjected to the abrasion forces, which was consistent with the results of mass loss. The increased contact angle suggested that the coating has excellent hydrophobicity. Moreover, the surface was robust enough as the hydrophobicity has remained even after mechanically damaged or exposed to an accelerated weathering environment. Such a robust multifunctional corrosion protection coating with remarkable durable hydrophobicity is useful in applications in civil infrastructures.

Example 3

3.1 Synthesis of Nanoparticle-Polymer Composite

Figure 43:
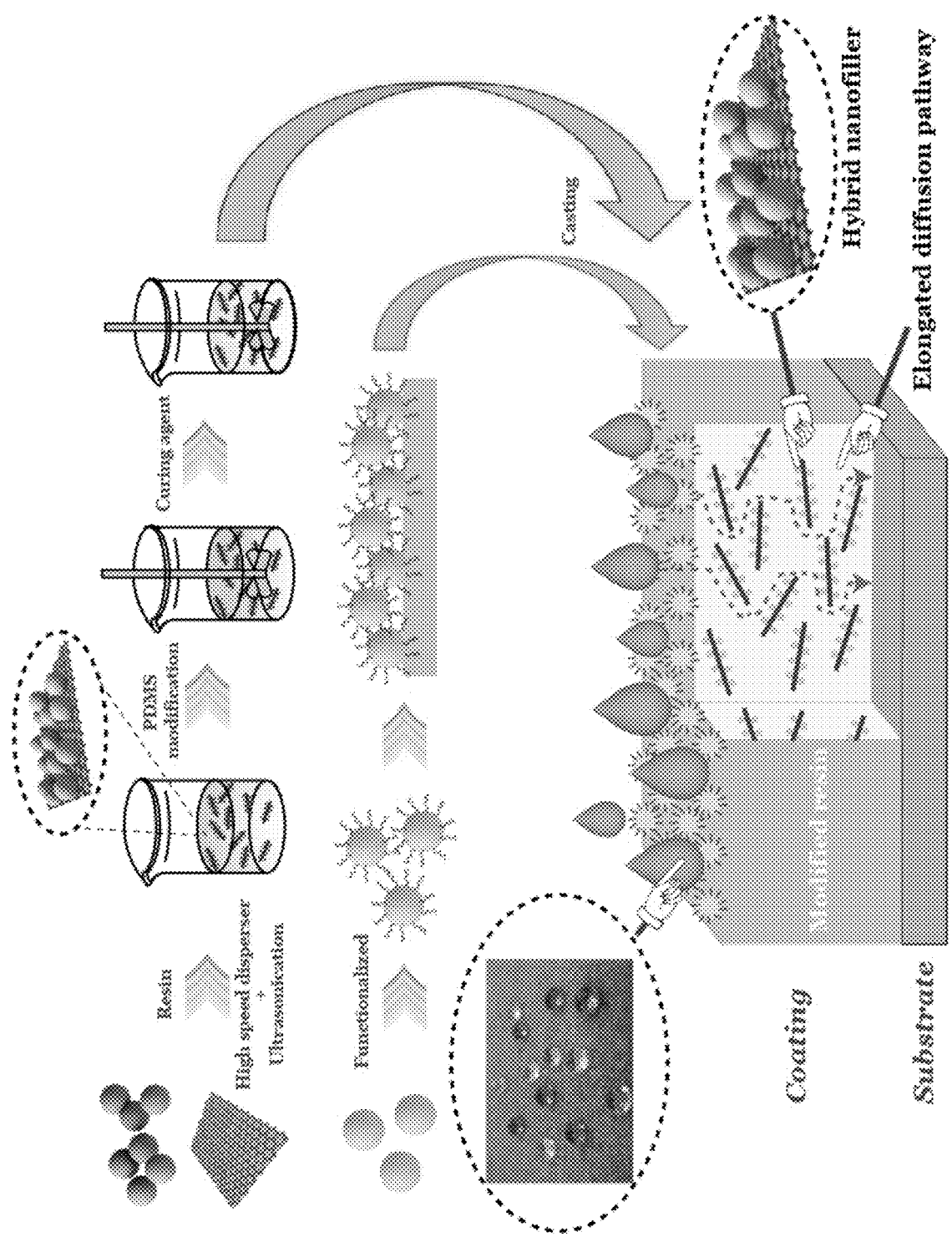
FIG. 43 shows a schematic illustration of the superamphiphobic nanoparticle-polymer coating.

As shown in FIG. 43, graphene nanoplatelets (0.52 g) and nano silica (0.52 g) were mixed with EPON™ 828 resin (67.5 g) by high-speed dispersion for 30 mins with a rotation speed of 4000 rpm, and the mixture was maintained in a water-ice bath during the mixing. Then the solution was ultrasonicated by a ¾" probe at 100% amplitude, the ultrasonication was using a 30 s on/off cycle, and the total duration was 60 min; in addition, a water-ice bath was also used to cool the solution during the ultrasonication. After the dispersion process, the nanoparticles formed a homogeneous suspension in the epoxy resin.

The nanofiller/epoxy mixture was stirred while PDMS (7.5 g), APTES (2.13 g), and DBTDL (0.075 g) were added during the mixing. To allow the PDMS to react with epoxy, the mixture was stirred under a speed of 800 rpm at 80° C. for 20 min. The addition of EPIIKURE™ Curing Agent 3175 (36.35 g) was mixed into the as-prepared mixture and stirred for 10 min, and the nanocomposites were ready to cast on metallic substrates.

3.2 Synthesis of Superamphiphobic Particles $SiO_2$ NPs (2 g) and FDTS (3 g) were added into a flask with 160 ml hexane and refluxed for 3 hours to allow the FDTS modify the surface of $SiO_2$. The prepared solution was then dried and grounded, and the obtained white fine powders were the fluorinated $SiO_2$ NPs.

3.3 Coating Treatment

The prepared nanofiller composite coatings were coated on a steel substrate with an 8 mils drawdown bar. The coated substrates were then air-dried for 3 hours and the fluorinated $SiO_2$ NPs were applied to the coating surface by a natural fiber brush; and the brush-coating was repeated around 8~10 times to achieve a uniform layer of NPs. After that, the specimens were left at room temperature for a few days to allow completely dry and ready for characterization.

3.4 Characterization Methods

FTIR measurements were carried out with a Nicolet 8700 spectrometer to characterize the PDMS modifier epoxy resin and fluorinated $SiO_2$ NPs. The particle size of the hybrid nanofillers was determined by dynamic light scattering (DLS) method with a submicron particle sizer (Nicomp 380). Furthermore, a Bruker AXS' D8 Discover multipurpose X-Ray Diffractometer was employed to study the structure of the nanofillers, and the morphologies were characterized by TEM images using a JEM-2100 high-resolution analytical TEM instrument. Micrographs of coating top surface and fractured cross-sectional surface were taken by a field emission scanning electron microscope (FE-SEM), with a JSM-7600F Schottky.

3.4.1 Corrosion Protection Test

To evaluate the corrosion protection performance of the prepared coatings, electrochemical impedance spectroscopy (EIS) measurement was performed by the Gamry Reference 600 instrument. In a typical process, a 30-mm diameter O-ring glass tube was clamped to the test panels and filled with 1.0% NaCl solution, so the tested area was immersed by the conductive solution. Three electrode system was employed during the test: a saturated calomel electrode, a platinum mesh, and the test panel were worked as the reference electrode, counter electrode, and working electrode, respectively. Both DC potential and small superimposed AC excitation were applied to the working electrode during the test, and the data of current and potential of the electrochemical cell were collected, then converted into impedance vs. frequency curve.

3.4.2 Water Adhesion Test

The adhesion of water to the coating surface was evaluated by applying a water droplet ascending and descending from the coating surface. Constant speed of 0.5 mm/sec was applied to control the movement of water droplets. To make sure the droplet was sable on the coating, the droplet was squeezed against surface, and then rested for 15 sec before the descending process. The water droplet would completely detached from the surface and suspended on the tip during the descending process if it is a superhydrophobic surface with excellent water repellency; otherwise, the water would elongated into a cone shape during the descending process and detached from the tip in the final step.

3.4.3 Durability Test

The long-term performance of the coating under a corrosive environment was evaluated using accelerated durability test. The coated samples were left in a Q-Fog CCT chamber and exposed to salt spray with 5% NaCl solution, under an evaluated temperature (35° C.). The contact angle, water adhesion, and corrosion protection were evaluated after exposure. The accelerated weathering test was also utilized to examine the stability of the amphiphobicity of the developed coating. The specimens were exposed to artificial accelerated weathering cycles that carried out by a QUV accelerated weathering tester, each cycle includes 4 h of UV-light irradiation (60° C., UV intensity of 0.71 W m$^{-2}$) and 4 h of water condensation (50° C.). Contact angles, sliding angles and water adhesion were examined after the exposure.

3.4.4 Mechanical Strength Test

The tensile properties of the developed coating were determined by the coupon tensile test (ASTM D638), with a Shimadzu's EZ-X tester. The coupon specimens were clamped at both ends by the grip, and tensile strength was applied to elongate the specimens until the narrow cross-sectional test section was broke. The elongation speed was control to 1 mm/min, and real-time recorded stress vs. strain was used to determine the tensile strength, ultimate strain and Young's modulus for each specimen.

3.4.5 Durability and Reliability During Salt Fog Exposure

As the civil infrastructures are generally exposed to a moist or corrosive environment, the salt fog exposure was applied to examine the durability of the developed coatings as well, which corrosion resistance and hydrophobicity of the specimens were evaluated after exposure.

3.4.6 Corrosion Barrier Performance: EIS

The corrosion barrier property plays a vital role in the overall performance of a protective coating. To evaluate the long-term corrosion protection provided by the coating, coating was exposed to a corrosive environment with salt fog spray and elevated temperature for 500 hours, and electrochemical impedance spectroscopy (EIS) measurement was performed during the exposure.

The bode plots are generally represented by impedance and phase angle curves to study the performance of coatings. The impedance value in the low-frequency region (0.01 Hz) reflects the coating protective property of coating, and researchers suggested that an effective coating should have a maximum impedance value higher than $10^6 \Omega cm^2$. The phase angle curve represented the intactness of coating system, which a value 0° and 90° indicated that coating has poor and superior degrees of intactness, respectively. For an intact coating film against corrosion, as the electrolyte media could not penetrate the coating system, a straight line with a slope of -1 could be obtained in impendence curve and the phase-angle values reached up mostly approached 90° in a wide frequency region. Analysis of the ratio changes between resistive and capacitive regions during exposure can be utilized to understand the coating delamination process. The anti-corrosion performance is associated with the capacitive and resistive behavior of coatings; a purely capacitive behavior corresponds to a perfect barrier property; if the capacitive behavior is low, the electrode can pass the film like a resistor, and the resistive behavior is attributed to the coating performance. The region below the impendence curve could be split into the capacitive and resistive region by the breakpoint frequency values where phase angle reaches -45°. Therefore, the ratio changes between capacitive and resistive region is attributed by the coating damage and delamination. A decrease in capacitive region while an increase in resistive region revealed that the coating is damaged, and the corrosion protection performance is reduced.

3.5 Results and Discussion 3.5.1 X-Ray Diffraction (XRD) of Nanoparticle-Polymer Composite FIG. 32(c) presented the structure of the hybrid nanofiller by X-ray powder diffraction (XRD). The hybrid filler showed two weak diffraction peaks at 26.5° and 19.5°, the first peak was originated from the NS and the second one was from GNP sheets. However, note that the intensity of both peaks was weakened compared with singles fillers, especially the peaks that assigned to GNP, indicating proper intercalation and an increased degree exfoliation of GNP sheets in the matrix. The improved exfoliation state in the hybrid system suggested that the presence of NS particles destroyed the agglomerate of GNP sheets during the dispersion procedure, and after that, the covered NS on the GNP sheets has prevented them restacking together. Wan et al., *Compos. Sci. Technol.*, 82:60-68, 2013; Pourhashem et al., *Surf. Coat. Technol.*, 311:282-294, 2017; Yu et al., *Fibers Polym.*, 17(3):453-459, 2016; Ramezanzadeh et al., *Chem. Eng. J.*, 303:511-528, 2016. Dynamic light scattering (DLS) measurement presented the particle size distributions of single and hybrid nanofillers (FIG. 31(a)). As observed that the size distribution of the GNP/NS hybrid fillers was narrower than GNP particles, and also the average size was much smaller than the GNP particles. These observations indicated that the dispersion level was significantly improved in the hybrid filler system, as the formation of nanofiller aggregates were mitigated.

The nano-silica particles have uniformly attached and hanged on the surface of graphene nanoplatelets during the dispersion procedure, as confirmed by transmission electron microscope (TEM) image shown in FIG. 32(b), the obtained hybrid nanofiller possessed a unique three-dimensional structure. Then the solution was modified with hydroxy-terminated polydimethylsiloxane (PDMS), with 3-aminopropyltriethoxysilane as a coupling agent and dibutyl tin dilaurate as catalyst. A polyamide resin was blended into the batch as a cross-linker and applied on a metallic substrate. The neat epoxy was hydrophilic regardless of the added nanofillers, when PDMS was employed in the coating system, the water contact angle (CA) increased from 51° to 106° and became a hydrophobic surface.

3.5.2 FTIR of Superamphiphobic Surface

The superamphiphobic surface were synthesized by modifying $SiO_2$ nanoparticles with 1H,1H-2H,2H perfluorodecyltrichlorosilane (PDTS) and hexadecane. When the coating surface was covered with a dense layer of modified $SiO_2$ surface, as presented in FIGS. 33(b) and (c), the WCA was further increased to 168°, with a contact angle of 150° to hexadecane; hence, a superamphiphobic surface was fabricated. PDTS is well known for its application to reduce the surface energy and increase the hydrophobicity of a surface. When the $SiO_2$ nanoparticles were mixed with PDTS, the amphiphobicity were functionalized to their surfaces by the perfluorodecyltrichloro groups, which was confirmed by Fourier transform infrared spectroscopy (FTIR), the addition two tiny peaks around 1250 and 730 cm$^{-1}$ were obtained, as it was due to the stretching vibration of CF bonds, and the peak at 950 cm$^{-1}$ was due to the presence of Si—OH bonds (FIG. 33(a)). The excellent hydrophobicity was contributed by two factors; first, the fluorinated NS particles exhibited low surface tension, which led to excellent water repellency properties; second, the texture of the top layer could effectively prevent liquid from penetrating the coating, which was confirmed elsewhere. Li et al., *Chem. Eng. J.*, 246:238-243, 2014.

3.5.3 Corrosion Barrier Performance: EIS

Figure 34D:
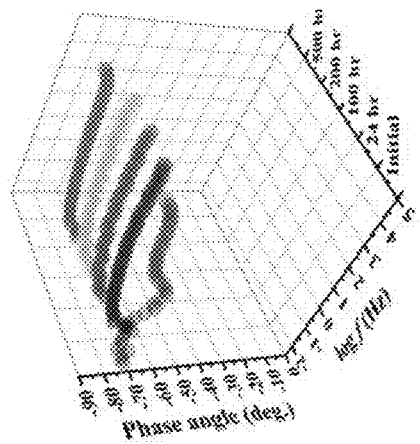
FIGS. 34(a)-34(e) show the impedance curve and phase angle curve of the neat epoxy (FIG. 34(a) and FIG. 34(b), respectively), 1% GS-PDEP (10:90) MS coating (FIG. 34(c) and FIG. 34(d), respectively), and the impedance value of 1% GS-PDEP (10:90) MS coating after salt spray exposure (FIG. 34(e)).
Figure 34C:
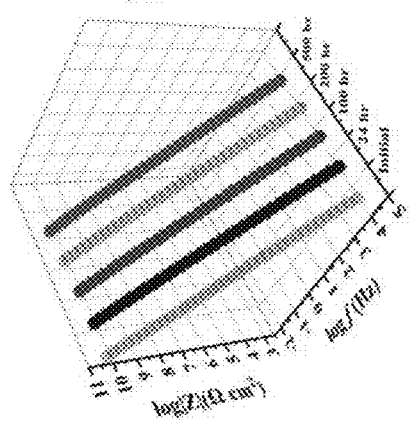
Figure 34B:
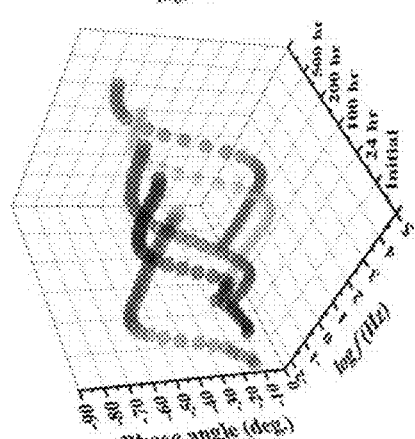
Figure 34A:
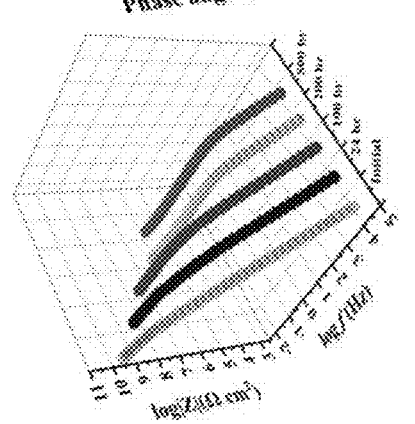
Figure 34E:
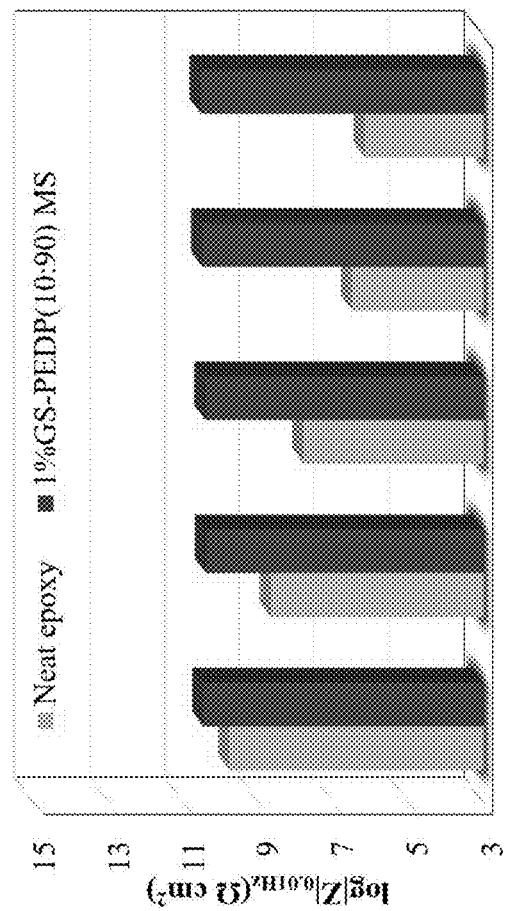

The impedance values at 0.01 Hz were summarized in FIG. 34(e) and represented as log $|Z|_{0.01\ Hz}$. The comparison of impedance values revealed that the developed coating has extraordinary anti-corrosion performance. In order to better understand the enhancement of the modification, the results were compared with the neat epoxy group. For the developed coating, excellent barrier performance was observed in the corrosive environment, as the impedance value was over $10^{10}\Omega/cm^2$ after different exposure periods; meanwhile, the neat epoxy has lower impedance value at fresh stage and gradually decreased during the exposure time. The impedance and phase angle plots were employed to evaluate the corrosive resistance of the coatings and were presented in FIG. 34(a)-(d). The neat epoxy at initial stage exhibited good corrosion performance; however, a small bend in the low-frequency region of impedance plot was observed and the phase angle was $-17°$. This revealed that the presence of micropores and cracks in the coating film, and the cracks were developed during the exposure as the frequency at $-45°$ shifted to higher frequencies. On the other hand, the results reflected the developed coating was behaved like a completely intact film during the entire exposure time (500 hours), as a straight line was observed in impedance curve and the phase angle was around $-90°$ in over a wide frequency region. The results reflected the neat epoxy was degraded while against the corrosive environment, while the modified coating exhibited excellent barrier properties with strong durability.

3.5.4 Superamphiphobicity of Coating Upon Corrosive Environment and Accelerated Weathering Treatment FIG. 35 showed the contact angle (CA) and sliding angle (SA) measurements of water and organic oil droplet on the develop coating surface. Hexadecane was chosen due to its low surface tension, which leads to the CA reduced almost to zero on many coating surfaces. Moreover, it is necessary that an amphiphobic surface can repel the hexadecane as it is one of the major components in diesel. Strobel et al., *Plasma Process. Polym.*, 8:8-13, 2011. Initially, due to the uniformly distributed fluorinated NPs on the top surface, the contact angle of water and hexadecane was around 168° and 150°, respectively. The sliding angle (SA) measurement revealed that the coatings have a SA less than 10° for both water and hexadecane.

The application of the hydrophobic surface was often limited by its poor durability. The stability of the amphiphobic surface on the developed coating was further examined by measuring the CA and SA after salt fog spray. The results strongly suggested the coating film was robust enough to maintain the superhydrophobic properties under the accelerated corrosive environment. The CA values have slightly deceased after 24 hours exposure and then displayed no obvious change after that. A water contact angle (CA) values around 152~155° were obtained in both 24, 100, 200 and 500 hours. In addition, the SA values were increased a little after 24 hours exposure and retained less than 10° even after 500 hours. Meanwhile, similar tendency was also observed with oil droplets (hexadecane), the CA of hexadecane remained in a range of 143~150° with the exposure time, while the SA was still low. These results indicated that the superior water and oil repellency of the developed coating was survived after exposing to the severe environment.

Figures 35A, 35B:
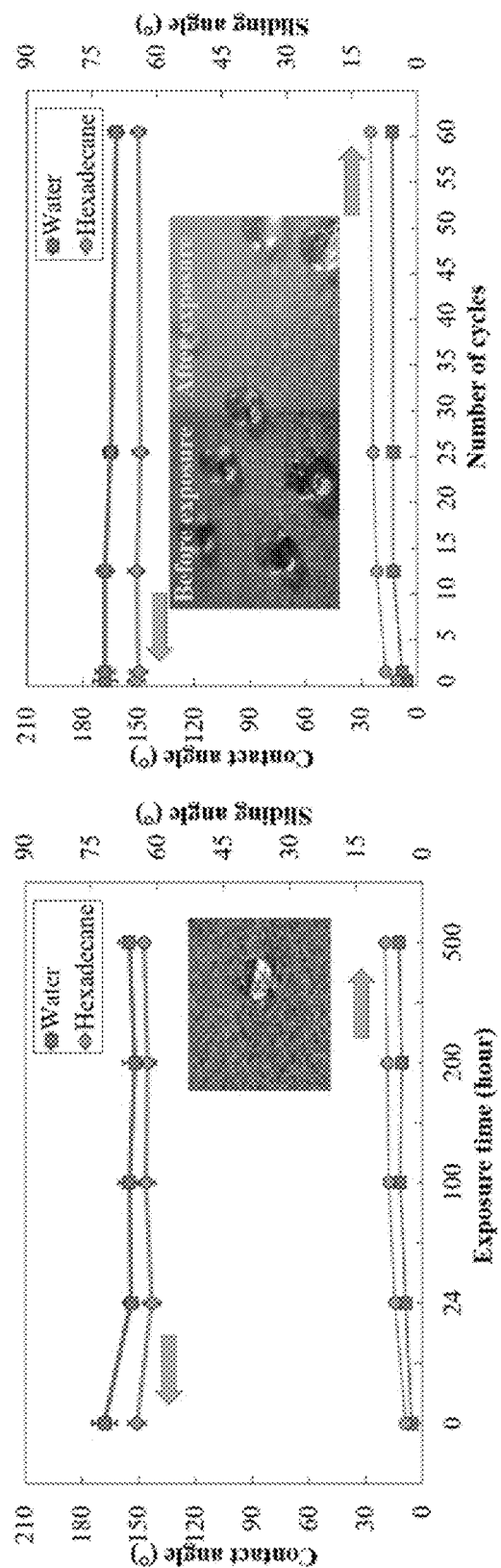
FIGS. 35(a)-35(b) show the water and oil contact angle and sliding-angle of 1% GS-PDEP (10:90) MS coating after FIG. 35(a) salt spray exposure and FIG. 35(b) accelerated weathering test.

Besides exposing to corrosive environment, the weather condition that includes UV irradiation and water condensation is another challenge to superamphiphobic coatings, which may result severe coating degradation and reduce the hydrophobicity. To evaluate the stability of the developed coating under UV-light and water-condensation cycles, accelerated weathering treatment was performed to the specimens, while the CA and SA was measured after exposure as well. The results revealed the developed coating could resist attacks attributed by UV-irradiation and water-condensation. Similar to the results from salt spray, slightly decreased CA and increased SA were observed at the beginning of exposure then remained unchanged during the test. As shown in FIG. 35(b), the coating surface kept a contact angle larger than 160° and 150° for water and hexadecane, respectively. Low sliding angle was observed during the exposure as well, while being around 7° and 14° for water and hexadecane after 60 cycles. The observation confirmed the developed coating can withstand accelerated weathering test without damaging its superior repellency to water and organic liquid.

3.5.5 Water Droplet Adhesion from the Coating Surface

The coating surface was categorized as hydrophilic (contact angle<45°), hydrophobic (contact angle>90°), and in-between (45°<contact angle<90°) if water was used as the test liquid. Moreover, it is worth to mention that the adhesion of water to the contact surface is also a primary factor that contributed to the water repellency of coatings. Yin et al., *Appl. Surf. Sci.*, 258:4063-4068, 2012; Xue et al., *Sci. Technol. Adv. Mater.*, 9:035008, 2008; Das et al., *ACS Appl. Mater. Interfaces*, 9:21496-21502, 2017; Dong et al., *ACS Appl. Mater. Interfaces*, 9:1941-1952, 2017; Wang et al., *ACS Appl. Mater. Interfaces*, 7:743-755, 2014. Higher water adhesion indicates the water is more difficult to detach from the surface, which increase the wettability of the coating.

FIG. 36 showed a series of images taken during water droplet ascending and descending the surface of neat epoxy, 1% GS-PDEP (10:90) and 1% GS-PDEP (10:90) MS coating, respectively. For the neat epoxy, it was found the water droplet was completely detached from the tip with a low contact angle, hence, indicating the neat epoxy was hydrophilic and had low water repellency. On the other hand, as shown in FIG. 36(b), an increased contact angle was observed in 1% GS-PDEP (10:90) coating, which was confirmed by CA measurement above. However, due to the high adhesion between water and coating surface, the droplet stayed on the coating surface after the descending process.

Figure 36A:
FIGS. 36(a)-36(e) show the water droplet ascending and descending of FIG. 36(a) neat epoxy, FIG. 36(b) 1% GS-PDEP (10:90), and FIG. 36(c) 1% GS-PDEP (10:90) MS coating at fresh stage; and 1% GS-PDEP (10:90) MS coating after FIG. 36(d) salt fog spray and FIG. 36(e) accelerated weathering test.
Figure 36B:
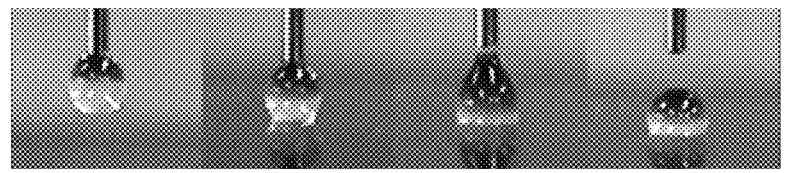
Figure 36C:
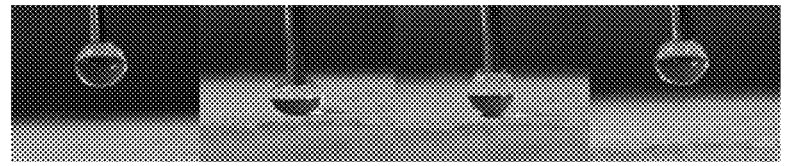
Figure 36D:
Figure 36E:

Excellent water repellency was observed in 1% GS-PDEP (10:90) MS coating, as it was found that the water droplet was easily detached from the surface and suspending on the tip, as presented in FIG. 36(c). To sum up, the developed coating has an excellent superhydrophobic surface and improved water repellency, which allowed water easily to roll off the coating surface.

The results from the water adhesion showed a strong agreement with the contact angle test. As the exposure time elapsed, no significant increase in water adhesion was observed, indicating the surface remained undamaged under the severe environment. As presented in FIGS. 36(d) and (e), after exposing to salt spray or accelerated weathering test, the water droplets could still rolled off to the side during the preload process, and completely detached from the coating surface after when descending from specimens.

3.5.6 Tension Properties

FIG. 37 presented the tensile stress-strain curve for the developed 1% GS-PDEP MS coatings, which was provided by the coupon tensile test. The curve was real-time recorded and used to determine the tensile strength, strain at failure, and Young's modulus of the developed coating, and neat epoxy was used as references. In FIG. 37(c), a significant increase of tensile strength could be observed in 1% GS-PDEP (10:90) group; a tensile strength of 44 MPa was obtained in the developed coating, which has increased 75% compared with the neat epoxy. Furthermore, improved strain and Young's modulus were also observed in the developed coating. The failure strain of the coating exhibited an increase by 63%, indicated the develop coating has higher tolerance of deformation during application. In addition, Young's modulus was increased around 11%, which revealed that the developed coating was stronger when against mechanical force. The overall results indicated that the modification of epoxy significantly improved the tensile properties and resulted in a tougher coating material to resist mechanical failure.

In the SEM images of the fracture surface (FIGS. 37(b) and (c)), a relatively smooth surface was observed in neat epoxy, indicating that a typical brittle fracture associated with the low impact resistance and fracture toughness. The fracture surface was significantly rougher when added with nanofillers, where higher surface roughness and more compacted cleavages were observed, indicating higher energy absorption and better fracture resistance. This observation was consistent with the findings shown in the tensile properties from above.

3.6 Conclusion

A self-cleaning superamphiphobic coating with excellent corrosion protection properties and mechanical strength was synthesized by integrating the hybrid nanofiller reinforcement with surface modification. The simple fabrication method and easy application process showed its potential toward large scale commercial applications. The use of GNP/NS hybrid nanofiller provided a reinforcement on corrosion barriers performance and also a significant improvement on mechanical properties was obtained in the proposed coating. A superamphiphobic coating was fabricated which consisted the fluorinated particles and PDMS modified epoxy resin; hence, the contact angle of water and hexadecane was increased to around 168° and 150°, respectively. The obtained results during accelerated corrosion test revealed the proposed coating was durable, as its excellent corrosion resistance and hydrophobicity remained undamaged after exposure. This nanofiller-epoxy coating is well-suited as a multifunctional protective coating for metallic infrastructures.

The claimed invention is:

1. A curable coating composition comprising:
   a) a nanoparticle-polymer composition, comprising:
      a1) a reaction product of:
         a1.1) at least one epoxy resin;
         a1.2) at least one hydroxy-terminated poly(dimethylsiloxane) (PDMS); and
         a1.3) at least one silane coupling agent; and
      a2) at least one hybrid nanofiller, comprising graphene nanoplatelets (GNP) and nano-silica (NS); and
   b) superamphiphobic nanoparticles, comprising a reaction product of:
      b1) silicon dioxide nanoparticles; and
      b2) 1H,1H,2H,2H-perfluorodecyltrichlorosilane (FDTS), 1H,1H,2H,2H-perfluorododecyltrichlorosilane (FDDTS), or mixtures thereof.

2. The curable coating composition of claim 1, wherein the epoxy resin is selected from the group consisting of bisphenol-based resin, novolac resin, aliphatic resin, halogenated resin, diluent resin, glycidol amine resin, and mixtures thereof.

3. The curable coating composition of claim 2, wherein the epoxy resin is selected from a bisphenol A/epichlorohydrin epoxy resin.

4. The curable coating composition of claim 1, wherein the epoxy resin is present in the nanoparticle-polymer composition in an amount ranging from about 35-65 wt. %, based on the total solid content of the nanoparticle-polymer composition.

5. The curable coating composition of claim 1, wherein the hybrid nanofiller is present in the nanoparticle-polymer composition in an amount ranging from about 0.1-10 wt. %, based on the total solid content of the nanoparticle-polymer composition.

6. The curable coating composition of claim 1, wherein a weight ratio of GNP: NS ranges from 25:75 to 75:25.

7. The curable coating composition of claim 6, wherein the weight ratio of GNP: NS is 50:50.

8. The curable coating composition of claim 1, wherein the hybrid nanofiller has a particle size ranging from about 70-120 nm.

9. The curable coating composition of claim 1, wherein the hydroxy-terminated PDMS has a molecular weight ranging from about 5000 $\overline{M}_n$ to 10,000 $\overline{M}_n$.

10. The curable coating composition of claim 1, wherein the hydroxy-terminated PDMS is present in the nanoparticle-polymer composition in an amount ranging from about 4-18 wt. %, based on the total solid content of the nanoparticle-polymer composition.

11. The curable coating composition of claim 1, wherein the silane coupling agent is at least one aminosilane.

12. The curable coating composition of claim 1, wherein the silane coupling agent is 3-aminopropyltriethoxysilane.

13. The curable coating composition of claim 1, further comprising at least one solvent, at least one curing agent, and/or at least one catalyst.

14. The curable coating composition of claim 13, wherein the curing agent is selected from the group consisting of at least one polyamine, at least one polyamide, and mixtures thereof.

15. The curable coating composition of claim 14, wherein the curing agent is a polyamide.

16. The curable coating composition of claim 1, wherein the superamphiphobic nanoparticles comprise the reaction product of:
   b1) the silicon dioxide nanoparticles; and
   b2) the FDTS.

17. A cured coating composition comprising the curable coating composition of claim 1.

18. An object coated with the curable coating composition of claim 1.

19. A method for coating at least part of a surface of a substrate comprising the steps of:
   applying the nanoparticle-polymer composition of claim 1 to at least a part of the surface of the substrate to form a first coated surface,
   curing the first coated surface to form a cured first coated surface,
   applying the superamphiphobic nanoparticles to the cured first coated surface to form a second coated surface, and
   curing the second coated surface.

20. The method of claim 19, wherein the substrate is a metal substrate.

21. The method of claim 19, wherein the superamphiphobic nanoparticles comprise the reaction product of:
   b1) the silicon dioxide nanoparticles; and
   b2) the FDTS.

* * * * *